(12) United States Patent
Bernardi

(10) Patent No.: US 11,822,626 B2
(45) Date of Patent: *Nov. 21, 2023

(54) SECURE WEB RTC REAL TIME COMMUNICATIONS SERVICE FOR AUDIO AND VIDEO STREAMING COMMUNICATIONS

(71) Applicant: DatChat, Inc., New Brunswick, NJ (US)

(72) Inventor: Robert Bernardi, McLean, VA (US)

(73) Assignee: DatChat, Inc., New Brunswick, NJ (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/408,495

(22) Filed: Aug. 23, 2021

(65) Prior Publication Data

US 2022/0107994 A1  Apr. 7, 2022
US 2023/0205850 A9  Jun. 29, 2023

Related U.S. Application Data

(63) Continuation of application No. 17/246,593, filed on May 1, 2021, now Pat. No. 11,100,197, which is a (Continued)

(51) Int. Cl.
*G06F 21/10* (2013.01)
*H04L 51/10* (2022.01)
(Continued)

(52) U.S. Cl.
CPC ........ *G06F 21/105* (2013.01); *G06F 21/6263* (2013.01); *H04L 9/085* (2013.01);
(Continued)

(58) Field of Classification Search
CPC ... G06F 21/105; G06F 21/6263; H04L 9/085; H04L 51/10; H04L 51/18; H04L 63/123
See application file for complete search history.

(56) References Cited

U.S. PATENT DOCUMENTS 7,337,146 B2  2/2008  Heelan et al.
7,415,439 B2  8/2008  Kontio et al.
(Continued)

OTHER PUBLICATIONS

"RFC 9999", by Rescorla, Aug. 2019, 41 pages (Year: 2019).*
(Continued)

*Primary Examiner* — Oleg Korsak
(74) *Attorney, Agent, or Firm* — Sheppard Mullin Richter & Hampton LLP

(57) ABSTRACT

Secure Real Time Communications Service (SRTCS) for audio and video streaming communications and content sharing that securely connects multiple users using a "push-button" WebRTC chat app connection over a Peer-to-Peer (P2P) network. SRTCS uniquely combines advanced security technologies to provide user based permissions control when communicating and sharing rich media content with other users including End-to-End Encryption (E2EE), Hash Technology (DHT), and Digital Rights Protection (DRM). SRTCS has also designed a unique cloud based streamed video storage and sharing platform service for consumers and business video storage and sharing applications.

12 Claims, 59 Drawing Sheets

Related U.S. Application Data continuation of application No. 17/197,114, filed on Mar. 10, 2021, now Pat. No. 11,176,226, which is a continuation of application No. 17/064,559, filed on Oct. 6, 2020, now Pat. No. 11,151,229, which is a continuation-in-part of application No. 16/845,082, filed on Apr. 10, 2020, now Pat. No. 10,873,852.

(51) Int. Cl.
*G06F 21/62* (2013.01)
*H04L 51/18* (2022.01)
*H04L 9/40* (2022.01)
*H04L 9/08* (2006.01)

(52) U.S. Cl.
CPC .............. *H04L 51/10* (2013.01); *H04L 51/18* (2013.01); *H04L 63/123* (2013.01); *G06F 21/10* (2013.01)

(56) References Cited

U.S. PATENT DOCUMENTS

| | | | |
|---|---|---|---|
| 7,593,991 B2 | 9/2009 | Friedman et al. | |
| 7,765,404 B2 | 7/2010 | Lamberg | |
| 8,090,662 B2 | 1/2012 | Pence et al. | |
| 8,286,255 B2 | 10/2012 | Grant et al. | |
| 8,488,786 B2 | 7/2013 | Ferrazzini et al. | |
| 8,619,993 B2 | 12/2013 | Verma | |
| 8,635,645 B2 | 1/2014 | Krishnamoorthi et al. | |
| 8,660,539 B2 | 2/2014 | Khambete et al. | |
| 8,688,583 B2 | 4/2014 | Boccon-Gibod et al. | |
| 8,701,145 B1 | 4/2014 | Berger et al. | |
| 8,726,406 B2 | 5/2014 | Catrein et al. | |
| 8,806,208 B2 | 8/2014 | Cheng et al. | |
| 8,831,228 B1 | 9/2014 | Agrawal et al. | |
| 9,113,497 B2 | 8/2015 | Smith, II et al. | |
| 9,177,112 B2 | 11/2015 | Bjorkengren et al. | |
| 9,244,916 B2 | 1/2016 | Berger et al. | |
| 9,313,458 B2 | 4/2016 | Helms et al. | |
| 9,363,133 B2 * | 6/2016 | Yoakum | H04L 63/0218 |
| 9,374,369 B2 | 6/2016 | Mahaffey et al. | |
| 9,374,685 B1 | 6/2016 | Jakatdar et al. | |
| 9,396,325 B2 | 7/2016 | Kendall | |
| 9,426,133 B2 | 8/2016 | Boccon-Gibod et al. | |
| 9,473,485 B2 | 10/2016 | Kendall | |
| 9,491,496 B2 | 11/2016 | Patadia et al. | |
| 9,531,744 B2 | 12/2016 | Bettini et al. | |
| 9,577,989 B2 | 2/2017 | Ackerly et al. | |
| 9,578,021 B2 | 2/2017 | Ackerly | |
| 9,582,668 B2 | 2/2017 | Bettini et al. | |
| 9,621,840 B2 | 4/2017 | Berger et al. | |
| 9,626,667 B2 | 4/2017 | Boccon-Gibod et al. | |
| 9,628,841 B2 | 4/2017 | Cho et al. | |
| 9,635,004 B2 | 4/2017 | Giladi et al. | |
| 9,679,332 B2 | 6/2017 | Kim et al. | |
| 9,715,814 B2 | 7/2017 | Sattari | |
| 9,847,975 B2 | 12/2017 | Medvinsky | |
| 9,847,979 B2 | 12/2017 | Peterka et al. | |
| 9,864,405 B2 | 1/2018 | Trachtenberg et al. | |
| 9,900,306 B2 | 2/2018 | Handal et al. | |
| 9,923,844 B1 | 3/2018 | Kret et al. | |
| 9,934,600 B2 | 4/2018 | Sarafa et al. | |
| 9,948,580 B2 | 4/2018 | Reed et al. | |
| 9,948,588 B2 | 4/2018 | O'Connor | |
| 9,965,628 B2 | 5/2018 | Ford et al. | |
| 9,967,553 B1 | 5/2018 | Kim-Whitty | |
| 9,972,239 B2 | 5/2018 | Trachtenberg et al. | |
| 9,979,702 B2 | 5/2018 | Nugent et al. | |
| 9,979,707 B2 | 5/2018 | Miller et al. | |
| 10,015,169 B2 | 7/2018 | Kennedy | |
| 10,110,960 B2 | 10/2018 | Roberts et al. | |
| 10,123,065 B2 | 11/2018 | Lyons et al. | |
| 10,210,341 B2 | 2/2019 | Roth et al. | |
| 10,319,022 B2 | 6/2019 | Clayton et al. | |
| 10,332,478 B2 | 6/2019 | Trachtenberg et al. | |
| 10,387,857 B2 | 8/2019 | Kim et al. | |
| 10,429,801 B2 | 10/2019 | Billings | |
| 10,504,418 B2 | 12/2019 | Trachtenberg et al. | |
| 10,536,422 B1 | 1/2020 | Rao | |
| 10,539,806 B2 | 1/2020 | Kim-Whitty | |
| 10,565,621 B2 | 2/2020 | DeWitt et al. | |
| 10,601,794 B2 | 3/2020 | Srinivasan et al. | |
| 10,608,974 B2 | 3/2020 | Longdale et al. | |
| 10,693,872 B1 * | 6/2020 | Larson | G06F 21/31 |
| 10,742,732 B1 | 8/2020 | Lindeman | |
| 10,873,852 B1 | 12/2020 | Bernardi | |
| 10,958,629 B2 | 3/2021 | Hybertson | |
| 11,003,802 B2 | 5/2021 | Auh | |
| 11,019,261 B2 | 5/2021 | Chase et al. | |
| 11,023,973 B2 | 6/2021 | Kober et al. | |
| 2003/0078890 A1 | 4/2003 | Schmidt et al. | |
| 2003/0131353 A1 | 7/2003 | Blom et al. | |
| 2003/0236892 A1 | 12/2003 | Coulombe | |
| 2004/0101141 A1 | 5/2004 | Alve | |
| 2004/0158741 A1 | 8/2004 | Schneider | |
| 2005/0008163 A1 | 1/2005 | Leser et al. | |
| 2006/0031351 A1 | 2/2006 | Marston et al. | |
| 2006/0161666 A1 | 7/2006 | Cohen | |
| 2006/0176902 A1 | 8/2006 | Bellordre | |
| 2007/0079381 A1 | 4/2007 | Hartung et al. | |
| 2007/0104181 A1 | 5/2007 | Lee et al. | |
| 2007/0204064 A1 | 8/2007 | Mail et al. | |
| 2007/0204078 A1 | 8/2007 | Boccon-Gibod et al. | |
| 2008/0086779 A1 | 4/2008 | Blake | |
| 2008/0098212 A1 | 4/2008 | Helms | |
| 2008/0189213 A1 | 8/2008 | Blake | |
| 2009/0037388 A1 | 2/2009 | Cooper et al. | |
| 2009/0052863 A1 | 2/2009 | Parmar et al. | |
| 2009/0167531 A1 | 7/2009 | Ferguson | |
| 2011/0071891 A1 | 3/2011 | Gavita et al. | |
| 2011/0072267 A1 | 3/2011 | Johansson | |
| 2012/0066495 A1 | 3/2012 | Hao et al. | |
| 2012/0095749 A1 | 4/2012 | Capretta | |
| 2012/0131120 A1 | 5/2012 | Maghraby | |
| 2012/0240240 A1 | 9/2012 | Naslund et al. | |
| 2012/0303490 A1 | 11/2012 | Hill | |
| 2013/0054965 A1 | 2/2013 | Catrein et al. | |
| 2013/0173378 A1 | 7/2013 | Scholes et al. | |
| 2013/0179949 A1 | 7/2013 | Shapiro et al. | |
| 2013/0227636 A1 | 8/2013 | Bettini et al. | |
| 2013/0227683 A1 | 8/2013 | Bettini et al. | |
| 2013/0347094 A1 | 12/2013 | Bettini et al. | |
| 2014/0040622 A1 | 2/2014 | Kendall et al. | |
| 2014/0161356 A1 | 6/2014 | Tesch et al. | |
| 2014/0161423 A1 | 6/2014 | Tesch et al. | |
| 2014/0163956 A1 | 6/2014 | Tesch et al. | |
| 2014/0163957 A1 | 6/2014 | Tesch et al. | |
| 2014/0163980 A1 | 6/2014 | Tesch et al. | |
| 2014/0164371 A1 | 6/2014 | Tesch et al. | |
| 2014/0164506 A1 | 6/2014 | Tesch et al. | |
| 2014/0222963 A1 | 8/2014 | Gangadharan | |
| 2014/0279475 A1 | 9/2014 | Castrechini et al. | |
| 2014/0310527 A1 | 10/2014 | Veugen | |
| 2014/0355955 A1 | 12/2014 | Berger et al. | |
| 2015/0007264 A1 | 1/2015 | Maldaner | |
| 2015/0074715 A1 | 3/2015 | Berger et al. | |
| 2015/0095645 A1 | 4/2015 | Eldar | |
| 2015/0143455 A1 | 5/2015 | Bettini et al. | |
| 2015/0227722 A1 | 8/2015 | Cholas | |
| 2015/0236905 A1 | 8/2015 | Bellan | |
| 2015/0242747 A1 | 8/2015 | Packes et al. | |
| 2015/0269366 A1 | 9/2015 | Bells | |
| 2015/0310188 A1 | 10/2015 | Ford | |
| 2015/0350712 A1 | 12/2015 | Sarosi | |
| 2016/0007074 A1 | 1/2016 | Marsh et al. | |
| 2016/0142381 A1 | 5/2016 | Shiraishi | |
| 2016/0149970 A1 | 5/2016 | Jacquemot | |
| 2016/0365973 A1 | 12/2016 | Van Deventer | |
| 2017/0041296 A1 | 2/2017 | Ford | |
| 2017/0099293 A1 | 4/2017 | Tan | |
| 2017/0132630 A1 | 5/2017 | Castinado et al. | |
| 2017/0243028 A1 | 8/2017 | Lafever | |
| 2017/0374311 A1 | 12/2017 | Trachtenberg et al. | |
| 2018/0114205 A1 | 4/2018 | Thomas et al. | |

(56) References Cited

U.S. PATENT DOCUMENTS

| | | |
|---|---|---|
| 2019/0035008 A1 | 1/2019 | Venters, III et al. |
| 2019/0158544 A1 | 5/2019 | Ohneck |
| 2019/0173854 A1 | 6/2019 | Beck |
| 2019/0213304 A1 | 7/2019 | Webb et al. |
| 2019/0335133 A1 | 10/2019 | Sharif-Ahmadi et al. |
| 2019/0386969 A1 | 12/2019 | Verzun |
| 2019/0387191 A1 | 12/2019 | Sharif-Ahmadi et al. |
| 2020/0065853 A1 | 2/2020 | Cvinar |
| 2020/0092270 A1 | 3/2020 | Ackerly |
| 2020/0126594 A1 | 4/2020 | Berger et al. |
| 2020/0142750 A1 | 5/2020 | Kaplan |
| 2020/0245048 A1 | 7/2020 | Chase et al. |
| 2020/0266976 A1 | 8/2020 | Roth et al. |
| 2020/0374113 A1 | 11/2020 | Noam |
| 2021/0135845 A1 | 5/2021 | Adibi |
| 2022/0179925 A1 | 6/2022 | Krajicek |
| 2023/0086191 A1 | 3/2023 | Jakobsson |

OTHER PUBLICATIONS

Locklizard, Safeguard Enterprise PDF Security Product Manual for Windows, version 5, rev. 1.36, 2018, 265 pages.

Falkaris, Oh Snap, The State of Electronic Discovery . . . , Computer & Internet Lawyer, vol. 33, No. 10, p. 1-17, 2016.

Chen Block-Secure: Blockchain based scheme for secure P2P cloud storage Jul. 9, 2018.

Katalov, iMessage Security Encryption and Attach, ElcomSoft Blog p. 1-11 Nov. 2018.

Davies et al. "Evaluating Two Approaches for Browser-Based Real-Time Multimedia Communication", MoMM2012, Dec. 3-5, 2012 (Year: 2012), 9 pages.

Goulao, Antonio, et al., "ShareIff: A Sticky Policy Middleware for Self-Destructing Messages in Android Applications", 2016 IEEE 35th Symposium on Reliable Distributed Systems (SRDS), (Year: 2016), pp. 11-20.

Lea, K., "Does Someone Know When You Save Their Chat on Snapchat?", Quora.com, Apr. 2019 (Year: 2019), pp. 1-3.

Rinaldi, "Peer to Peer Digital Rights Management Using Blockchain", University of the Pacific, Thesis, 2018 (Year: 2018), 68 pages.

Sergiienko, "WebRTC Blueprints", Packt Publishing, 2014 (Year: 2014), 176 pages.

Sredojev et al., "WebRTC Technology Overview and Signaling Solution Design and Implementation", MIPRO 2015, May 25-29, 2015 (Year: 2015), 4 pages.

\* cited by examiner

• Signaling Server: Private IP Address Exposed

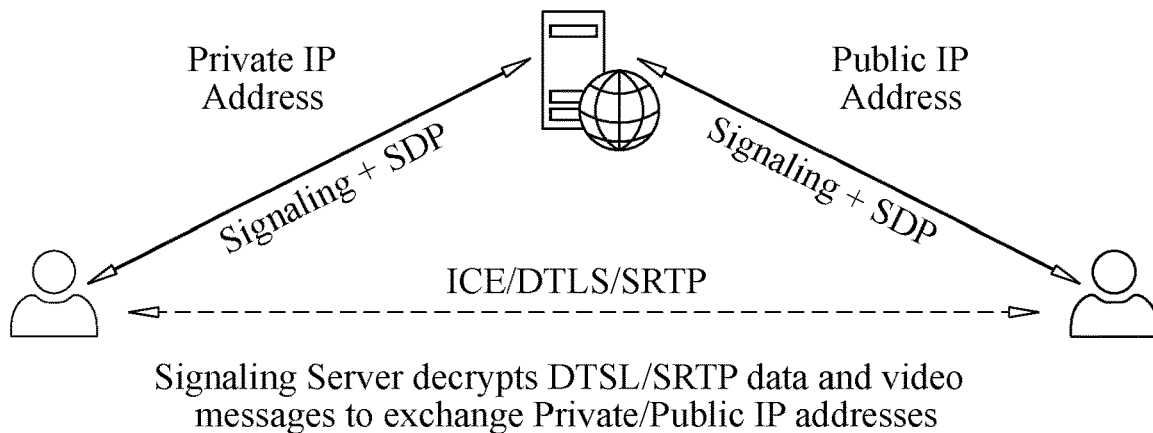

Signaling Server decrypts DTSL/SRTP data and video
messages to exchange Private/Public IP addresses

• ICE Services: STUN/TURN Services - Expose Video Streams

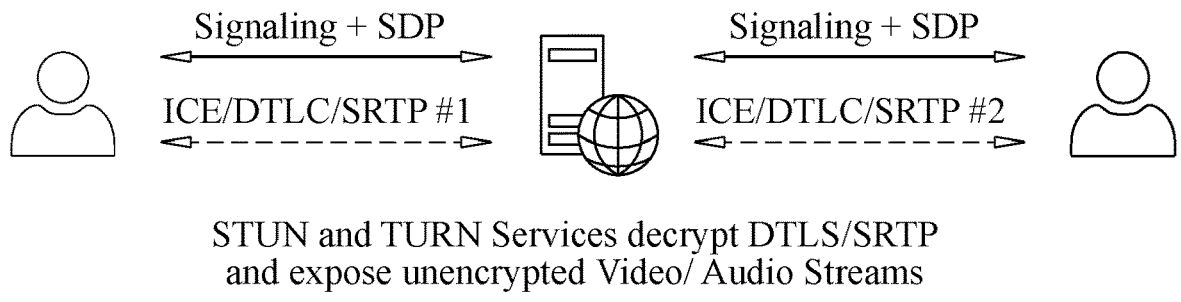

STUN and TURN Services decrypt DTLS/SRTP
and expose unencrypted Video/Audio Streams

• Selective Forwarding Unit (SFU): Multiparty Conferences
Simulcast and Multicast Videos - Little to No Security

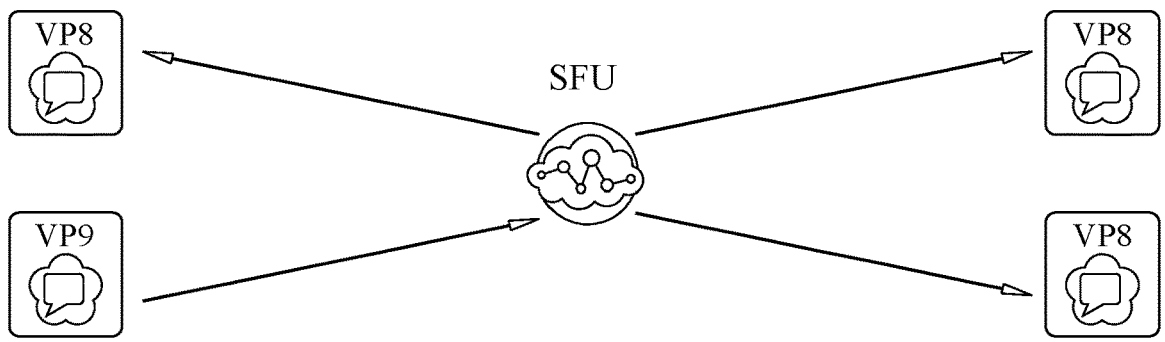

DTLS peer encryption designed for a P2P connection between 2 users,
with SFU, DTLS peer encryption fails to encrypt multiple video streams.

FIG. 9

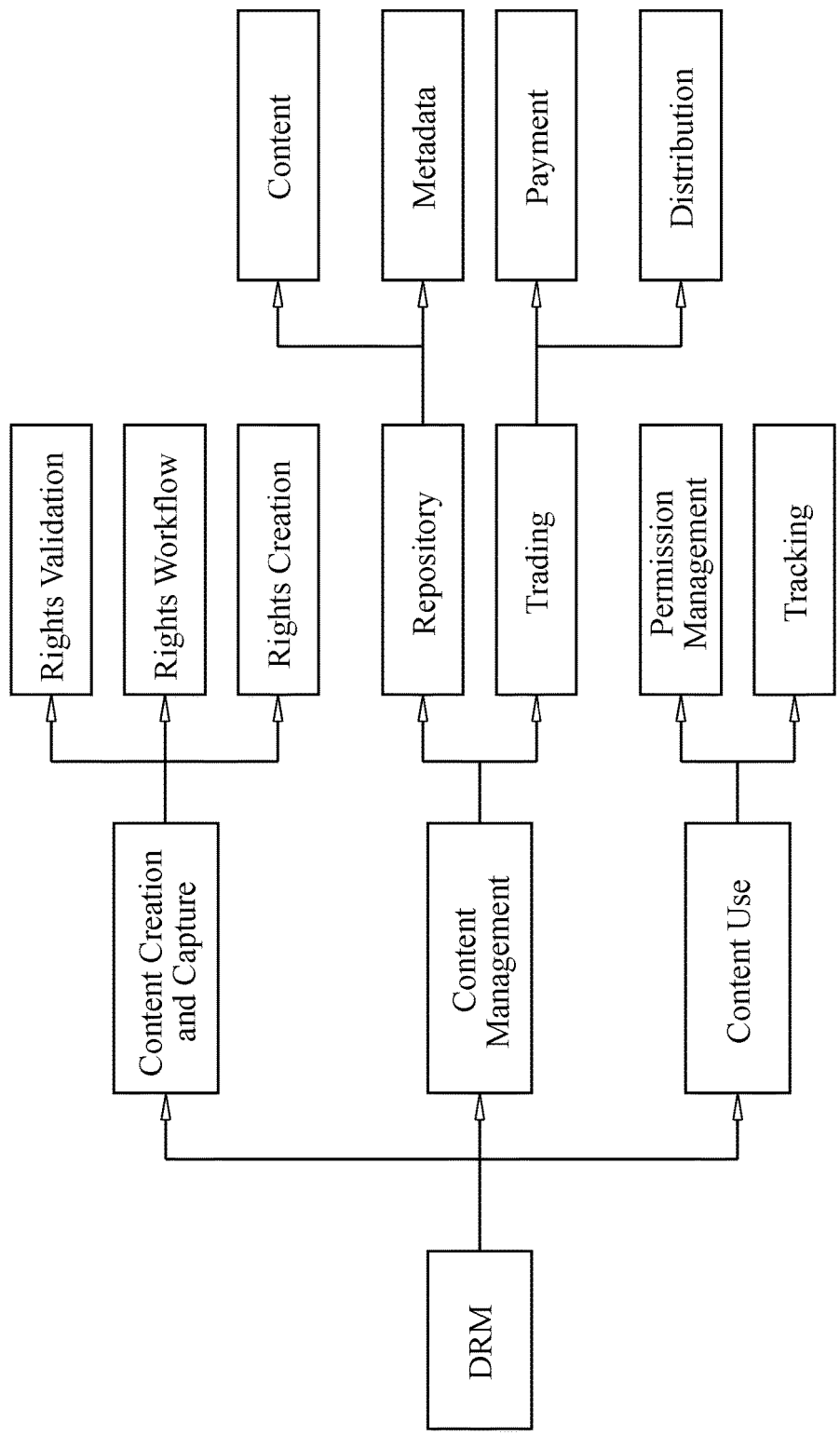

FIG. 16

DRM Functional Architecture

When Streamed Videos are created, the Video System ensures that rights are validated, assigned and and approved to their owners. In the distribution and storage of the system the content and metadata and manages the license and transactions. After content has been accessed and downloaded the system enforces the rights associated with the content, by providing proper permissions to access, use and modification.

Storing and Retrieving Caller/Callee Phone? IP Addresses
for IPFS Distributed Storage to Blockchain with Encryption

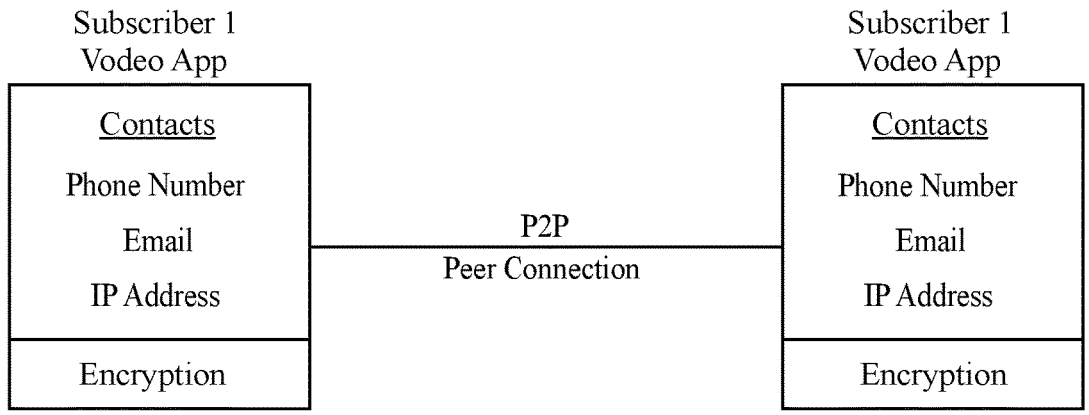
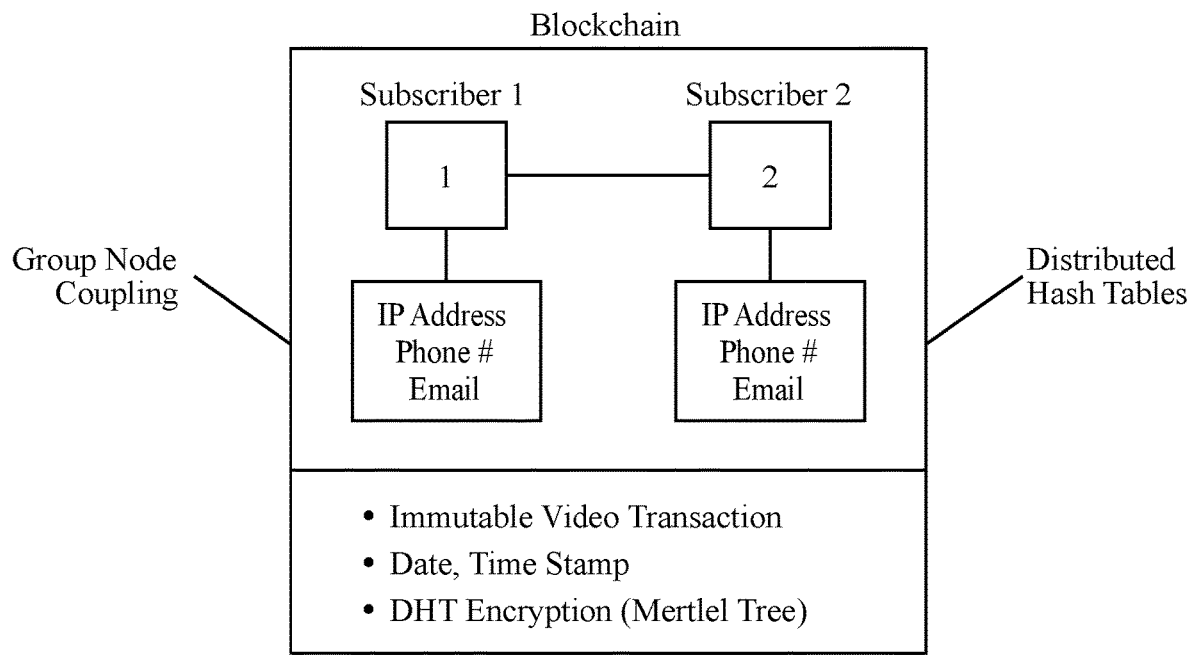
FIG. 30

Directed Acyclic Graph (DAG)

Using WebRTC, where video is not streamed through any intermediate server, but directly to a client.

Architecture of the Janus Server

93.185.17.105

SSID: D.D.M.
BSSID: 01:02:DE:AD:BE:EF
Internal IP: 192.168.1.102
Host: 93.185.17.105

Mask: 255.255.255.0
Gateway: 192.168.1.1
Broadcast address: 192.168.1.255
Localhost: 127.0.0.1
Connection type: Wifi(LTE)

Mask: 255.255.255.0
Gateway: 192.168.1.1
Broadcast address: 192.168.1.255
Localhost: 127.0.0.1
  Localhost: 127.0.0.1
  Localhost: 127.0.0.1
Gateway: 192.168.1.1
Broadcast address: 192.168.1.255

IP   Pong   Track   LAN   More

IOS Smartphone

Janus Extensible Architecture and API

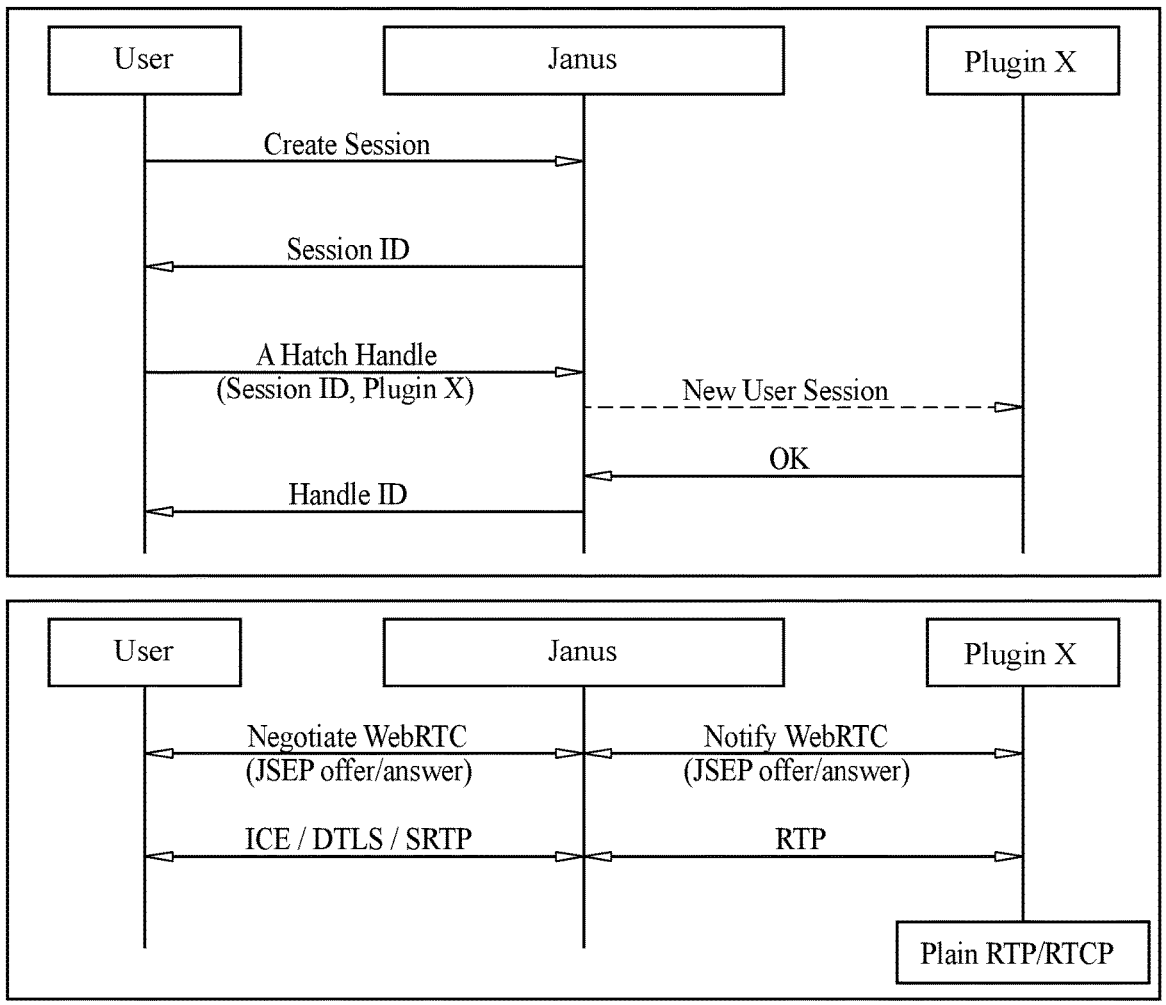

Each Plugin is a Feature:
- Webinar
- Video Communications in Social Networks
  CSIP Plugin (calls) + Echo Test + Voice Mail Messages
- Social TV
  (Streaming + Video Room)

Janus Can be used to Enhance WebRTC. These include:
- Web Conferencing and Webinars
- WebRTC-to-SIP Gateway
- Streaming Live Events Many Businesses are using Janus - WebRTC
- TV Broadcasting
- Home Automation
- Internet of Things (IOT)
- Mobile Devices
- Raspberry Pi's
- Drones

FIG. 55

Janus WebRTC Video Conferencing

Diagram of how 3 Participants connect to the Janus Video Room Plugin to Start a Video Room and Publish Media and Subscribe to the other Participants Videos using WebRTC.

SECURE WEB RTC REAL TIME COMMUNICATIONS SERVICE FOR AUDIO AND VIDEO STREAMING COMMUNICATIONS

BACKGROUND

The embodiments described herein relate generally to communications systems, and in particular to methods and systems for providing a secure real-time communications service (SRTCS) for audio and video streaming communications and content sharing that securely connects multiple users using a proprietary application that uses WebRTC technology to establish a Peer-to-Peer (P2P) connection.

Multiple video and audio messaging systems have been developed recently. However, many systems require proprietary hardware and software systems, and are complicated to set up for an average user. Systems that are easy to set up and use often provide low quality video and audio. Commercial grade systems provide high quality video and audio, but these systems are expensive to install and require specialized technical support to operate and maintain.

WebRTC (web real-time communications) is a very exciting, powerful, and highly disruptive cutting-edge technology and standard that has been developed over the last decade. As opposed to specialized applications and hardware, WebRTC leverages a set of plugin-free APIs used in both desktop and mobile browsers to provide high-quality functional video and audio streaming services. Previously, external plugins were required in order to achieve similar functionality to that provided by WebRTC.

WebRTC uses multiple standards and protocols, including data streams, STUN/TURN servers, signaling, JSEP, ICE, SIP, SDP, NAT, UDP/TCP, and network sockets.

However, there continues to be a need for security, encryption, DRM protection, and the advantages provided by incorporating blockchain technology for storage and sharing of streamed video, streamed audio, real-time messages, and DRM-protected files.

SUMMARY

The embodiments described herein are directed to methods and systems for providing a secure real-time communications service (SRTCS) for audio and video streaming communications and content sharing that securely connects users using a proprietary application that uses WebRTC technology to establish a Peer-to-Peer (P2P) connection.

SRTCS uniquely combines advanced security technologies to provide user based permissions control when communicating and sharing rich media content with other users including End-to-End Encryption (E2EE), Hash Technology (DHT), and Digital Rights Protection (DRM). SRTCS has also designed a unique cloud based streamed video storage and sharing platform service for consumers and business video storage and sharing applications.

The invention provides push-button connectivity between users for video and audio streaming using WebRTC technology for a cloud service to discover and establish peer-to-peer connection between users having a proprietary mobile or desktop application. Using the inventive app, a sender may select one or more receivers, who also have the inventive app, to have a video or audio chat, or share a file. Selecting the receiver(s) to send an invite initiates a complex group of processes, programming, and protocols, including generating a specific discovery communication file, sending the discovery communication file in a series of specially encrypted communications to a networked cloud platform that includes a WebRTC Gateway Server, a Signalling Server, a Cloud Storage Server, and a Private Blockchain. The WebRTC Gateway Server forwarding the discovery communication to the receiver using subscriber information managed in a private blockchain and stored in distributed cloud storage with all lookup and delivery communications and all stored data specially encrypted. The receiver app generating a specific response/acceptance file, sent encrypted back to the WebRTC Gateway Server, and the WebRTC Gateway Server working with the Signalling Server to generate a peer to peer connection using the private and public IP addresses of the sender and receiver. The sender may apply DRM permissions to the streamed video or audio content in the peer to peer connection and the app uses an encryption key that is integrated into and required for the playback CODEC to process the content and where a DRM violation results in revocation of the encryption key. Multi-party video and audio conferences may be broadcast using insertable streams for insertion of user defined processing steps for encoding/decoding of WebRTC media stream tracks and for end-to-end encryption of the encoded data.

BRIEF DESCRIPTION OF THE FIGURES

FIG. 9 is a flowchart illustrating a non-limiting preferred embodiment of a Web RTC Middlebox Security Issues and shows a DTLS peer encryption designed for PcP connection between you users with SFU, DTLS peer encryption fails to encrypt multiple video streams.

FIG. 16 is a flowchart illustrating a non-limiting preferred embodiment of a DRM Functional Architecture.

FIG. 30 is a flowchart illustrating a non-limiting preferred embodiment of VODEO apps connected in P2P connection and in a Blockchain Network with Group Node Coupling and Distributed Hash Tables.

FIG. 55 is a flowchart illustrating a non-limiting preferred embodiment of a Janus Extensible Architecture and API.

DETAILED DESCRIPTION

Figure 1:
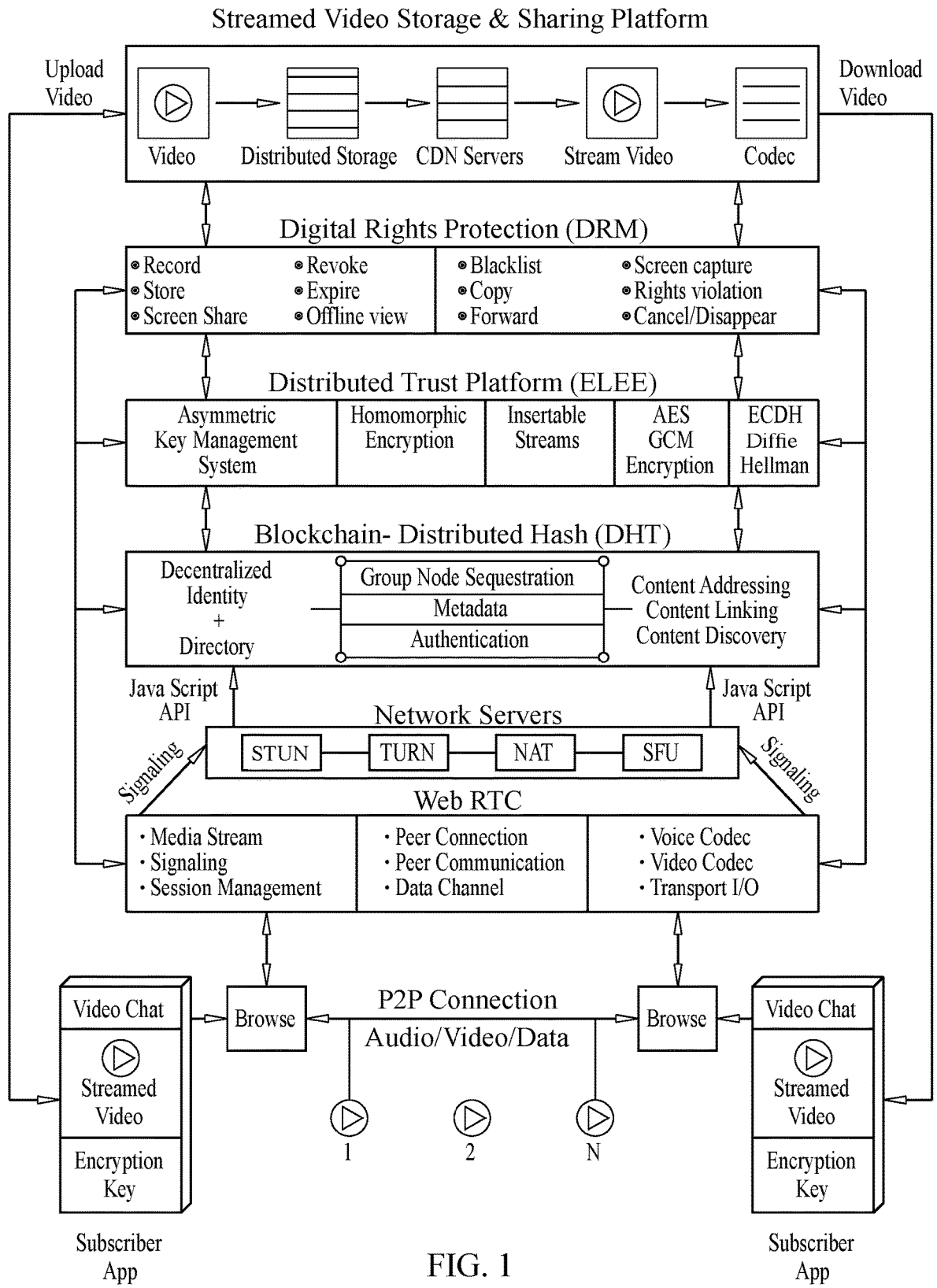
FIG. 1 is a flowchart illustrating a non-limiting preferred embodiment of the Secure RTC Service system architecture and streamed video storage and sharing platform.

Disclosed are embodiments directed to methods and systems for providing a secure real-time communications service (SRTCS) for audio and video streaming communications and content sharing that securely connects users using a proprietary application that uses WebRTC technology to establish a Peer-to-Peer (P2P) connection and to a Cloud Server for sharing files.

SRTCS uniquely combines advanced security technologies to provide user based permissions control when communicating and sharing rich media content with other users including End-to-End Encryption (E2EE), Distributed Hash Technology (DHT), and Digital Rights Protection (DRM). SRTCS has also designed a unique cloud based streamed video storage and sharing platform service for consumers and business video storage and sharing applications.

The invention provides an easy to use push-button connectivity between users for video and audio streaming using WebRTC technology for a cloud service to discover and establish peer-to-peer connection between users having a proprietary mobile or desktop application. Using the inventive app, a sender may select one or more receivers, who also have the inventive app, to have a video or audio chat, or share a file. Selecting the receiver(s) to send an invite initiates a complex group of processes, programming, and protocols, including generating a specific discovery communication file, sending the discovery communication file in a series of specially encrypted communications to a networked cloud platform that includes a WebRTC Gateway Server, a Signalling Server, a Cloud Storage Server, and a Private Blockchain. The WebRTC Gateway Server forwarding the discovery communication to the receiver using subscriber information managed in a private blockchain and stored in distributed cloud storage with all lookup and delivery communications and all stored data specially encrypted. The receiver app generating a specific response/acceptance file, sent encrypted back to the WebRTC Gateway Server, and the WebRTC Gateway Server working with the Signalling Server to generate a peer to peer connection using the private and public IP addresses of the sender and receiver. The sender may apply DRM permissions to the streamed video or audio content in the peer to peer connection and the app uses an encryption key that is integrated into and required for the playback CODEC to process the content and where a DRM violation results in revocation of the encryption key. Multi-party video and audio conferences may be broadcast using insertable streams for insertion of user defined processing steps for encoding/decoding of WebRTC media stream tracks and for end-to-end encryption of the encoded data.

In a preferred embodiment, the invention provides a method, comprising:

Sending, in a WebRTC chat application on a first communication device, a telephone number of the first communication device, a private device IP address of the first communication device, and a JSON SMS message invite which includes a second telephone phone number of a second communication device, the JSON SMS message containing an invite to join a video/audio chat session, to a WebRTC-Gateway Server to mediate media communications and exchange JSON messages and RTP/RTCP messages with the second communication device, Sending, in a WebRTC chat application on the second communication device, a JSON SMS message reply containing an answer (accept/decline) to the invite and a private IP address of the second communication device to the WebRTC-Gateway Server, Establishing a communication between the WebRTC-Gateway Server and a Signaling Server, said Signaling server used to provide communication discovery and media format negotiation between the first communication device and the second communication device by a first communication device connection offer and a second communication device acceptance reply based on connecting a public-private IP address of the first communication device to a public-private IP address of the second communication device, Establishing an encrypted WebRTC peer-to-peer video and/or audio connection between the WebRTC chat application of the first communication device and the WebRTC chat application of the second communication device, and deploying an advanced security technology module to provide user-based permission control when communicating and sharing rich media content including AES 256 Galois/Counter mode (GCM), Elliptical-curve Diffie Hellman encryption, and a asymmetrical key management system, Providing a Private Blockchain module connected to the WebRTC-Gateway Server to provide a permission-based access control layer to govern network access by the first communication device and the second communication device and to generate an immutable record of all WebRTC transactions between the first communication device and the second communication device, Providing a Distributed Ledger Technology (DLT) module connected to the WebRTC-Gateway Server for recording WebRTC transactions including video chat and audio chat where blocks containing transactions and user personally identifiable information (PII) are stored and recorded in distributed blocks in multiple locations, Searching and connecting users using group node coupling to access data when a user initiates a video chat or audio chat, Providing a DRM module to apply user permissions relating to video/audio streaming on a P2P connection, said user permissions including blocking video recording, playback, screenshot disablement, expiration, revocation, and watermarking, and Providing a secret video chat module using DRM control and ECDH encryption to prevent video recording/playback using an encrypted key with expiration and revocation controls.

Any of the methods provided herein may include an embodiment, wherein the WebRTC chat application comprises video chat and voice chat.

Any of the methods provided herein may include an embodiment comprising saving a chat session comprising the video chat and the voice chat, in an encrypted communication between the first communication device and a Cloud Storage Server connected to the first communication device, wherein the video chat and voice chat are stored by the Cloud Storage Server.

Any of the methods provided herein may include an embodiment wherein the Cloud Storage Server uses a Distributed Hash Table, and wherein the telephone number of the first communication device is a key mapped to a second value that is the chat session.

Any of the methods provided herein may include an embodiment comprising: assigning, in a menu of the WebRTC chat application on the first communication device, a DRM permission to the chat session saved to the Cloud Storage Server, wherein the DRM permission is selected from the group consisting of: record, not record, store, screen share, revoke, expire, offline view, blacklist, copy, forward, screen capture, rights violation, and cancel/disappear.

Any of the methods provided herein may include an embodiment comprising: rendering, in a rendering module of the Cloud Storage Server, an HTML file of the saved chat session, the HTML file stored in the Cloud Storage Server and having a URL link associated therewith.

Any of the methods provided herein may include an embodiment comprising: enforcing the DRM permission of the chat session, said Cloud Storage Server in encrypted communication with the second communication device, said second communication device having the WebRTC chat application operatively connected to the WebRTC browser of the second communication device to access, using the URL link, the HTML file of the saved chat session saved in the Cloud Storage Server, wherein the saved chat session is rendered on the Cloud Storage Server, and said WebRTC chat application enforces the DRM permission of the saved chat session using a DRM enforcement module in the WebRTC chat application, and said DRM enforcement module configured to send an enforcement command when a DRM permission violation is detected to revoke an encryption key that encrypts an electronic signal between the WebRTC chat application and the WebRTC browser, wherein the electronic signal is between a CODEC in the WebRTC browser and a playback component or module for a speaker or display of the second communication device.

Any of the methods provided herein may include an embodiment wherein the WebRTC chat application comprises a Private Blockchain module in communication with the Cloud Storage Server to provide user identity, authentication, a digital hash, node coupling, personally-identifiable information (PII) security, content linking, content searching, and content addressing.

Any of the methods provided herein may include an embodiment wherein the WebRTC chat application comprises a hardware security module in communication with the Cloud Storage Server to provide AES 256 GCU encryption, and ECDH Diffie-Hellman encryption for audio and video streams.

Any of the methods provided herein may include an embodiment wherein the WebRTC chat application comprises a key management module in communication with the WebRTC-Gateway Server and the Signaling Server to provide homomorphic encryption of a communication between the WebRTC-Gateway Server and the Signaling Server, said homomorphic encryption allowing the Signaling Server to extract the private IP address without decrypting the JSON SMS message.

Any of the methods provided herein may include an embodiment wherein the WebRTC chat application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption.

Any of the methods provided herein may include an embodiment wherein the first communication device is selected from a mobile communication device, a desktop computer communication device, and a tablet communication device.

In another preferred embodiment, the invention may include a method, comprising:

Sending, in a WebRTC chat application on a first communication device, a telephone number of the first communication device, a private device IP address of the first communication device, and a JSON SMS message invite which includes a second telephone phone number of a second communication device, the JSON SMS message containing an invite to join a video/audio chat session, to a WebRTC-Gateway Server to mediate media communications and exchange JSON messages and RTP/RTCP messages with the second communication device, Sending, in a WebRTC chat application on the second communication device, a JSON SMS message reply containing an answer (accept/decline) to the invite and a private IP address of the second communication device to the WebRTC-Gateway Server, Establishing a communication between the WebRTC-Gateway Server and a Signaling Server, said Signaling server used to provide communication discovery and media format negotiation between the first communication device and the second communication device by a first communication device connection offer and a second communication device acceptance reply based on connecting a public-private IP address of the first communication device to a public-private IP address of the second communication device, Establishing an encrypted WebRTC peer-to-peer video and/or audio connection between the WebRTC chat application of the first communication device and the WebRTC chat application of the second communication device, and deploying an advanced security technology module to provide user-based permission control when communicating and sharing rich media content including AES 256 Galois/Counter mode (GCM), Elliptical-curve Diffie Hellman encryption, and a asymmetrical key management system, Providing a Private Blockchain module connected to the WebRTC-Gateway Server to provide a permission-based access control layer to govern network access by the first communication device and the second communication device and to generate an immutable record of all WebRTC transactions between the first communication device and the second communication device, Providing a Distributed Ledger Technology (DLT) module connected to the WebRTC-Gateway Server for recording WebRTC transactions including video chat and audio chat where blocks containing transactions and user personally identifiable information (PII) are stored and recorded in distributed blocks in multiple locations, Searching and connecting users using group node coupling to access data when a user initiates a video chat or audio chat, Providing a DRM module to apply user permissions relating to video/audio streaming on a P2P connection, said user permissions including blocking video recording, playback, screenshot disablement, expiration, revocation, and watermarking, and Providing a secret video chat module using DRM control and ECDH encryption to prevent video recording/playback using an encrypted key with expiration and revocation controls;

wherein the WebRTC chat application comprises video chat and voice chat, wherein a chat session comprising the video chat and the voice chat, is saved in an encrypted communication between the first communication device and a Cloud Storage Server connected to the first communication device, wherein the video chat and voice chat are stored by the Cloud Storage Server, wherein the Cloud Storage Server uses a Distributed Hash Table, and wherein the telephone number of the first communication device is a key mapped to a second value that is the chat session, and Assigning, in a menu of the WebRTC chat application on the first communication device, a DRM permission to the chat session saved to the Cloud Storage Server, wherein the DRM permission is selected from the group consisting of: record, not record, store, screen share, revoke, expire, offline view, blacklist, copy, forward, screen capture, rights violation, and cancel/disappear, Rendering, in a rendering module of the Cloud Storage Server, an HTML file of the saved chat session, the HTML file stored in the Cloud Storage Server and having a URL link associated therewith, Enforcing the DRM permission of the chat session, said Cloud Storage Server in encrypted communication with the second communication device, said second communication device having the WebRTC chat application operatively connected to the WebRTC browser of the second communication device to access, using the URL link, the HTML file of the saved chat session saved in the Cloud Storage Server, wherein the saved chat session is rendered on the Cloud Storage Server, and said WebRTC chat application enforces the DRM permission of the saved chat session using a DRM enforcement module in the WebRTC chat application, and said DRM enforcement module configured to send an enforcement command when a DRM permission violation is detected to revoke an encryption key that encrypts an electronic signal between the WebRTC chat application and the WebRTC browser, wherein the electronic signal is between a CODEC in the WebRTC browser and a playback component or module for a speaker or display of the second communication device, wherein the WebRTC chat application comprises a Private Blockchain module in communication with the Cloud Storage Server to provide user identity, authentication, a digital hash, node coupling, personally-identifiable information (PII) security, content linking, content searching, and content addressing, wherein the WebRTC chat application comprises a hardware security module in communication with the Cloud Storage Server to provide AES 256 GCU encryption, and ECDH Diffie-Hellman encryption for audio and video streams, wherein the WebRTC chat application comprises a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message, wherein the WebRTC chat application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption, and wherein the first communication device is selected from a mobile communication device, a desktop computer communication device, and a tablet communication device.

In another preferred embodiment, the invention includes a communication system and sharing platform, comprising:
- a WebRTC chat application of a first communication device having program instructions saved to memory and executable on a processor to establish an encrypted peer-to-peer chat communication with a second communication device having said WebRTC chat application,
- a WebRTC-Gateway Server having program instructions saved to memory and executable on a processor to provide communication discovery and media format negotiation between the first communication device and the second communication device,
- a Signaling Server connected to the WebRTC-Gateway Server, e.g. Janus Server, said Signaling Server having program instructions saved to memory and executable on a processor to provide a public-private IP address to the first communication device in response to a JSON SMS invite to join a video/audio chat session and to provide a public-private IP address the second communication device in response to an acceptance reply,
- said WebRTC chat application having program instructions to:
  Send, in the WebRTC chat application on the first communication device, a telephone number of the first communication device, a private device IP address of the first communication device, and a JSON SMS message invite which includes a second telephone phone number of a second communication device, the JSON SMS message containing an invite to join the video/audio chat session, to the WebRTC-Gateway Server to mediate media communications and exchange JSON messages and RTP/RTCP messages with the second communication device,
  Send, in the WebRTC chat application on the second communication device, a JSON SMS message reply containing an answer (accept/decline) to the invite and a private IP address of the second communication device to the WebRTC-gateway Server,
  said WebRTC-Gateway Server and a Signaling Server having program instructions to provide communication discovery and media format negotiation between the first communication device and the second communication device by a first communication device connection offer and a second communication device acceptance reply based on connecting the public-private IP address of the first communication device to the public-private IP address of the second communication device,
  and establish an encrypted WebRTC peer-to-peer video and/or audio connection between the WebRTC chat application of the first communication device and the WebRTC chat application of the second communication device, and deploy an advanced security technology module to provide user-based permission control when communicating and sharing rich media content including AES 256 Galois/Counter mode (GCM), Elliptical-curve Diffie Hellman encryption, and a asymmetrical key management system,
  Provide a Private Blockchain module connected to the WebRTC-Gateway Server to provide a permission-based access control layer to govern network access by the first communication device and the second communication device and to generate an immutable record of all WebRTC transactions between the first communication device and the second communication device,
  Provide a Distributed Ledger Technology (DLT) module connected to the WebRTC-Gateway Server for recording WebRTC transactions including video chat and audio chat where blocks containing transactions and user personally identifiable information (PII) are stored and recorded in distributed blocks in multiple locations,
  Search and connect users using group node coupling to access data when a user initiates a video chat or audio chat,
  Provide a DRM module to apply user permissions relating to video/audio streaming on a P2P connection, said user permissions including blocking video recording, playback, screenshot disablement, expiration, revocation, and watermarking, and
  Provide a secret video chat module using DRM control and ECDH encryption to prevent video recording/playback using an encrypted key with expiration and revocation controls;
  wherein the WebRTC chat application comprises video chat and voice chat,
  wherein a chat session comprising the video chat and the voice chat, is saved in an encrypted communication between the first communication device and a Cloud Storage Server connected to the first communication device, wherein the video chat and voice chat are stored by the Cloud Storage Server,
  wherein the Cloud Storage Server uses a Distributed Hash Table, and wherein the telephone number of the first communication device is a key mapped to a second value that is the chat session, and
  in a menu of the WebRTC chat application on the first communication device, assign a DRM permission to the chat session saved to the Cloud Storage Server, wherein the DRM permission is selected from the group consisting of: record, not record, store, screen share, revoke, expire, offline view, blacklist, copy, forward, screen capture, rights violation, and cancel/disappear,
  Render, in a rendering module of the Cloud Storage Server, an HTML file of the saved chat session, the HTML file stored in the Cloud Storage Server and having a URL link associated therewith,
  Enforce the DRM permission of the chat session using a DRM enforcement module in the Cloud Storage Server, said Cloud Storage Server in encrypted communication with the second communication device, said second communication device having the WebRTC chat application operatively connected to the WebRTC browser of the second communication device to access, using the URL link, the HTML file of the saved chat session saved in the Cloud Storage Server, wherein the saved chat session is rendered on the Cloud Storage Server, and said WebRTC chat application enforces the DRM permission of the saved chat session using a DRM enforcement module in the WebRTC chat application, and said DRM enforcement module configured to send an enforcement command when a DRM permission violation is detected to revoke an encryption key that encrypts an electronic signal between the WebRTC chat application and the WebRTC browser, wherein the electronic signal is between a CODEC in the WebRTC browser and a playback component or module for a speaker or display of the second communication device,
  wherein the WebRTC chat application comprises a Private Blockchain module in communication with the Cloud Storage Server to provide user identity, authentication, a digital hash, node coupling, personally-identifiable information (PII) security, content linking, content searching, and content addressing, wherein the WebRTC chat application comprises a hardware security module in communication with the Cloud Storage Server to provide AES 256 GCU encryption, and ECDH Diffie-Hellman encryption for audio and video streams, wherein the WebRTC chat application comprises a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message, wherein the WebRTC chat application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption, and wherein the first communication device is selected from a mobile communication device, a desktop computer communication device, and a tablet communication device.

In another preferred embodiment, the invention includes a communication system and sharing platform, comprising:
  a WebRTC chat application of a first communication device having program instructions saved to memory and executable on a processor to establish an encrypted peer-to-peer chat communication with a second communication device having said WebRTC chat application,
  said WebRTC chat application having a discovery module with program instructions to send a discovery request to obtain an IP address paired with a telephone number of the second communication device, wherein the WebRTC chat application is installed on the second communication device,
  said WebRTC chat application having a blockchain module to connect the first communication device as a first node to the second communication device as a second node in a Private Blockchain network,
  the WebRTC chat application having an invite module to send an invite message to a chat session from the first communication device to the IP address of the second communication device through a WebRTC browser extension to a WebRTC signaling server operatively connected to the Private Blockchain network; and
  the WebRTC chat application having an accept-connection module to establish encrypted WebRTC peer-to-peer connection between the WebRTC browser of the first communication device and a second WebRTC browser of the second communication device in response to an acceptance by the second communication device of the invite sent by the first communication device, and
  the WebRTC chat application having a video chat module and a voice chat module.

Any of the communication systems and sharing platforms provided herein may include a Saving Module in the WebRTC chat application to transmit the chat session, in an encrypted communication between the first communication device and a Cloud Storage Server, using a distributed hash table, wherein the telephone number of the first communication device is a key mapped to a second value that is a saved chat session.

Any of the communication systems and sharing platforms provided herein may include a DRM Module in the WebRTC chat application to assign, using a menu of the WebRTC chat application on the first communication device, a DRM permission to the chat session saved to the Cloud Storage Server network, wherein the DRM permission is selected from the group consisting of: record, not record, store, screen share, revoke, expire, offline view, blacklist, copy, forward, screen capture, rights violation, and cancel/disappear.

Any of the communication systems and sharing platforms provided herein may include a Rendering Module in the WebRTC chat application to render in the Cloud Storage Server, an HTML file of the saved chat session, the HTML file stored in the Cloud Storage Server and having a URL link associated therewith.

Any of the communication systems and sharing platforms provided herein may include a DRM Enforcement Module in the WebRTC chat application to enforce the DRM permission of the chat session, and having programming instructions wherein said Cloud Storage Server is in encrypted communication with the second communication device, said second communication device having the WebRTC chat application operatively connected to the WebRTC browser of the second communication device to access, using the URL link, the HTML file of the saved chat session and rendering the saved chat session on the Cloud Storage Server, and said WebRTC chat application enforces the DRM permission of the saved chat session using the DRM enforcement module in the WebRTC chat application, and said DRM enforcement module configured to send an enforcement command when a DRM permission violation is detected to revoke an encryption key that encrypts an electronic signal between the WebRTC chat application and the WebRTC browser, wherein the electronic signal is between a CODEC in the WebRTC browser and a playback component or module for a speaker or display of the second communication device.

Any of the communication systems and sharing platforms provided herein may include a Private Blockchain Module in the WebRTC chat application to communicate with the Cloud Storage Server and provide user identity, authentication, a digital hash, node coupling, personally-identifiable information (PII) security, content linking, content searching, and content addressing.

Any of the communication systems and sharing platforms provided herein may include a Hardware Security Module in the WebRTC chat application to communicate with the Cloud Storage Server to provide AES 256 GCU encryption, and ECDH Diffie-Hellman encryption for audio and video streams.

Any of the communication systems and sharing platforms provided herein may include a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message.

Any of the communication systems and sharing platforms provided herein may include wherein the first communication device is selected from a mobile communication device, a desktop computer communication device, and a tablet communication device.

In yet another preferred embodiment, the invention includes a system for secure real-time communications and a sharing platform, comprising:
  a DRM-WebRTC chat application of a first communication device having program instructions saved to memory and executable on a processor to assign a DRM permission to an electronic object stored on the first communication device, and to encrypt an electronic signal between the DRM-WebRTC chat application and a Cloud Server in operative association with the DRM-WebRTC chat application;

said first communication device connected by a peer-to-peer connection to a second communication device using a WebRTC platform established by the DRM-WebRTC chat application for transmitting and receiving a real-time duplex media stream, said real-time duplex media stream encrypted in transit from the first communication device to the second communication device, said real-time duplex media stream selected from the group consisting of a video chat, an audio chat, and a data transfer;

said first communication device in encrypted communication with the Cloud Server using the DRM-WebRTC chat application having program instructions saved to memory and executable on the processor to transmit and receive the electronic object with the Cloud Server, said DRM permission stored on the first communication device;

said Cloud Server having program instructions saved to cloud memory and executable on a cloud processor to receive and store the electronic object sent from the first communication device, and to render, by a Cloud Server rendering module, an HTML file of the electronic object, the HTML file stored in the cloud memory and having a URL link associated therewith, and said Cloud Server having program instructions to enforce the DRM permission of the electronic object, said Cloud Server in encrypted communication with the second communication device, said second communication device having the DRM-WebRTC chat application saved to memory and executable on a processor of the second communication device, the DRM-WebRTC chat application having a browser associated therewith to access, using the URL link, the HTML file of the electronic object saved on the Cloud Server, and to enforce the DRM permission of the electronic object using a DRM enforcement module of the DRM-WebRTC chat application, wherein the electronic object is rendered on the Cloud Server;

said DRM enforcement module configured to send an enforcement command, encrypted in transit, through the Cloud Server to the second communication device when a DRM permission violation is detected, said DRM enforcement module revoking the encryption key that encrypted the electronic signal between the DRM-WebRTC chat application and the web browser, wherein the electronic signal is between a CODEC in the browser and a playback component or module for a speaker or display of the second communication device.

Any of the computer-implemented systems provided herein may include wherein the DRM permission is selected from the group consisting of: record, not record, store, screen share, revoke, expire, offline view, blacklist, copy, forward, screen capture, rights violation, and cancel/disappear.

Any of the computer-implemented systems provided herein may include wherein the electronic object is stored on the Cloud Server using distributed storage.

Any of the computer-implemented systems provided herein may include wherein the DRM-WebRTC chat application comprises a secret chat module that disables saving the real-time duplex media stream to the first and second communication devices.

Any of the computer-implemented systems provided herein may include wherein the WebRTC platform comprises a Private Blockchain module in communication with a WebRTC network server to provide user identity, authentication, a digital hash, node coupling, personally-identifiable information (PII) security, content linking, content searching, and content addressing.

Any of the computer-implemented systems provided herein may include wherein the WebRTC platform comprises a hardware security module in communication with a WebRTC network server to provide AES 256 GCU encryption, and ECDH Diffie-Hellman encryption for audio and video streams.

Any of the computer-implemented systems provided herein may include wherein the WebRTC platform comprises a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message.

Any of the computer-implemented systems provided herein may include wherein the WebRTC chat application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption.

Any of the computer-implemented systems provided herein may include wherein the Cloud Server comprises a CDN server.

Any of the computer-implemented systems provided herein may include wherein the first communication device is selected from a mobile communication device, a desktop computer communication device, and a tablet communication device.

Any of the embodiments of the invention herein may use JavaScript and/or JSON messages for the discovery and establishment of the peer-to-peer connection mediated by (transmitted between) a cloud server/gateway server and the mobile or desktop app of the users.

Any of the embodiments of the invention herein may use Private Blockchain technology to manage user identity and establish tamper-resistant records within contact-list defined groups, and for managing media storage and access in a cloud server.

Any of the embodiments of the invention herein may use distributed hash tables to establish key-values with keys distributed among nodes findable with a routing algorithm.

Any of the embodiments of the invention herein may use a Gateway Server, such as for example a Janus Gateway Server, to relay discovery and connection messages and integrate server-side plugins for video calls, voice mail, streaming media, SIP, audio bridging, video conferencing, recording, and playback.

Any of the embodiments of the invention herein may use a signaling server operatively connected to the Gateway Server to facilitate sender/receiver discovery, IP address matching, and media format negotiation and conversion.

Any of the embodiments of the invention herein may use end-to-end encryption in the peer-to-peer connection between connected user apps, and in the connection between a user app and the cloud or gateway servers.

Any of the embodiments of the invention herein may use digital rights management (DRM) to apply permissions to stored media and to enforce a permissions violation by revoking an encryption key required for CODEC functionality.

Any of the embodiments herein may include an invention that provides a method, comprising: (i) Sending an SMS invite message in JSON format, in a WebRTC chat application on a first communication device, to a telephone number of a second communication device, the SMS invite providing an IP address of the first communication device, (ii) Sending an SMS reply in JSON format, in the WebRTC chat application on the second communication device, to a telephone number of the first communication device, the SMS reply notifying acceptance of the SMS invite and providing an IP address of the second communication device, (iii) Sending, in the WebRTC chat application on the first communication device, an invite to a chat session to the IP address of the second communication device through a WebRTC browser extension to a WebRTC signaling server operatively connected to a Private Blockchain network; and (iv) Establishing an encrypted WebRTC peer-to-peer connection between the WebRTC browser of the first communication device and a second WebRTC browser of the second communication device in response to an acceptance by the second communication device of the invite sent by the first communication device.

Any of the embodiments herein may include wherein the WebRTC chat application comprises video chat and voice chat.

Any of the embodiments herein may include wherein the WebRTC chat application uses a distributed hash table wherein a Cloud Server stores the telephone number of the second communication device as a key mapped to a value that is the IP address of the second communication device.

Any of the embodiments herein may include wherein the method comprising saving a chat session comprising the video chat and the voice chat, in an encrypted communication between the first communication device and an Cloud Server in an network connected to the first communication device, wherein the video chat and voice chat are stored by the Cloud Server in the network connected to the first communication device, the network using a distributed hash table, and wherein the telephone number of the first communication device is a key mapped to a second value that is the chat session.

Any of the embodiments herein may include wherein the invention provides a secure real-time communication system comprising (i) a Browser-to-Browser, Peer-to-Peer (P2P) Communications Network and Platform based on WebRTC, (ii) a Distributed Trust Platform, (iii) a Private Permissioned_Blockchain, (iv) a Digital Rights Protection (DRM) component, (v) a Streamed Video Storage and On-Line Video Sharing Platform and Service, and (vi) a Real Time messaging App for mobile platforms and desktop computers, integrated to provide secure, easy to use video and audio messaging and storage service for consumers and businesses.

Any of the embodiments herein may include wherein the Browser-to-Browser, Peer-to-Peer (P2P) Communications Network and Platform based on WebRTC may employ JavaScript API's, WebRTC Protocols, WebRTC Network Servers, and WebRTC Security Features.

Any of the embodiments herein may include wherein the Distributed Trust Platform may employ AES 256 Galois/Counter Mode (AES-GCM), Elliptic-curve Diffie-Hellman (ECDH), Homomorphic Encryption, Insertible Media Streams, a Key Management System, Asymmetric Keys, a Hardware Security Module (HSM), and a Digital Signature.

Any of the embodiments herein may include wherein the Private Permissioned_Blockchain may include Distributed Ledger Technology (DLT), Group Node Coupling and Distributed Identities, Distributed Hash Tables—Cryptographic Hashing, Public Key Cryptography, and Merkle Trees.

Any of the embodiments herein may include wherein the invention employs Digital Rights Protection (DRM), and Streamed Video Storage and On-Line Video Sharing Platform and Service having DRM Protection, employing Blockchain, and providing a Video Storage Platform.

Any of the embodiments herein may include wherein the invention includes a Real Time messaging App for mobile platforms and desktop computers Any of the embodiments herein may include an invention that provides a method, comprising: (i) Sending an SMS invite message in JSON format, in a WebRTC chat application on a first communication device, to a telephone number of a second communication device, the SMS invite providing an IP address of the first communication device, (ii) Sending an SMS reply in JSON format, in the WebRTC chat application on the second communication device, to a telephone number of the first communication device, the SMS reply notifying acceptance of the SMS invite and providing an IP address of the second communication device, (iii) Sending, in the WebRTC chat application on the first communication device, an invite to a chat session to the IP address of the second communication device through a WebRTC browser extension to a WebRTC signaling server operatively connected to a Private Blockchain network; and (iv) Establishing an encrypted WebRTC peer-to-peer connection between the WebRTC browser of the first communication device and a second WebRTC browser of the second communication device in response to an acceptance by the second communication device of the invite sent by the first communication device.

Any of the embodiments herein may include wherein the WebRTC chat application comprises video chat and voice chat.

Any of the embodiments herein may include wherein the WebRTC chat application uses a distributed hash table wherein a Cloud Server stores the telephone number of the second communication device as a key mapped to a value that is the IP address of the second communication device.

Any of the embodiments herein may include wherein the method comprising saving a chat session comprising the video chat and the voice chat, in an encrypted communication between the first communication device and a Cloud Server in a network connected to the first communication device, wherein the video chat and voice chat are stored by the Cloud Server in the network connected to the first communication device, the network using a distributed hash table, and wherein the telephone number of the first communication device is a key mapped to a second value that is the chat session.

Any of the preferred embodiments disclosed herein may employ a secure real-time communication system comprising (i) a Browser-to-Browser, Peer-to-Peer (P2P) Communications Network and Platform based on WebRTC, (ii) a Distributed Trust Platform, (iii) a Private Permissioned_ Blockchain, (iv) a Digital Rights Protection (DRM) component, (v) a Streamed Video Storage and On-Line Video Sharing Platform and Service, and (vi) a Real Time messaging App for mobile platforms and desktop computers, integrated to provide secure, easy to use video and audio messaging and storage service for consumers and businesses.

Any of the preferred embodiments disclosed herein include where the Browser-to-Browser, Peer-to-Peer (P2P) Communications Network and Platform based on WebRTC may employ JavaScript API's, WebRTC Protocols, WebRTC Network Servers, and WebRTC Security Features.

Any of the preferred embodiments disclosed herein include where the Distributed Trust Platform may employ AES 256 Galois/Counter Mode (AES-GCM), Elliptic-curve Diffie-Hellman (ECDH), Homomorphic Encryption, Insertable Media Streams, a Key Management System, Asymmetric Keys, a Hardware Security Module (HSM), and a Digital Signature.

Any of the preferred embodiments disclosed herein include where the Private Permissioned_Blockchain may include Distributed Ledger Technology (DLT), Group Node Coupling and Distributed Identities, Distributed Hash Tables—Cryptographic Hashing, Public Key Cryptography, and Merkle Trees.

Any of the preferred embodiments disclosed herein include where the invention employs Digital Rights Protection (DRM), and Streamed Video Storage and On-Line Video Sharing Platform and Service having DRM Protection, employing Blockchain, and providing a Video Storage Platform.

Any of the preferred embodiments disclosed herein include where the invention includes a Real Time messaging App for mobile platforms and desktop computers.

In another preferred embodiment, the invention includes a method, comprising:

STEP 1. Establishing an encrypted connection between a first communication device and a second communication device using a Cloud Server, using a DRM-WebRTC application;

STEP 2. Sharing an HTML link to a DRM-restricted electronic object between the first communication device and the second mobile communication device, said HTML link to the DRM-restricted electronic object saved on the Cloud Server, said DRM-restricted electronic object having DRM permissions assigned by the DRM-WebRTC application and stored on the first communication device; and STEP 3. Accessing the DRM-restricted electronic object using the HTML link using a browser of the second communication device and rendering the DRM-restricted electronic object on the Cloud Server, wherein said accessing is encrypted in transit.

Any of the preferred embodiment disclosed herein include a DRM-WebRTC system, comprising:

a DRM-WebRTC chat application of a first communication device having program instructions saved to memory and executable on a processor to assign a DRM permission to an electronic object stored on the first communication device, and to encrypt an electronic signal between the DRM-WebRTC chat application and a Cloud Server in operative association with the DRM-WebRTC chat application;

said first communication device connected by a peer-to-peer connection to a second communication device using a WebRTC platform established by the DRM-WebRTC chat application for transmitting and receiving a real-time duplex media stream, said real-time duplex media stream encrypted in transit from the first communication device to the second communication device, said real-time duplex media stream selected from the group consisting of a video chat, an audio chat, and a data transfer;

said first communication device in encrypted communication with the Cloud Server using the DRM-WebRTC chat application having program instructions saved to memory and executable on the processor to transmit and receive the electronic object with the Cloud Server, said DRM permission stored on the first communication device;

said Cloud Server having program instructions saved to cloud memory and executable on a cloud processor to receive and store the electronic object sent from the first communication device, and to render, by a Cloud Server rendering module, an HTML file of the electronic object, the HTML file stored in the cloud memory and having a URL link associated therewith, and said Cloud Server having program instructions to enforce the DRM permission of the electronic object, said Cloud Server in encrypted communication with the second communication device, said second communication device having the DRM-WebRTC chat application saved to memory and executable on a processor of the second communication device, the DRM-WebRTC chat application having a browser associated therewith to access, using the URL link, the HTML file of the electronic object saved on the Cloud Server, and to enforce the DRM permission of the electronic object using a DRM enforcement module of the DRM-WebRTC chat application, wherein the electronic object is rendered on the Cloud Server;

said DRM enforcement module configured to send an enforcement command, encrypted in transit, through the Cloud Server to the second communication device when a DRM permission violation is detected, said DRM enforcement module revoking the encryption key that encrypted the electronic signal between the DRM-WebRTC chat application and the web browser, wherein the electronic signal is between a CODEC in the browser and a playback component or module for a speaker or display of the second communication device.

Any of the preferred embodiments of the DRM-WebRTC system disclosed herein include where the DRM permission is selected from the group consisting of: record, not record, store, screen share, revoke, expire, offline view, blacklist, copy, forward, screen capture, rights violation, and cancel/disappear.

Any of the preferred embodiments of the DRM-WebRTC system disclosed herein include where the electronic object is stored on the Cloud Server using distributed storage.

Any of the preferred embodiments of the DRM-WebRTC system disclosed herein include where the DRM-WebRTC chat application comprises a secret chat module that disables saving the real-time duplex media stream to the first and second communication devices.

Any of the preferred embodiments of the DRM-WebRTC system disclosed herein include where the WebRTC platform comprises a Private Blockchain module in communication with a WebRTC network server to provide user identity, authentication, a digital hash, Group Node Coupling, personally-identifiable information (PII) security, content linking, content searching, and content addressing.

Any of the preferred embodiments of the DRM-WebRTC system disclosed herein include where the WebRTC platform comprises a hardware security module in communication with a WebRTC network server to provide AES 256 GCU encryption, and ECDH Diffie-Hellman encryption for audio and video streams.

Any of the preferred embodiments of the DRM-WebRTC system disclosed herein include where wherein the WebRTC platform comprises a key management module in communication with the WebRTC-Gateway Server and the Signaling Server to provide homomorphic encryption of a communication between the WebRTC-gateway Server and the Signaling Server, said homomorphic encryption allowing the Signaling Server to extract the private IP address without decrypting the JSON SMS message.

Any of the preferred embodiments of the DRM-WebRTC system disclosed herein include where the WebRTC chat application has an insertable streams module to provide end-to-end encryption for a middlebox device and for Selective Forwarding Units (SFUs) for media routing in a videoconference application where insertable streams iterate on frames and not RTP packets to transform an encoded frame to an asynchronous insertable stream to support end-to-end encryption.

Any of the preferred embodiments of the DRM-WebRTC system disclosed herein include where the Cloud Server comprises a CDN server.

Any of the preferred embodiments of the DRM-WebRTC system disclosed herein include where the first communication device is selected from a mobile communication device, a desktop computer communication device, and a tablet communication device.

Terminology

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Rather, these embodiments are provided so that this disclosure will be thorough and complete, and will fully convey the scope of the inventive concepts to those skilled in the art. Like numbers refer to like elements throughout.

Description of WebRTC

The term "WebRTC" as used herein refers to a free, open source platform which facilitates browser-based P2P communications (voice and video) on Android, IOS and PC platforms. WebRTC is supported by most browser technologies including: Chrome, Firefox, Safari, Opera and MSEdge. WebRTC supports video, voice and generic data to be sent between (and among) peers allowing developers to build voice and video-communications solutions and services. The technologies behind WebRTC are implemented as an open web standard and available as regular JavaScript API's in all major browsers. For native clients, like Android and IOS applications, a library is available that provides the same functionality.

JavaScript API's

WebRTC consists of three main JavaScript objects: the RTC Peer Connection Object, the Mainstream API, and the RTC Data Channel API.

The term "RTC Peer Connection Object" as used herein refers to an object that is the main entry point to the WebRTC API. It helps connect to peers, initialize connections and attach media streams, as shown in the attached diagram. The RTC Peer Connection API is the core of the peer-to-peer connection between each of the communicating browsers.

The term "Mainstream API" as used herein refers to an object designed to provide easy access to media streams (video and audio) from cameras, microphones and audio and video codecs on mobile devices and PC's.

The term "RTC Data Channel API" as used herein refers to an object designed to transfer arbitrary data including data messages in addition to audio and video streams WebRTC Protocols There are three main protocols for WebRTC: DTLS, SRTP, and SIP.

The term "Datagram Transport Layer Security (DTLS)" as used herein refers to a WebRTC protocol that adds encryption and message authentication. DTLS is a communications protocol that provides security for datagram-based applications, specifically voice and video by allowing them to communicate based on a stream oriented transport layer security (TLS) protocol, and is intended to provide similar security guarantees. DTLS uses User Datagram Protocol (UDP) streaming protocol to establish low latency and loss toleration communications between applications on the Internet, such as WebRTC based P2P connection.

The term "Secure Real-Time Transport Protocol (SRTP)" as used herein refers to a WebRTC protocol that is a profile for Real-Time Transport Protocol (RTP) intended to provide encryption, message authentication and replay attack protection to the RTP data in both unicast and multicast video applications.

The term "Session Initiation Protocol (SIP)" as used herein refers to a WebRTC protocol that is a signaling protocol used for initiating, maintaining and terminating real-time voice, video and messaging sessions. SIP is widely used for signaling and controlling multimedia communications sessions over Internet telephone for voice and video calls, in private IP telephone systems and in instant messaging over IP.

The term "Session Description Protocol (SDP)" refers to a format for describing multimedia communications sessions for the purpose of session announcement and session invitation to support streaming media applications such as voice (VoIP) and video conferencing.

The term "WebRTC Network servers" refers to remote servers that facilitate the WebRTC connection.

The term "Signaling Server" refers to a WebRTC server used to establish a web socket connection between peer-to-peer users using public and private IP address translation.

The term "Interactive Connectivity Establishment (ICE)" refers to a WebRTC server used to discover which IP addresses can connect to each other and the method used to make that connection through a typical Network Address Translation (NAT) servers called STUN servers and TURN servers.

The term "STUN server" refers to a WebRTC server used as primary connection set up server.

The term "TURN server" refers to a WebRTC server that is a secondary connection set-up server when the STUN server is unreachable.

The term "Selective Forward Units (SFU's)" refers to a type of video routing device used for receiving multiple media streams and then forwarding these media streams to multiple users in a video conferencing session.

The term "module" refers to a separate unit of hardware or software or both that has a specific task or function within a larger hardware, software, or electronic system. The term "component" may be synonymous within context. The term module may also include programmable electronics that include both hardware and software or firmware programming.

The term "software module" refers to a separate unit of software programming code that has a specific task or function within a larger software system. A software module may handle one step in a process or may handle a series of related steps required for completing a task or function.

The term "hardware module" refers to a separate unit of hardware that has a specific task or function within a larger electronic system and is usually programmed or programmable by software or firmware or by a user establishing specific settings to achieve a specific task or function.

WebRTC Security Issues

There are a number of ways that a browser based P2P communications application such as WebRTC may impose serious security risks, especially the interception of unencrypted data or media streams during transmission or when decrypted at middlebox server points in a P2P configuration including signaling server, ICE servers (Stun server and Turn servers) and with Selective Forwarding Units (SFU's). The main security issue is with a man-in-the-middle (MITM) cyber attack and theft of private IP addresses and unencrypted data and streamed video sessions while traversing middlebox network servers. This can occur between browser-to-browser or browser-to-server communications with eavesdropping third parties able to see all sent data including IP addresses, voice conversations, and video streams. TLS is the de-facto standard for Web encryption using HTTPS. But as discussed earlier, WebRTC uses DTLS with less than reliable Datagram transport such as UDP and with the implementation of DTLS to generate encryption keys for SRTP media sessions, where normal protections from TLS encryption are not available.

Signaling Server

WebRTC uses a signaling server network to establish a websocket connection between peer-to-peer users. A form of discovery and media format negotiation must take place in order for the two devices (i.e. 2 Android or IOS devices) on different networks to locate one another. This process is called signaling and involves both devices connecting to the mutually agreed-upon signaling server. A signaling servers function is to serve as an intermediary to allow the two peers to find and establish a connection while minimizing exposure of potentially private information. However, in order to complete a secure connection between 2 peers, the signaling server decrypts the senders private IP address and exchanges it with a public IP address to route the audio or video call to the receiver. As a result, both the sender and receivers private IP address is exposed (unencrypted) and is subject to a man-in-the-middle (MITM) attack whereby the private IP information and other PII information of both users is now compromised.

Peer Connections using ICE—Protocol—Stun & Turn Servers

ICE (Interactive Connectivity Establishment) is used to discover which IP addresses can connect to each other and the method used to make that connection through a typical NAT (Network Address Translation) which is a method of remapping an IP address space into another by modifying network address information in the IP header of packets while they are in transit across a traffic routing device. ICE uses both Stun and Turn servers to resolve the public IP address of a device running behind a NAT and to solve problems such as one-way audio during a phone call or streamed video between 2 or more peers. Stun messages are usually sent in User Datagram Protocol (UDP) packets. Since UDP does not provide reliable transport guarantees, reliability is achieved by application-controlled retransmissions of the Stun request. Since WebRTC uses DTLS versus TLS, the connection with a Stun server may or may not be always encrypted. Once a session between peer A and peer B, for P2P communications, Session Initiation Protocol (SIP) and Session Description Protocol (SDP) are used. Since the Stun isn't always encrypted, it is easy for a MITM attack to be executed thus obtain the users private IP addresses and the personal identifiable info. The sessions between both peers will be end-to-end encrypted regardless of your secured/unsecured connection with Stun. This P2P ICE/STUN/TURN—Audio and streamed audio connection process is widely used and accepted as a major security risk with WebRTC browser based P2P communications.

Selective Forwarding Unit (SFU)

WebRTC has settled on the SFU as the preferred method of extending WebRTC to multiparty conferencing including simulcast and multicast. SFU's enable the deployment of P2P streamed video in efficient and scalable hub and spoke technologies with low latency and high quality videos. In the SFU architecture, every participant (peer) sends their media stream to a centralized server (SFU) and receives streams for all other participants via the SFU. The SFU does not need to decode and re-encode received streams, but simply acts as a forwarder of streams between call participants. The main advantage of the SFU architecture is the ability to work with asymmetric bandwidth or (higher downlink bandwidth than uplink bandwidth), which makes it suitable for mobile communications. The problem with SFU is that they do not support E2E media encryption, as the media server terminates the encryption once it receives the media stream and has direct access to it. This represents a serious blocker for the usage of off-the-shelf SFU's for WebRTC applications.

Man-in-the-middle (MITM) Middlebox Security Concerns

WebRTC is encrypted by design, using DTLS to exchange encryption keys (and encrypt data channel messages) and SRTP to exchange real-time audio and video streams. As such, each peer connection established between two peers is secure (the P2P one-to-one scenario). The moment you add a server to the mix, including a signaling server, ICE servers (Stun and Turn servers) and a Selective Forwarding Unit (SFU), media is not peer-to-peer anymore; you are sending media to a server, and the server sends the media on to other peers. So it's the peers in the media conversation that change—that is if a server is handling the media, WebRTC requires that peer connections connect directly to the server, not the other peer. This means that, in the simple 1-1 peer to peer video/audio call case, two separate and independent peer connections are established: Connection between the caller and server; and Connection between the sender/caller and receiver/callee.

As such, both connections are secure, but only up to or from the server since the server terminates the DTLS connectivity and as a result the server has access to the unencrypted media and any other PII information, including private IP addresses.

Distributed Trust Platform

For video streaming, video conferencing and audio communication over a browser based (WebRTC) P2P network, it is imperative to augment certain deficiencies with Datagram Transport Layer Security (DTLS) and Real-Time Transport Protocol (Secure RTP) to provide strong end-to-end security guarantees. This section defines and explains a Distributed Trust Platform that consists of: AES 256 Galois/Counter Mode (GCM) encryption, Elliptic-Curve Diffie-Hellman (ECDH) encryption, Homomorphic encryption, Insertable Media Streams, Key Management System for Encryption, Hardware Security Module (HSM), Blockchain-Distributed Hash (DHT), and Digital Signatures/Authentication.

AES 256 GCM

AES with Galois/Counter Mode (AES-GCM)—(is a mode of operation for symmetric key cryptography block ciphers) provides both authenticated encryption and the ability to check the integrity and authentication of additional authenticated data (AAD) that is sent in the clear. These are four inputs for authenticated encryption: the secret key, initialization vector (called nonce), the plaintext and optional additional authentication data (AAD). The nonce and AAD are passed in the clear. These are two outputs; the ciphertext, which is exactly the same length as the plaintext, and an authentication tag (the "tag"). The tag is sometimes called the Message Authentication Code (MAC) or integrity check value (ICV).

ECDH

Elliptic-curve Diffie-Hellman (ECDH) is a key agreement protocol that allows two parties, each having an elliptic-curve public-private key pair, to establish a shared secret over an insecure channel. This shared secret may be directly used as a key, or to derive another key. The key or the derived key, can then be used to encrypt subsequent communications using a symmetric-key cipher. It is a variant of the standard Diffie-Hellman protocol using elliptic-curve cryptography (ECC). ECC is a public-key cryptography based on the algebraic structure of elliptical curves over finite fields. Elliptical curves can be used for encryption by combining the key agreement (key exchange system) with a symmetric encryption scheme.

Homomorphic Encryption

Homomorphic encryption solves a vulnerability inherent in all other approaches to doctor protection.

"Homomorphic encryption (HE) is a form of encryption allowing one to perform calculations on encrypted data without decrypting it first. The result of the computation is in an encrypted form, when decrypted the output is the same as if the operations had been performed on the unencrypted data."

"In a nutshell, homomorphic encryption is a method of encryption that allows any data to remain encrypted while it is being processed and manipulated. It enables a third party (such as a video streaming service) to apply functions on encrypted data without needing to reveal the values of the data. A homomorphic cryptosystem is like other forms of public encryption in that it uses a public key to encrypt data and allows only the individual with the matching private key to access its unencrypted data (though there are also examples of symmetric key homomorphic encryption as well). However, what sets it apart from other forms of encryption is that it uses an algebraic system to allow you or others to perform a variety of computations (or operations) on the encrypted data."

Homomorphic encryption is a form of encryption with an additional evaluation capability for computing over encrypted data without access to the secret key to decrypt the encrypted data. The result of such a computation remains encrypted.

Applying HE to WebRTC signaling which requires both the caller and callee to upload their private IP address to the signaling server so that a media session (video streaming) can be routed and traversed over the public IP network using a public IP address. In this way both the caller and callee's private IP addresses are never decrypted or exposed to MITM attack.

"There are two main types of homomorphic encryption. The primary difference between them boils down to the types and frequency of mathematical operations that can be performed on their ciphertext. Types of homomorphic encryption include: Partially Homomorphic Encryption and Fully Homomorphic Encryption.

"Partially homomorphic encryption (PHE) helps sensitive data remain confidential by only allowing select mathematical functions to be performed on encrypted values. This means that one operation can be performed an unlimited number of times on the ciphertext. Partial homomorphic encryption (with regard to multiplicative operations) is the foundation for RSA encryption, which is commonly used in establishing secure connections through SSL/TLS." A partial HE scheme can also support limited operations such as addition and multiplication up to a certain complexity because most complex functions typically require significant computing capability and computation time.

Insertable Media Streams

WebRTC mandates encryption using DTLS-SRTP works by using a DTLS handshake to derive keys for encrypting the media payload of the RTP packets. It is authenticated by comparing fingerprints in the SDP (session description Protocol) that are exchanged via the signaling server with the fingerprints of the self-signed certificates used in the handshake. This is often called E2E encryption since the negotiated keys do not leave the local device (signaling server) and the browser does not have access to them. However, without authentication it is still vulnerable to MITM attacks focusing on private IP address theft.

Another unsecure media server are the SFU's. FSU's are packet routers that forward a single or small set of media streams from one user to many users (typically up to 50 users). In terms of encryption, DTLS-SRTP negotiation happens between each peer endpoint and the SFU. This means that the SFU has access to the unencrypted payload and can listen in. This is necessary for features like server-side recording. On the security side, it means you need to trust the entity running the SFU and/or the client code (vodeo app) to keep the stream private. Zero trust is always the best policy.

Unlike a VoIP Multipoint Control Unit (MCU) which decodes and mixes media, a SFU only routes packets. It ignores the media content (except header information and whether a frame is a keyframe). So a SFU is not required to decode and decrypt the media stream data.

So what is required and proposed here is to implement a "frame encryption" approach built on a JavaScript API to solve this problem—which is referred to here as Insertable Media Streams. This approach works as follows:

Opens two connections

Applies the encryption on both connections based on a simple XOR cipher, an additive cipher (an encryption algorithm) that operates as follows:

$$A \oplus O = A$$

$$A \oplus A = A$$

$$(A \oplus B) \oplus C = A \oplus (B \oplus C)$$

$$(B \oplus A) \oplus A = B \oplus O = B$$

where $\oplus$ denotes the exclusive disjunction (XOR) operation and is applied to the content which contains the encryption key.

Only decryption on one of them.

The transform function is then called for every video frame. This includes an encoded frame object and a controller object. The controller object provides a way to pass the modified frame to the next step. The frame header is not required to be encrypted.

The insertable media stream API operates between the encoder/decoder and the packetizer that splits the frames into RTP packets. In summary, this is a sophisticated APO for inserting frame encryption which in the case of insertable streams needs to be asynchronous.

Key Management System (KMS)

Encryption key management is administering the full lifecycle of cryptographic keys. This includes: generating, using, storing, archiving, and deleting of keys. Protection of the encryption keys includes limiting access to the keys physically, logically, and through user/role access.

There is an entire physical and digital cryptosystem that must be accounted for as well as each key's full lifecycle. Therefore, a robust encryption key management system and policies includes: Key lifecycle: key generation, pre-activation, activation, expiration, post-activation, escrow, and destruction. Physical access to the key server(s), Logical access to the key server(s), and User/Role access to the encryption keys are important.

Asymmetric Keys: Data-in-Motion.

Asymmetric keys are a pair of keys for the encryption and decryption of the data. Both keys are related to each other and created at the same time. They are referred to as a public and a private key:

Public Key: this key is primarily used to encrypt the data and can be freely given as it will be used to encrypt data, not decrypt it.

Private Key: this key is used to decrypt the data that it's counterpart, the public key, has encrypted. This key must be safeguarded as it is the only key that can decrypt the encrypted data.

Asymmetric keys are primarily used to secure data-in-motion. An example might be a streamed video where an AES symmetric session key is used to encrypt the data and a public key is used to encrypt the session key. Once the encrypted data is received, the private key is used to decrypt the session key so that it can be used to decrypt the data.

Asymmetric Key System Flow Process

The Sender and Recipient verify each other's certificates. The sender sends a certificate to the recipient for verification. The recipient then checks the certificate against their Certificate Authority (CA) or an external Validation Authority (VA) for authentication. Once the sender's certificate has been verified, the recipient then sends their certificate to the sender for authentication and acceptance. Once the sender and recipient have mutual acceptance. The sender requests the recipient's public key. The recipient sends their public key to the sender. The sender creates an ephemeral symmetric key and encrypts the file to be sent. (an ephemeral symmetric key is a symmetric encryption key used only for one session.) The sender encrypts the symmetric key with the public key. The sender then sends the encrypted data with the encrypted symmetric key. The recipient receives the packet and decrypts the symmetric key with the private key. The recipient decrypts the data with the symmetric key.

Hardware security module (HSM) is a physical computing device that safeguards and manages digital keys, performs encryption and decryption functions for digital signatures, strong authentication and other cryptographic functions. These modules traditionally come in the form of a plug-in card or an external device that attaches directly to a computer or network server. A hardware security module contains one or more secure cryptoprocessor chips.

Digital signature is a mathematical scheme for verifying the authenticity of digital messages or documents. A valid digital signature, where the prerequisites are satisfied, gives a recipient very strong reason to believe that the message was created by a known sender (authentication), and that the message was not altered in transit (integrity).

Elliptical Curve Digital Signature Algorithm (ECDSA) offers a variant of the Digital Signature Algorithm (DSA) which uses elliptic curve cryptography.

Cryptographic splitting, also known as cryptographic bit splitting or cryptographic data splitting, is a technique for securing data over a computer network. The technique involves encrypting data, splitting the encrypted data into smaller data units, distributing those smaller units to different storage locations, and then further encrypting the data at its new location.

Encrypted Media Extensions (EME)

EME is a W3C specification for providing a communication channel between web browsers and a Content Decryption Module (CDM) software which implements Digital Rights Management (DRM). This allows the use of HTML5 video to play back DRM-wrapped content such as streaming video without the use of 3rd party media plugins to the browser including Adobe Flash or MS Silverlight. The use of a third party encryption key management system is recommended.

EME is based on the HTML5 Media Source Extensions (MSE) specification which enables adaptive but rate streaming in HTML5 using MPEG-DASH protected content. (Dash-Dynamic Adaptive Streaming over HTTP). The transport protocol that MPEG-DASH uses is TCP.

As of 2016, EME has been implemented in Google Chrome, IE, Safari, Firefox and MSEdge browsers.

Content Decryption Module

The invention includes a stack implementation of using the APO for the Content Decryption Module. The CDM is the client component that provides decryption for one or more encryption key systems including the key management systems proposed in the SRTCS Distributed Trust Platform which supports AES 256 GCM encryption, Elliptic Curve Diffie-Hellman (ECDH) encryption and Homomorphic encryption.

Encrypted Media Extension (EME)

The invention provides an EME for providing a communication channel between web browsers and a Content Decryption Module (CDM).

Private Blockchain

The invention provides a Private Blockchain with Distributed Hash Tables, Group Node coupling, Distributed (encrypted) Identity and Digital Rights (DRM).

As used herein, the Private Blockchain is an invitation-only network governed and controlled by a single (or group) entity. Entrants to the blockchain network require permission to join, read, write and participate in the blockchain. There are different levels of access, and the information is encrypted to protect the commercial services confidentiality. The SRTCS system (Vodeo) described in the invention has implemented a permission-based blockchain (Private Blockchain) that deploys an access control layer to govern who has access to the network and users (subscribers) on the Private Blockchain network are vetted and controlled by the network rules.

The SRTCS blockchain contains a growing list of records (transactions) referred to as blocks that are linked using cryptography (encryption). Each block contains a cryptographic hash of the previous blocks (a timestamp) and transaction data (metadata), represented as a Merkle tree.

Distributed Ledger Technology (DLT)

The SRTC invention deploys Distributed Ledger Technology (DLT) for recording "transactions" or video and audio chats in which the transactions and their details are recorded in multiple places (multiple nodes) at the same time. Distributed ledgers have no central data store or administrative functionality which is contrasted with widely used cloud databases such as SQL server. Ledgers are essentially a permanent record of transactions and data. Blockchain, which bundles transactions into blocks that are chained together ("connected"). DLT also has the potential to speed transactions since they remove the need for a central authority. Blockchain technology makes use of cryptography for transactions, security and privacy-preserving protocols. Blockchain cryptography includes public-key cryptography, distributed hashing and Merkle trees.

SRTCS Private Blockchain Architecture

This invention also describes a new method and implementation of a Private Blockchain which includes: Blockchain Group Node Coupling, Distributed Hash Tables, Distributed Identity and Directories (searching), Public Key Cryptography, Cryptographic Hashing, and Merkle Trees. Each of the above mentioned technologies are discussed below in greater detail.

Blockchain with Distributed Identity Directory, Distributed Hash Tables with Group Node Coupling)

The invention provides Group Node Coupling, Distributed Identities (DII) and Directories. SRTCS deploys blockchain to provide a record of each users PII (personal identifiable information) including a private IP address and to provide directory searching capability to find and connect 2 or more users to a video/audio chat session. This process also includes node addressing, node discovery and group node coupling.

A profile of each subscriber is created in the blockchain that contains all PII and historical metadata of video/audio chats made with other subscribers (called "Buds") in SRTCS. A node coupling profile of "Buds" is created which streamlines the blockchain discovery (searching) algorithms to quickly identify and retrieve addressing linking information to achieve rapid connection between subscribers in the system.

WebRTC signaling server is used to connect 2 or more subscribers over the P2P network. As discussed earlier, the signaling server translates each users private IP address to a public IP address to effectuate a connection over the ICE (Stun, Turn) server network. An encrypted Websocket Connection is made between the users WebRTC based browser and the signaling server in an encrypted (hop-to-hop???) scenario. SRTCS uniquely deploys homomorphic encryption to extract the private IP addresses of each subscriber without decrypting the private IP address payload in the signaling server. This protects the users from any potential MITM private IP address impersonation and theft and also provides a true end-to-end encryption implementation without the need to decrypt the users private IP address at the signaling server.

Private Blockchain with Distributed Hash Tables & Group Node Coupling)

The invention provides Public-Key Cryptography. An important feature of the SRTCS system is the implementation of public key cryptography with Blockchain. Public-key cryptography (also called asymmetric cryptography) is a cryptographic system that uses a pair of keys—a public key and a private key. The public key may be widely distributed, but the private key is meant to be known only by its owner. Keys are always created in a pair—every public key must have a corresponding private key.

Public-key cryptography is most often used for encrypting messages between two people or two computers in a secure way. Anyone can use someone's public key to encrypt a message, but once encrypted, the only way to decrypt that message is by using the corresponding private key.

Referring now to FIG. 1, a flowchart is provided illustrating a non-limiting preferred embodiment of the Secure RTC Service system architecture and streamed video storage and sharing platform. FIG. 1 shows how a VODEO subscriber app can be installed on a mobile phone or desktop computer for video chat and streamed video, and will have a local encryption key. The VODEO app on the mobile or desktop user device is in communication with a Cloud Storage and Sharing Platform having an upload/download module (programming, hardware, and/or firmware), as well as a Digital Rights (DRM) protection module, a Distributed Trust Platform module (ELEE), a Blockchain-Distributed Hash Table (BC-DHT) module, a Network/Signaling Server, and a WebRTC module and/or server.

In operation, the sender subscriber app can establish a "push-button" WebRTC connection to a receiver subscriber app by sending a request or invite containing an identifier, such as a telephone number from the contact list collected in the subscriber app and stored in the Cloud Platform using the Blockchain-Distributed Hash Table, along with the sender's IP address and discovery invitation text, to the WebRTC module/server of the Cloud Platform. The WebRTC module/server uses an established messaging protocol such as SMS, email, etc. to contact the receiver's subscriber app. The receiver can then read the discovery invitation and accept (or decline) the invite, which sends the receiver's IP address along with an acceptance message, if desired, in reply to the WebRTC module/server. The WebRTC module/server then establishes a peer-to-peer connection between the sender subscriber app and the receiver subscriber app.

FIG. 1 also shows that, in addition to facilitating the WebRTC discovery and peer-to-peer video/audio/data communication ("VODEO"), the platform provides the subscribers with the ability to securely upload/download and share video/audio/data (media/content), securely save the content using distributed cloud storage, apply DRM permissions to the content, encrypt the content end-to-end, and provide scalable cloud-based content addressing, linking, and discovery.

FIG. 1 shows that the encryption key for DRM permissions can be locally stored in connection with a subscriber app and associated playback CODECs. This arrangement provides that a DRM violation by a subscriber results in a revocation of the encryption key which is tied to the CODEC function. Thus, the content is unavailable and cannot be played on the DRM violators device. DRM permissions may include functions selected from: record, store, screen share, expire, offline view, copy, forward, and screen capture. DRm enforcement functions may include: revoke, blacklist, cancel access, disappear subscriber (from contact list), disappear content, and other rights violation responses.

FIG. 1 also shows that the WebRTC module/server includes the Signaling server architecture as a backup to assist in the P2P discovery and connection. The use of a STUN server, and optionally a TURN server if needed, allows the connection by IP address described by the WebRTC protocol. A NAT server is also provided to assist in traversing hidden IP addresses. An SFU server is provided to enhance the video streaming functionality.

Figure 2:
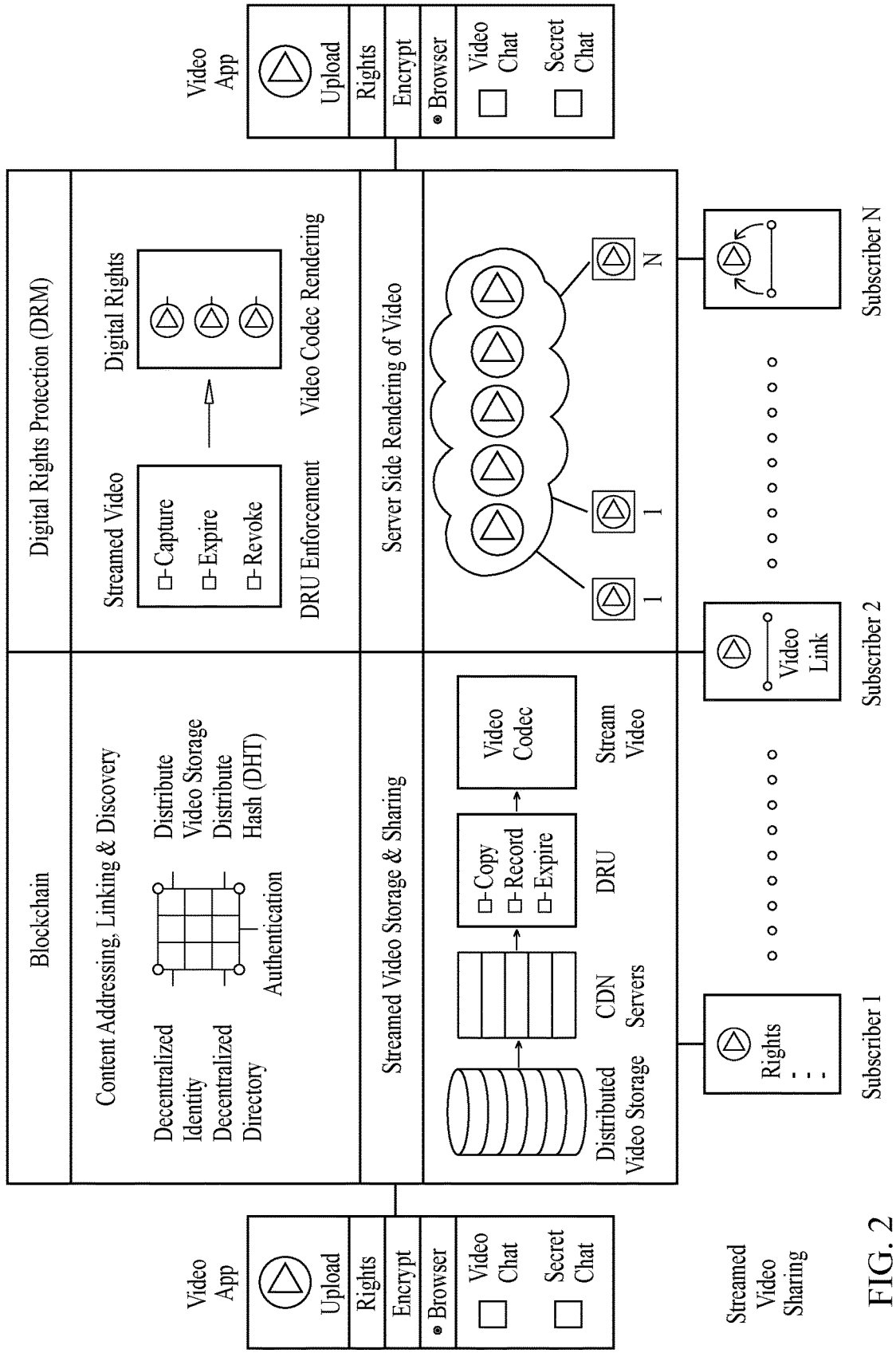
FIG. 2 is a flowchart illustrating a non-limiting preferred embodiment of a video RTC messaging platform and how it works.

FIG. 2 is a flowchart illustrating a non-limiting preferred embodiment of a video RTC messaging platform and how it works. A subscriber 1 provides streamed video sharing to one or more subscribers 2 . . . N. Within the subscriber app, the video module provides video upload, rights management, encryption selection, and a selection of a video chat and/or a secret chat. The subscriber apps are connected to the Cloud-based Video RTC Messaging Platform. A Blockchain module provides content addressing, linking & discovery, along with decentralized identity and a decentralized directory and authentication. The Blockchain module also provides distributed video storage using Distributed Hash Table (DHT) technology. A Streamed Video Storage & Sharing module includes a Distributed Video storage server connected to CDN servers, and the CDN servers are governed by the Digital Rights User rights by way of the CODEC-DRM governor integrated with the encryption key. A DRM module includes programming for Digital Rights Use enforcement of the streamed video and the integrated video CODEC rendering. A Server Side Rendering module provides the rendering and transmission of the video to the receiving subscribers.

Figure 3:
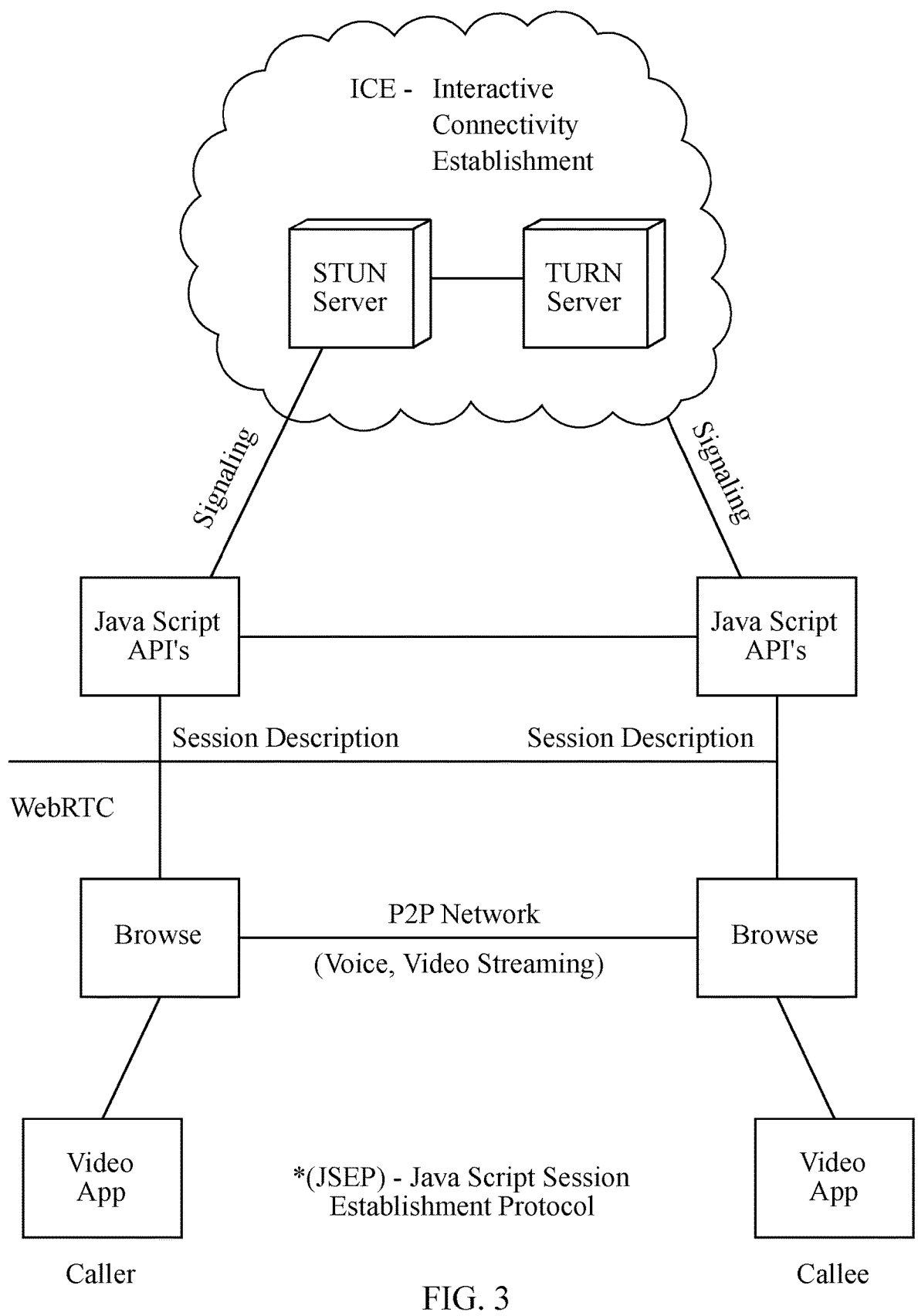
FIG. 3 is a flowchart illustrating a non-limiting preferred embodiment of a Web RTC signaling with JSEP Javascript Session Establishment Protocol showing a webRTC process as provided herein from a caller's video app through webRTC servers to a "callee" (receiver of a call) video app.

FIG. 3 is a flowchart illustrating a non-limiting preferred embodiment of a Web RTC signaling with JSEP Javascript Session Establishment Protocol showing a webRTC process as provided herein from a caller's video app through webRTC servers to a "callee" (receiver of a call) video app. The subscriber (video) app uses a browser functionality to connect to the WebRTC server for establishing a session. JavaScript APIs can be integrated into the browser functionality to manage the connection to the receiver (callee) device. The Signaling Servers facilitate IP address discovery and the result is a subscriber app mediated peer-to-peer WebRTC connection for video streaming.

Figure 4:
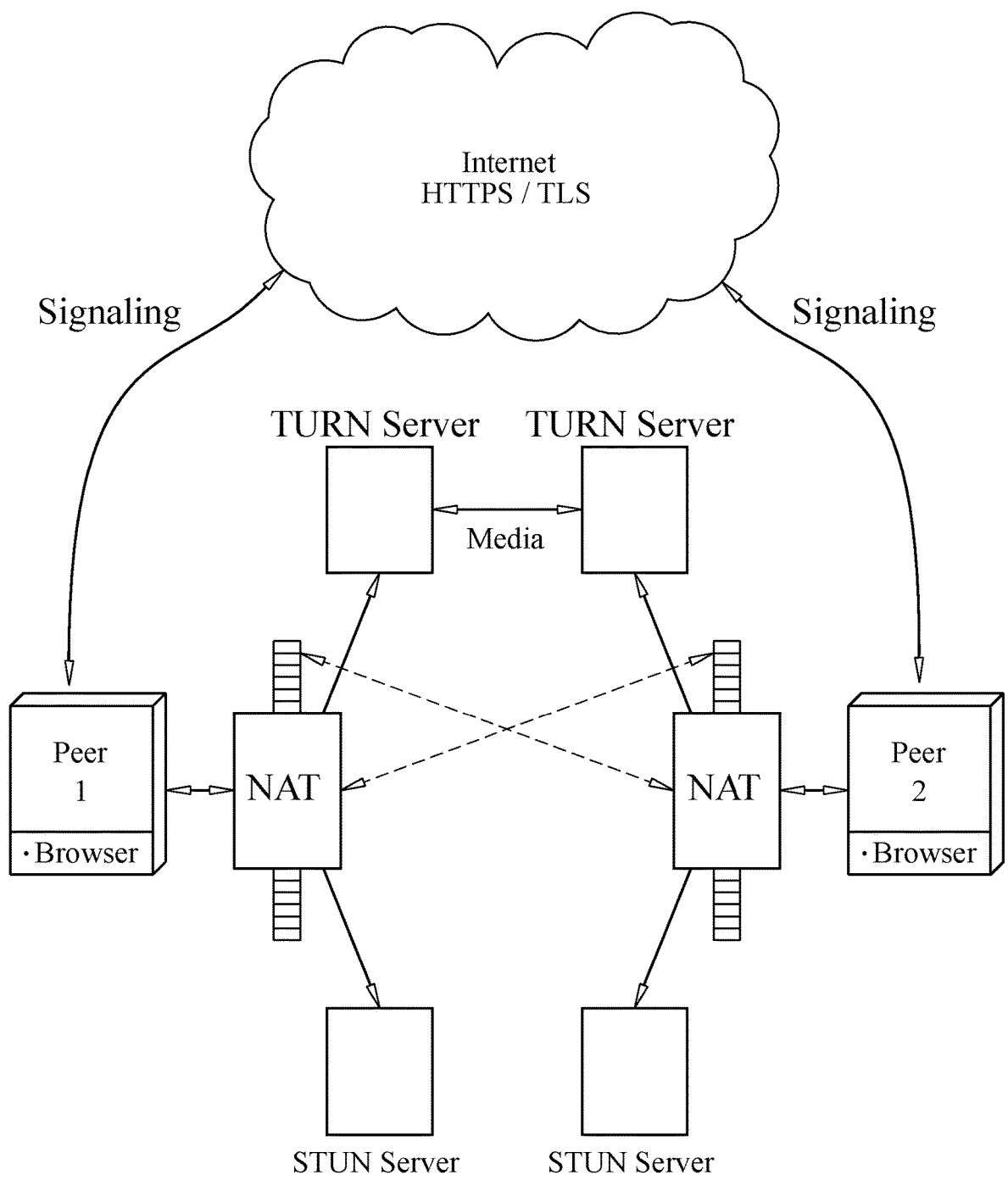
FIG. 4 is a flowchart illustrating a non-limiting preferred embodiment of Web RTC Network servers with STUN, TURN, and Signaling Servers, and shows a webRTC process as provided herein from a peer 1 browser to a peer 2 browser.

FIG. 4 is a flowchart illustrating a non-limiting preferred embodiment of Web RTC Network servers with STUN, TURN, and Signaling Servers, and shows a webRTC process as provided herein from a peer 1 browser to a peer 2 browser.

Figure 5:
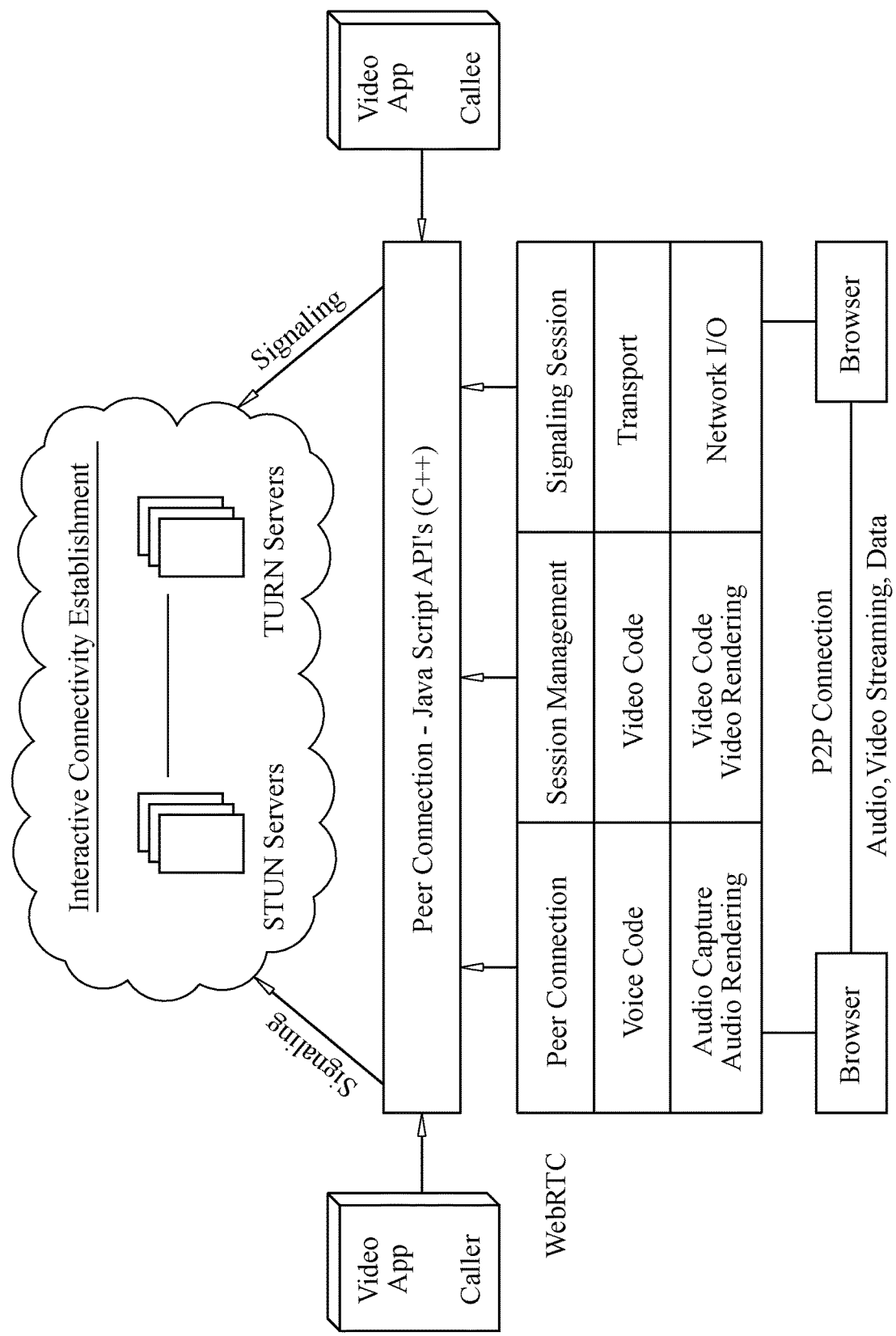
FIG. 5 is a flowchart illustrating a non-limiting preferred embodiment of a Web RTC Platform Network Diagram and shows a peer connection between a video app caller and a video app callee, with signaling through an interactive connectivity establishment (ICE) cloud having STUN and/or TURN servers.

FIG. 5 is a flowchart illustrating a non-limiting preferred embodiment of a Web RTC Platform Network Diagram and shows a peer connection between a video app caller and a video app callee, with signaling through an interactive connectivity establishment (ICE) cloud having STUN and/or TURN servers. FIG. 5 shows a video app caller initiating a discovery request by sending a request through Signaling servers to establish a WebRTC connection to a video app callee. The WebRTC module/server provides session management, peer connection, Signaling session, voice encoding, video encoding, transport function, audio capture and rendering, video capture and rendering, and network I/O. FIG. 5 also shows that the peer connection can use JavaScript API with an optional C++ addon.

Figure 6:
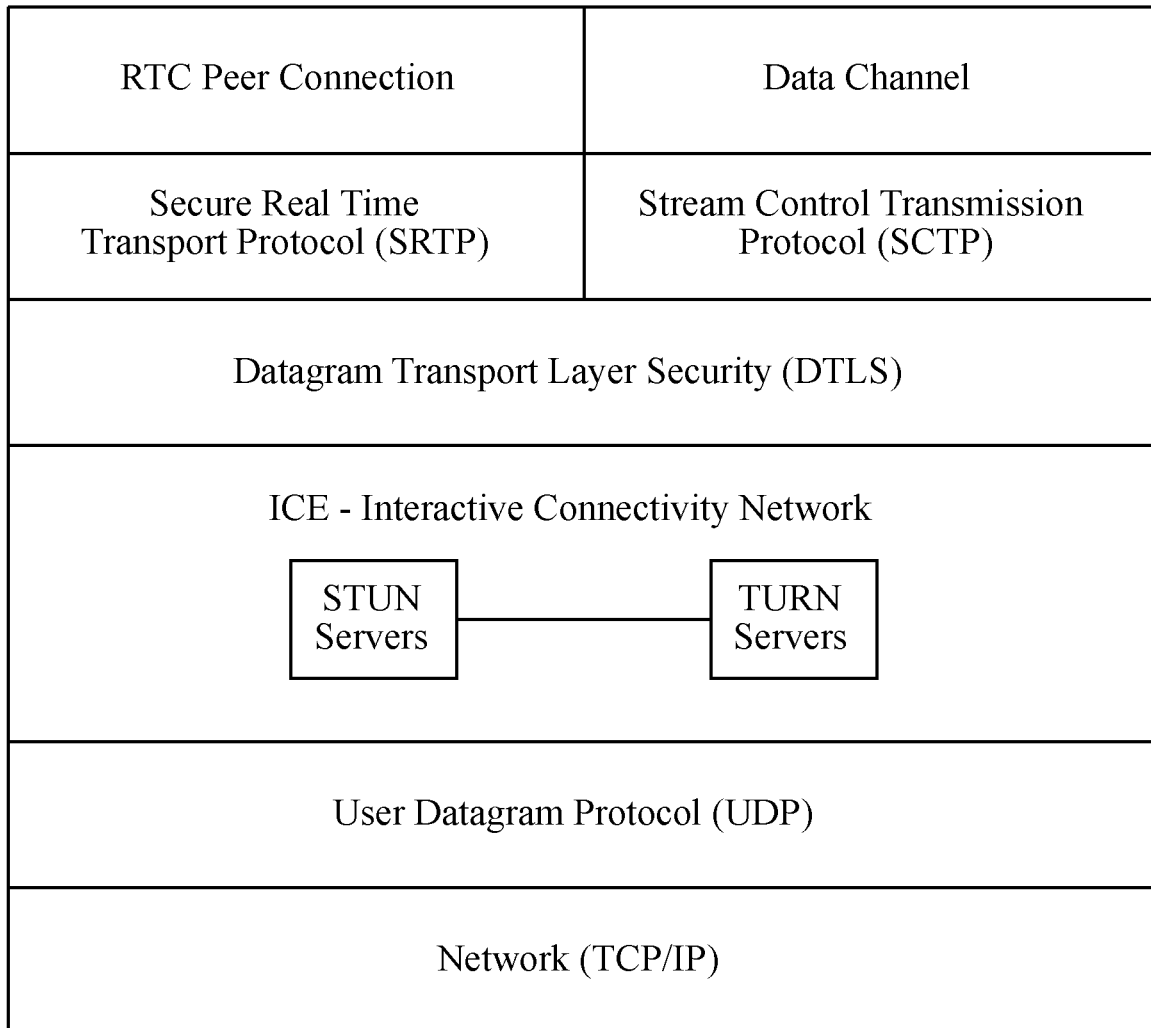
FIG. 6 is a flowchart illustrating a non-limiting preferred embodiment of a WebRTC Protocol Stack and shows a layer description of an RTC peer connection with data channel, secure real-time transport protocol, stream control transmission protocol, datagram transport layer security, ICE network, UDP protocol, and network layer protocol (TCP/IP).

FIG. 6 is a flowchart illustrating a non-limiting preferred embodiment of a WebRTC Protocol Stack and shows a layer description of an RTC peer connection with data channel, secure real-time transport protocol, stream control transmission protocol, datagram transport layer security, ICE network, UDP protocol, and network layer protocol (TCP/IP).

Figure 7:
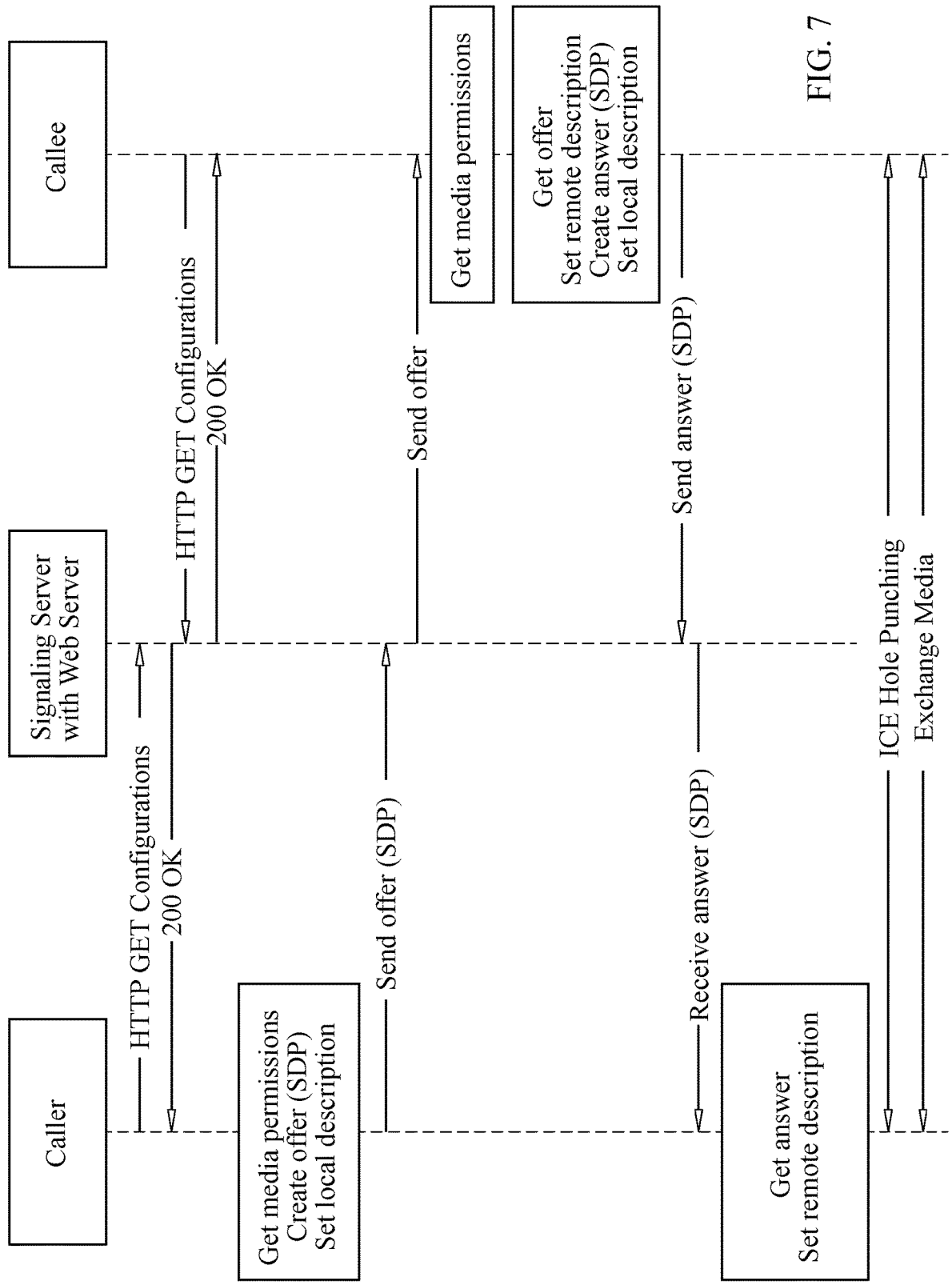
FIG. 7 is a flowchart illustrating a non-limiting preferred embodiment of a WebRTC Signaling Flow Diagram and shows a handshake provisioning and Signaling diagram showing sequencing of each step to achieve ICE hole punching and exchange of media.

FIG. 7 is a flowchart illustrating a non-limiting preferred embodiment of a WebRTC Signaling Flow Diagram and shows a handshake provisioning and Signaling diagram showing sequencing of each step to achieve ICE hole punching and exchange of media. FIG. 7 shows a process that starts with a Caller sending a HTTP GET Configurations communication to the Signaling Server with Web Server, and the Server send an OK communication to acknowledge. A Callee follows with a similar process step. The Caller then prepares a communication to the Servers with a Get media permission, Create offer 9SDp), and Set local description, and this is sent as a Send offer (SDP). The Send offer is then forwarded to the Callee, and the Callee generates a Get media permissions, Get offer, Set remote description, Create answer (SDp), and Set local description file. This communication is returned to the Servers, and the Servers forward a Receive answer (SDP) to the Caller. The Caller then generates a Get answer, Set remote description file and the ICE Hole Punching and Exchange Media communications are provisioned.

Figure 8:
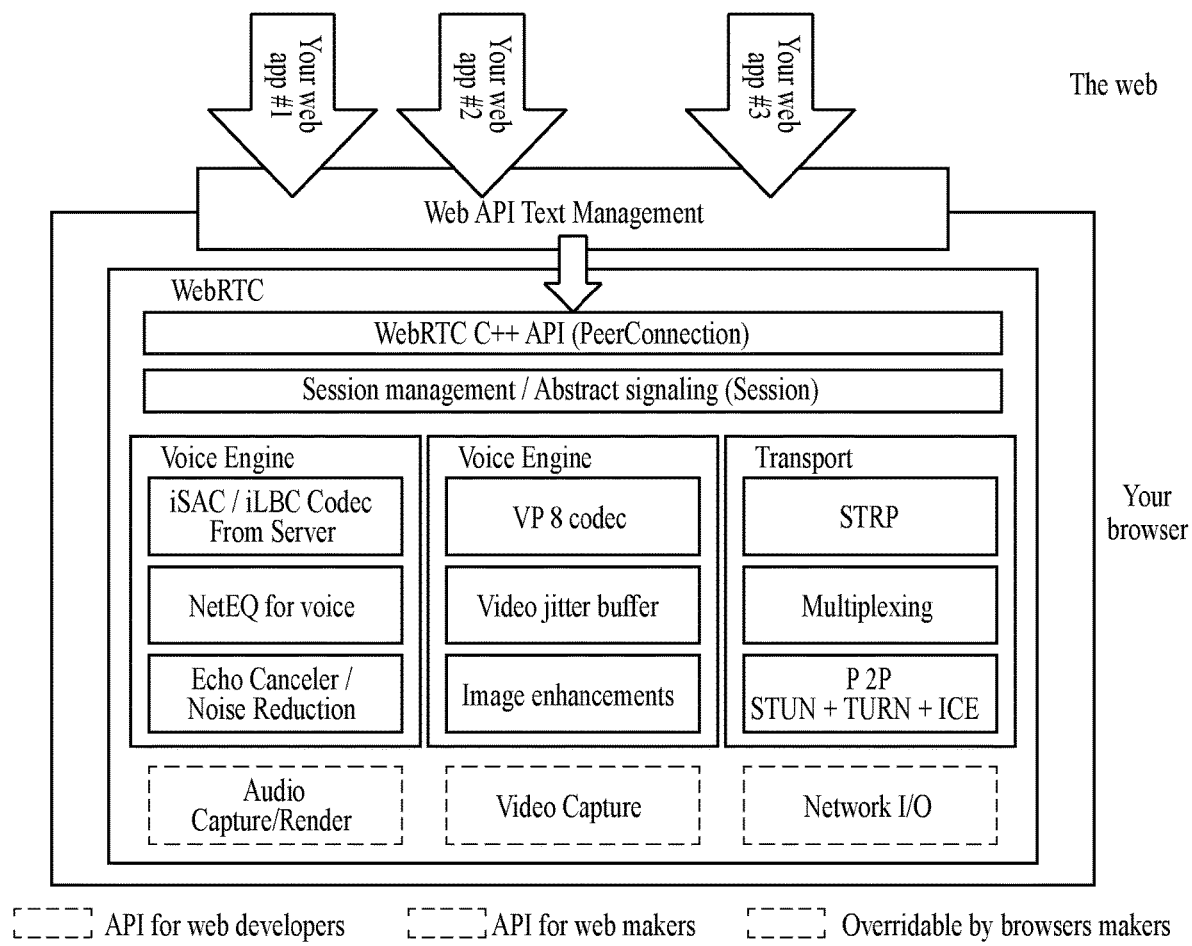
FIG. 8 is a flowchart illustrating a non-limiting preferred embodiment of a WebRTC Architecture and shows a system of components/modules connecting the web and the browser, including webRTC features, voice engine functionality, audio, video, network, and digital signal processing. The system of FIG. 8 includes: a Voice Engine, an iSAC wideband and super wideband audio codec for VoIP and streaming audio, an iLBC narrowband speech codec for VoIP and streaming audio, Opus for constant and variable bitrate encoding from 6 kbit/s to 510 kbit/s, a Jitter Buffer, an Acoustic Echo Canceler (AEC), a Noise Reduction component, a Video Engine, a low latency VP8 video codec configured (adapted) for RTC, a Dynamic Video Jitter Buffer, and an Image enhancements component that removes video noise from the image capture by the webcam.

FIG. 8 is a flowchart illustrating a non-limiting preferred embodiment of a WebRTC Architecture and shows a system of components/modules connecting the web and the browser, including webRTC features, voice engine functionality, audio, video, network, and digital signal processing. The system of FIG. 8 includes: a Voice Engine, an iSAC wideband and super wideband audio codec for VoIP and streaming audio, an iLBC narrowband speech codec for VoIP and streaming audio, Opus for constant and variable bitrate encoding from 6 kbit/s to 510 kbit/s, a Jitter Buffer, an Acoustic Echo Canceler (AEC), a Noise Reduction component, a Video Engine, a low latency VP8 video codec configured (adapted) for RTC, a Dynamic Video Jitter Buffer, and an Image enhancements component that removes video noise from the image capture by the webcam.

FIG. 9 is a flowchart illustrating a non-limiting preferred embodiment of a Web RTC Middlebox Security Issues and shows a DTLS peer encryption designed for P2P connection between users with SFU, DTLS peer encryption fails to encrypt multiple video streams. FIG. 9 shows the problems with existing generic WebRTC Signaling server connections and the need for a security solution.

Figure 10:
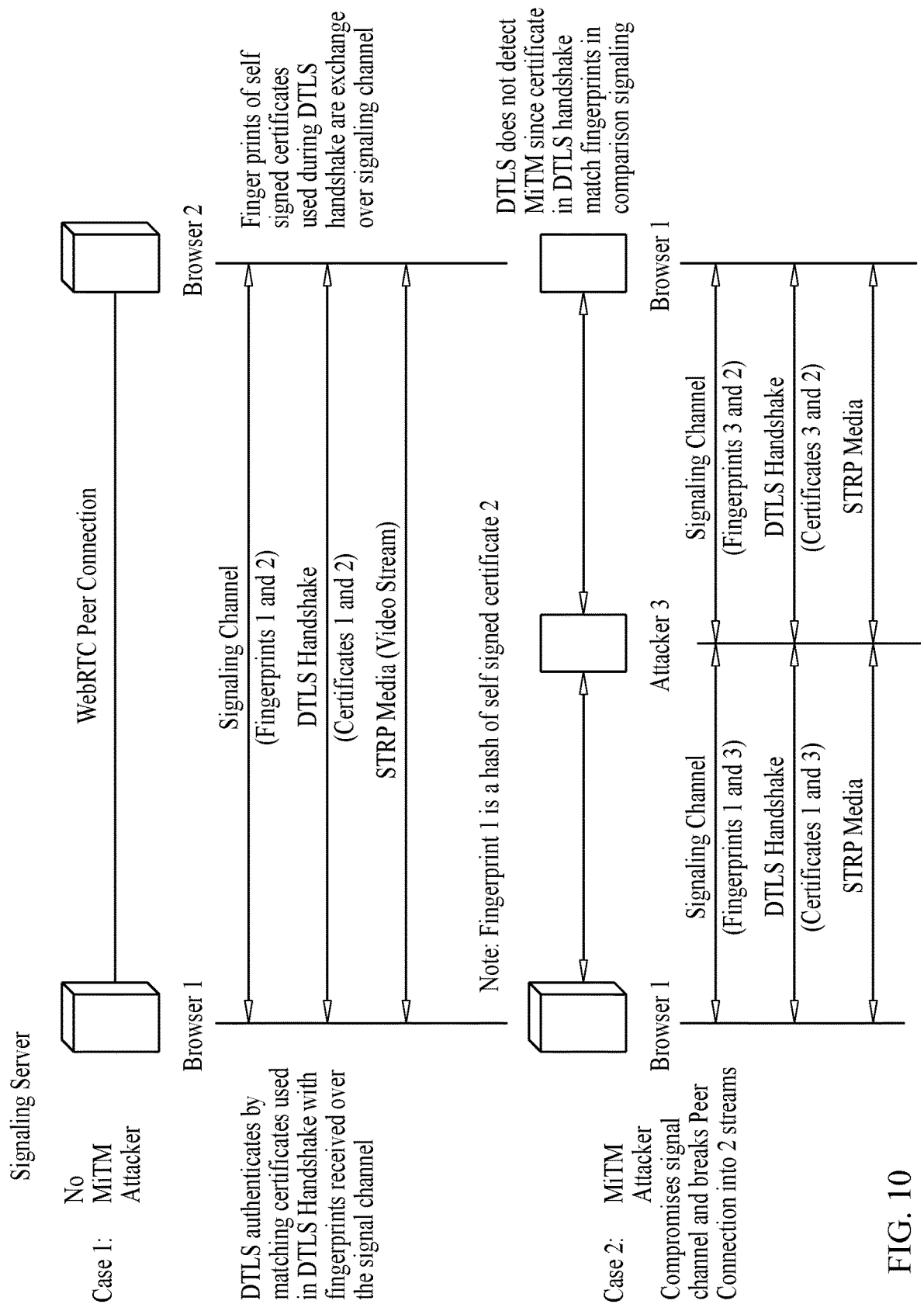
FIG. 10 is a flowchart illustrating a non-limiting preferred embodiment of MITM attacks on WebRTC peer communications with a signaling server and shows a handshake diagram showing Signaling to provision the webRTC peer connection.

FIG. 10 is a flowchart illustrating an example of Man-in-the-Middle (MITM) attacks on WebRTC peer communications with a signaling server and shows a handshake diagram showing Signaling to provision the webRTC peer connection. FIG. 10 shows how a MITM attacker can compromise a signal channel and break peer connections into two streams. FIG. 10 shows how DTLS does not detect MITM since the certificate in DTLS handshake matches the fingerprints in comparison Signaling. FIG. 10 shows the problem with existing generic WebRTC Signaling server connections and the need for a security solution.

Figure 11:
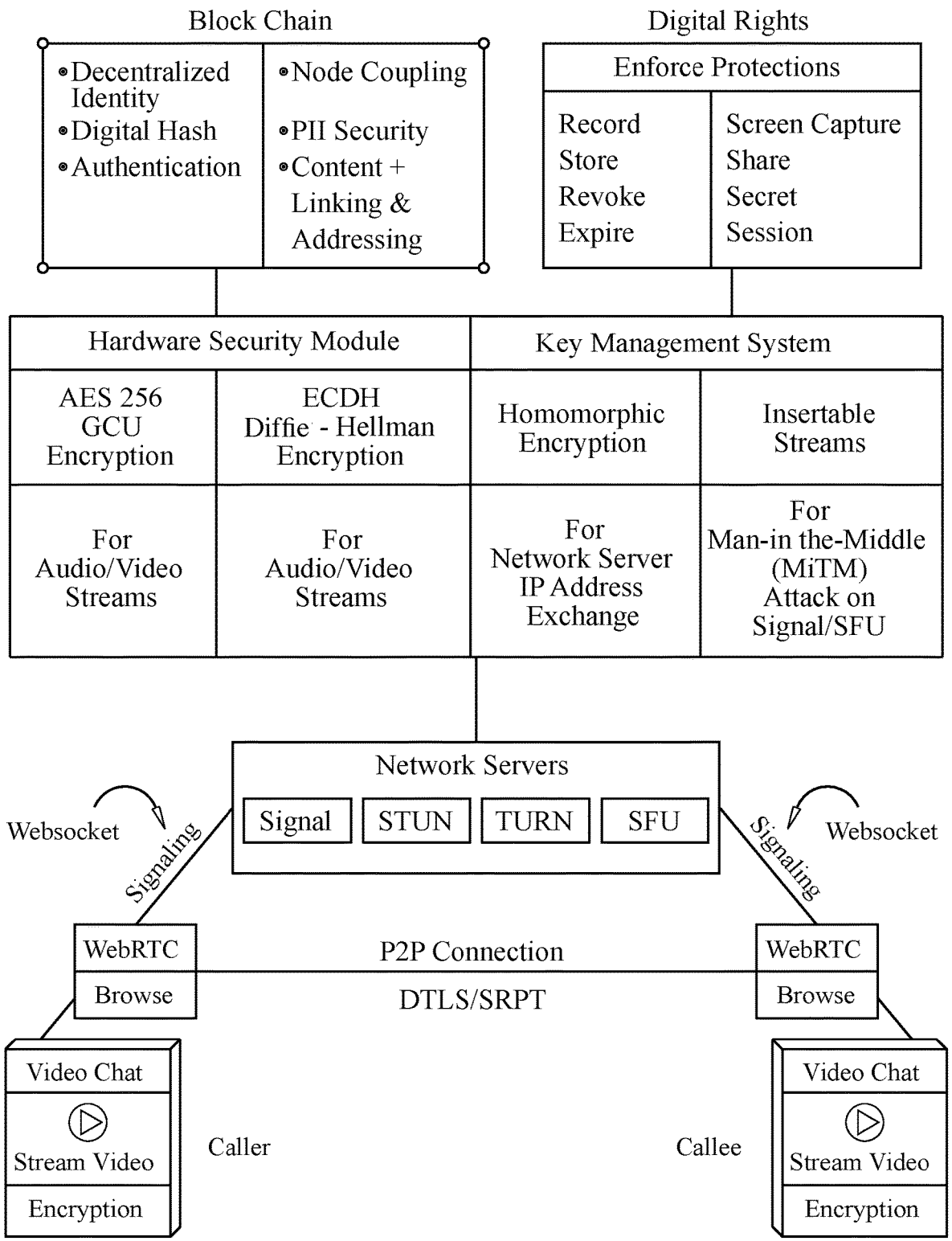
FIG. 11 is a flowchart illustrating a non-limiting preferred embodiment of a Distributed Trust Platform and shows a blockchain and digital rights integration into the secure webRTC P2P connection.

FIG. 11 is a flowchart illustrating a non-limiting preferred embodiment of a Distributed Trust Platform and shows a blockchain and digital rights integration into the secure WebRTC P2P connection. FIG. 11 shows a Blockchain module provides decentralized identity, digital hash, and authentication. The Blockchain module also provides Group Node Coupling, PII security, and Content Linking and Content Addressing.

FIG. 11 shows a Digital Rights module providing enforcement of DRM restrictions and options selected from record, store, revoke, expire, screen capture, share, secret, session level, and so forth. FIG. 11 shows the Distributed Trust Platform also having a Hardware Security module and Key Management system. The Hardware Security module may include AES256 GCU encryption and ECDH Diffie-Hellman encryption for audio and video streams. The Key Management system provides encryption and can include homomorphic encryption, to protect the Network Server IP Address Exchange. The Key management system can also include insertable streams to protect against MITM attacks on the Signal/SFU servers and communications.

FIG. 11 shows the Distributed Trust platform in communication with the Network Servers (Signal, STUN, TURN, SFU). FIG. 11 shows a Caller Video Chat app having a WebRTC module connected to a browser functionality (or local browser) in communication with the Network Servers for discovery and establishment of the P2P connection, with the DTLS and SRPT, to the Callee Video Chat app. FIG. 11 shows a non-limiting option of using websocket Signaling between the Video Chat apps and the entire Cloud Platform.

Figure 12:
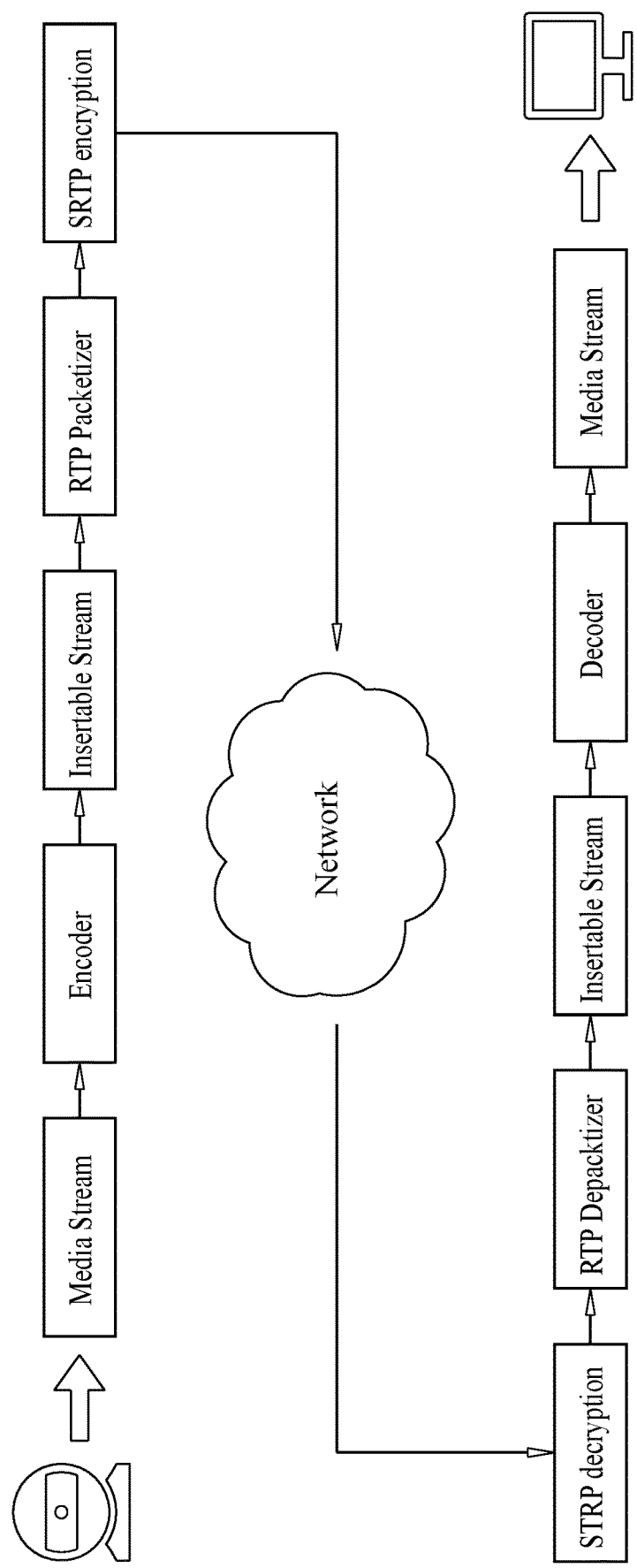
FIG. 12 is a flowchart illustrating a non-limiting preferred embodiment of an Insertable Media Streams for Media Conferencing with an SFU and shows steps from camera through network to a recipient viewing screen for insertable media stream for media conferencing with an SFU.

FIG. 12 is a flowchart illustrating a non-limiting preferred embodiment of an Insertable Media Streams for Media Conferencing with an SFU and shows steps from camera through network to a recipient viewing screen for insertable media stream for media conferencing with an SFU. FIG. 12 shows a camera attached to a Sender device having a Video Chat app sending a media stream to an encoder, the encoder converting to an insertable stream, and then forwarding to an RTP packetizer, before SRPT encryption is added and it is forwarded to the Network. FIG. 12 shows that arriving from the Network, the stream is STRP decrypted, sent to an RTP depacketizer to obtain an Insertable Stream, the insertable stream is decoded to a media stream and the media stream is consumed on a display.

Figure 13:
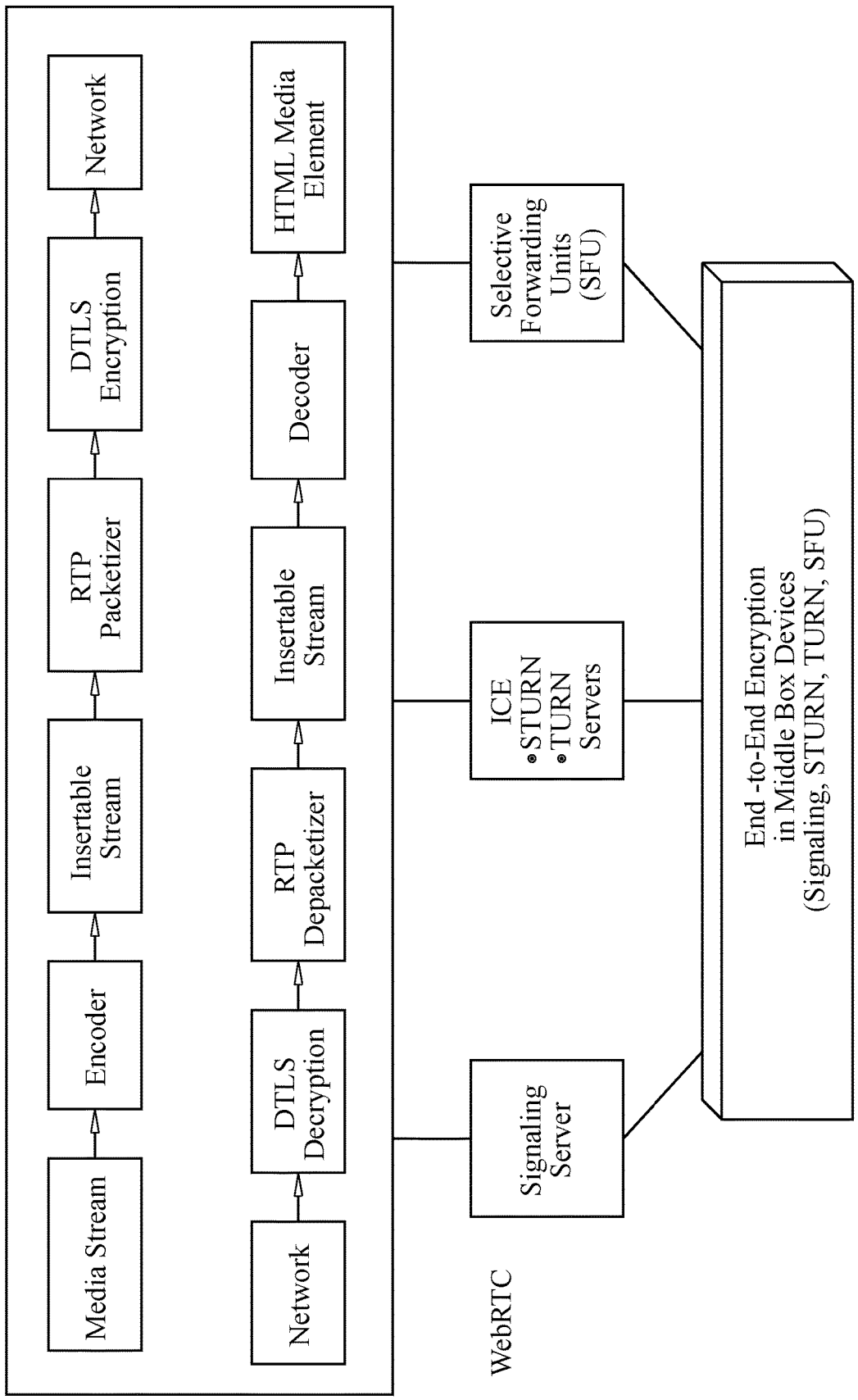
FIG. 13 is a flowchart illustrating a non-limiting preferred embodiment of End-to-End encryption with webRTC insertable stream in a middle box device in a video stream.

FIG. 13 is a flowchart illustrating a non-limiting preferred embodiment of End-to-End encryption with webRTC insertable stream in a middle box device in a video stream. FIG. 13 shows a camera attached to a Sender device having a Video Chat app sending a media stream to an encoder, the encoder converting to an insertable stream, and then forwarding to an RTP packetizer, before DTLS encryption is added and it is forwarded to the Network. FIG. 13 shows that arriving from the Network, the stream is DTLS decrypted, sent to an RTP depacketizer to obtain an Insertable Stream, the insertable stream is decoded to a HTML media element, and the HTML media element is consumed on a display that is similarly connected using a Video chat app via WebRTC.

Figure 14:
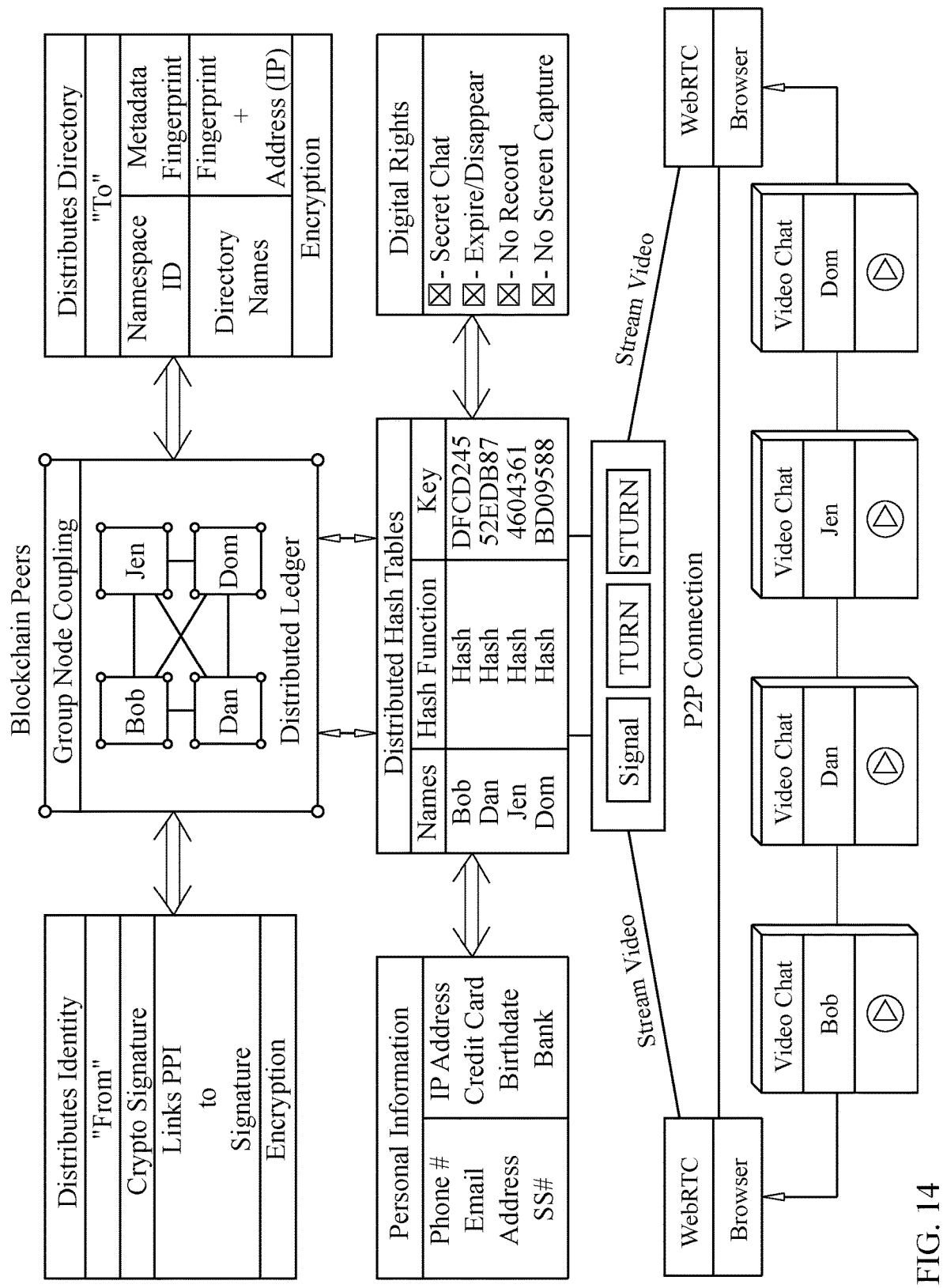
FIG. 14 is a flowchart illustrating a non-limiting preferred embodiment of a Blockchain with Distributed Identity and Directory Distributed Hash Tables with Group Node Coupling and shows blockchain peers having identity function, a distributed ledger for group node coupling, a directory, encryption, personal ID, hash tables, and digital rights permissions.

FIG. 14 is a flowchart illustrating a non-limiting preferred embodiment of a Blockchain with Distributed Identity and Directory Distributed Hash Tables with Group Node Coupling and shows blockchain peers having identity function, a distributed ledger for group node coupling, a directory, encryption, personal ID, hash tables, and digital rights permissions. FIG. 14 shows Video Chat app users Bob, Dan, Jen, and Dom. Video Chat app user Bob sends a request for a Group Chat. As a User, Bob's contact list includes Dan, Jen, and Dom. Accordingly, when the WebRTC module contacts the Cloud Servers, a Blockchain Peers module provides Group Node Coupling using a Distributed Ledger connected to a key-value pairing system in Distributed Hash Tables. The personal information for Bob, Dan, Jen, Dom is securely stored and accessed without being shared or exposed, but can nonetheless be used for connecting the parties. Personal information can include a telephone number, an email, a physical address, a social security number, an IP address, a credit card, a birthdate, and/or banking or other third party account information. The Blockchain Peers module manages distributed identity, provides a crypto signature, and links the PPI to the signature, in an encrypted process. The Blockchain Peers module also manages a distributed directory with a Namespace ID connected to Metadata Fingerprints, and Directory Names connected to a Fingerprint and an IP address, in an encrypted process. FIG. 14 also shows the integration of the Digital Rights module with the Blockchain Peers module.

Figure 15:
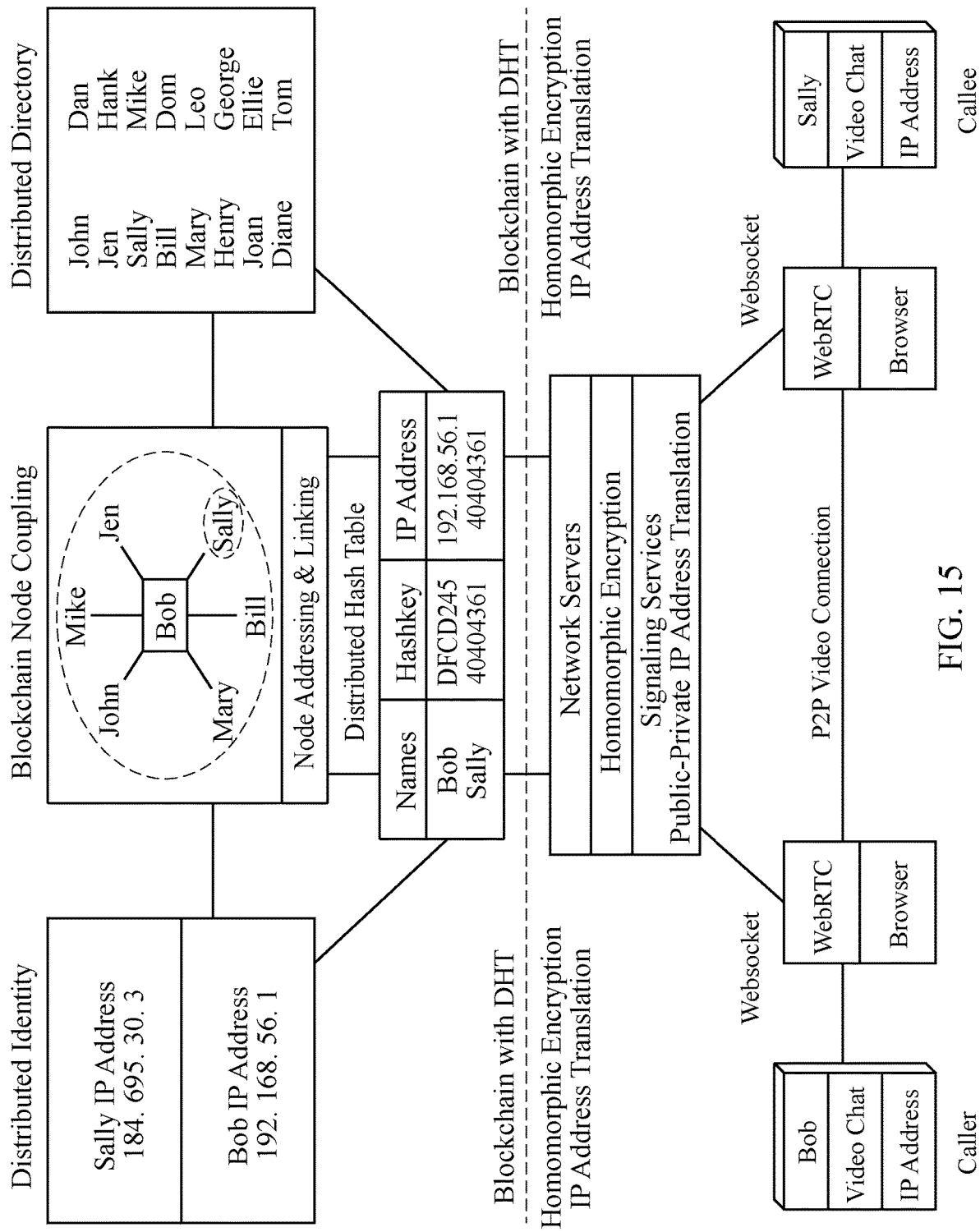
FIG. 15 is a flowchart illustrating a non-limiting preferred embodiment of a Private Blockchain with Distributed Hash Tables and Group Node and shows an example of blockchain peers having identity function, a distributed ledger for group node coupling, a directory, encryption, personal ID, hash tables, blockchain DHT, homomorphic encryption for a P2P video connection.

FIG. 15 is a flowchart illustrating a non-limiting preferred embodiment of a Private Blockchain with Distributed Hash Tables and Group Node and shows an example of blockchain peers having identity function, a distributed ledger for group node coupling, a directory, encryption, personal ID, hash tables, blockchain DHT, homomorphic encryption for a P2P video connection. FIG. 15 shows Caller Bob using the Video Chat app on a device having a specific IP address connecting to the (Network) Signaling Server using the WebRTC module with browser functionality. The Signaling server accesses the Blockchain with DHT to match Bob's and Sally's IP address using a hash key within a Distributed Hash Table. The Blockchain Group Node Coupling module provides the distributed identity and distributed directory for node addressing and linking the user names with their IP addresses.

FIG. 16 is a flowchart illustrating a non-limiting preferred embodiment of a DRM Functional Architecture. When Streamed Videos are created, the Video System ensures that rights are validated, assigned and approved to their owners. In the distribution and storage of the system, the content and metadata are managed with the licenses and transactions. After content has been accessed and downloaded, the system enforces the rights associated with the content by providing proper permissions to access, use and modify the content. FIG. 16 shows that Content Management includes the use of a Repository and a Trading Platform for the Content, Metadata, Payment services, and Distribution.

Figure 17:
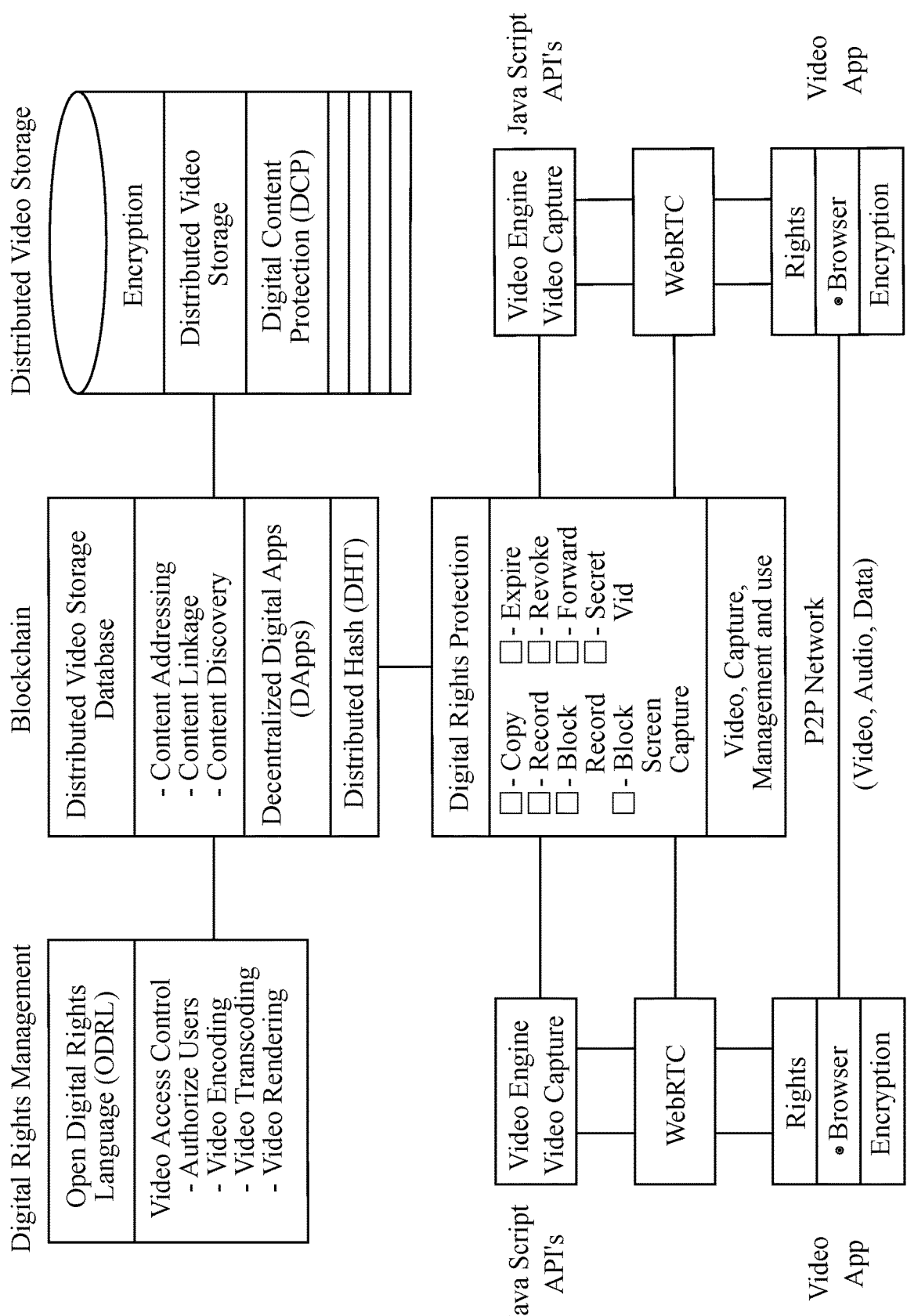
FIG. 17 is a flowchart illustrating a non-limiting preferred embodiment of Distributed Video Storage with Blockchain and DRM and shows functional modules for DRM, blockchain, distributed video storage, digital rights protection, with webRTC connected video apps in a P2P network.

FIG. 17 is a flowchart illustrating a non-limiting preferred embodiment of Distributed Video Storage with Blockchain and DRM and shows functional modules for DRM, blockchain, distributed video storage, digital rights protection, with WebRTC connected video apps in a P2P network. FIG. 17 shows an example of an Open Digital Rights Language (ODRL) module connected to a Blockchain module for Video Access Control for the authorization of user, video encoding, video transcoding, and video rendering. FIG. 17 also shows a Distributed Video Storage platform connected to the Blockchain module having encryption, distributed video storage modules, and digital content protection (DCP). The Blockchain module includes a Distributed Video Storage database and provides content addressing, linkage, and discovery. The Blockchain module also provides decentralized digital apps and distributed hash tables.

Figure 18:
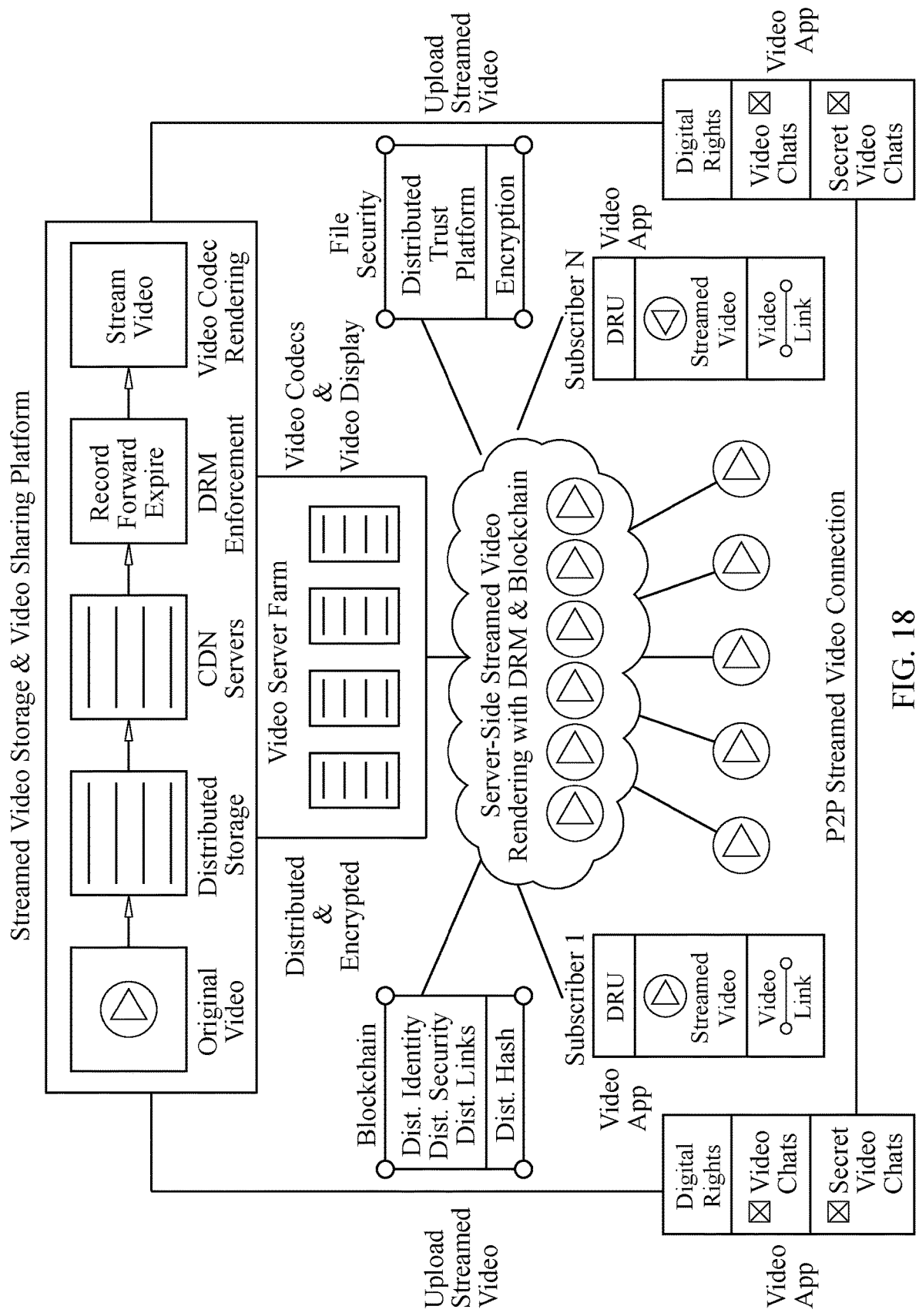
FIG. 18 is a flowchart illustrating a non-limiting preferred embodiment of a streamed video storage and video sharing platform accessed by a VODEO chat app over a P2P network.

FIG. 18 is a flowchart illustrating a non-limiting preferred embodiment of a streamed video storage and video sharing platform accessed by a VODEO chat app over a P2P network. FIG. 18 shows how a VODEO subscriber app, Subscriber 1 thru Subscriber N, can be installed on a mobile phone or desktop computer for video chat and streamed video, and will have a digital rights selection module, video chat, and secret video chat. The VODEO app on the mobile or desktop user device has a streaming video module (programming, hardware, and/or firmware), a digital rights module, and a video link module and is in communication with a Server-Side Stream Video Rendering Cloud Platform with DRM & Blockchain. The Server-side Streamed Video Rendering Server is connected to a Video Server Farm for storage and playback of videos, and has distributed storage technology, encryption technology, video CODECs, and video display technology.

In operation, the Video Server Farm receives original video, saves to distributed storage, utilizing CDN servers, includes a DRM enforcement module, and serves streamed video with server-side video CODEC rendering.

FIG. 18 shows how a Distributed Trust Platform module (ELEE), and a Blockchain-Distributed Hash Table (BC-DHT) module are integrated into the Server-side Streamed Video Rendering server.

In operation, the sender subscriber app can establish a "push-button" streaming video P2P connection to a receiver subscriber app by sending a request or invite containing an identifier, such as a telephone number from the contact list collected in the subscriber app and stored in the Cloud Platform using the Blockchain-Distributed Hash Table, along with the sender's IP address and discovery invitation text, to the module/server of the Cloud Platform. The server uses an established messaging protocol such as SMS, email, etc. to contact the receiver's subscriber app. The receiver can then read the discovery invitation and accept (or decline) the invite, which sends the receiver's IP address along with an acceptance message, if desired, in reply to the server. The server then establishes a peer-to-peer connection between the sender subscriber app and the receiver subscriber app.

FIG. 18 also shows that, in addition to facilitating the P2P discovery and peer-to-peer video/audio/data communication ("VODEO"), the platform provides the subscribers with the ability to securely upload/download and share video/audio/data (media/content), securely save the content using distributed cloud storage, apply DRM permissions to the content, encrypt the content end-to-end, and provide scalable cloud-based content addressing, linking, and discovery.

FIG. 18 shows that the encryption key for DRM permissions can be locally stored in connection with a subscriber app and associated playback CODECs. This arrangement provides that a DRM violation by a subscriber results in a revocation of the encryption key which is tied to the CODEC function. Thus, the content is unavailable and cannot be played on the DRM violators device. DRM permissions may include functions selected from: record, store, screen share, expire, offline view, copy, forward, and screen capture. DRm enforcement functions may include: revoke, blacklist, cancel access, disappear subscriber (from contact list), disappear content, and other rights violation responses.

FIG. 18 also shows that the server includes the P2P Signaling server architecture to assist in the P2P discovery and connection. The use of network servers allows the connection by IP address described by the P2P protocol, including NAt traversal to assist in connection to hidden IP addresses.

Figure 19:
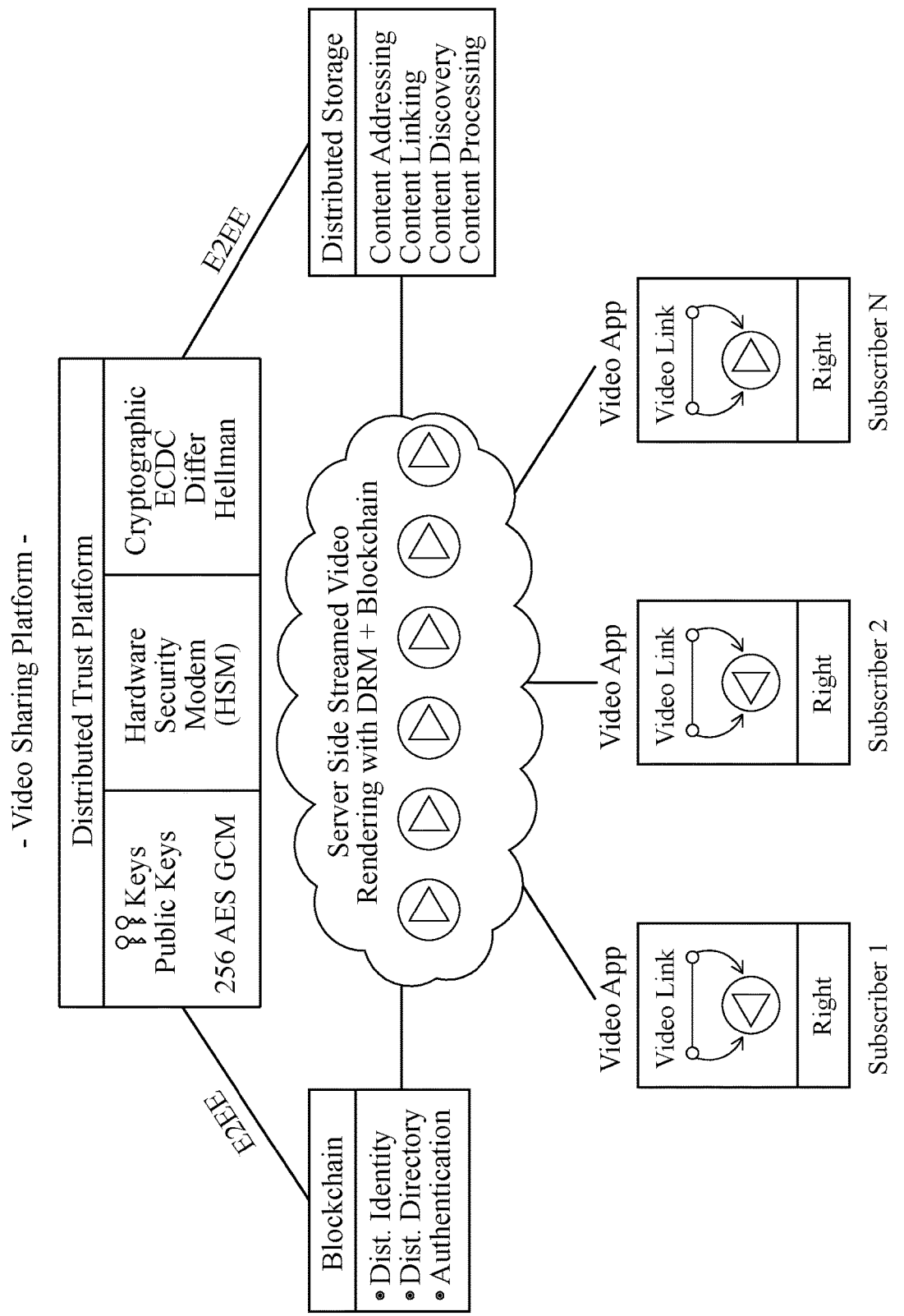
FIG. 19 is a flowchart illustrating a non-limiting preferred embodiment of Server Side Streamed Video Rendering with DRM and Blockchain in a video sharing platform.

FIG. 19 is a flowchart illustrating a non-limiting preferred embodiment of Server Side Streamed Video Rendering with DRM and Blockchain in a video sharing platform. FIG. 19 shows how multiple subscribers, each with a video app, where the app is connected to the video sharing platform through the server-side streamed video rendering server with DRM and Blockchain, provides access using video links to stored videos. Each subscriber's video app includes the ability to administer and manage the assigned DRM right or privilege associated with the subscriber as set by the owner of the video. The video is served from a distributed trust platform having 256 AES GCM encryption, a hardware security modem, cryptographic security, including ECDC, and Diffie Hellman Blockchain manages the distributed identity, distributed directory, and authentication. Distributed Storage manages the Content Addressing, Content Linking, Content Discovery, and Content Processing.

Figure 20:
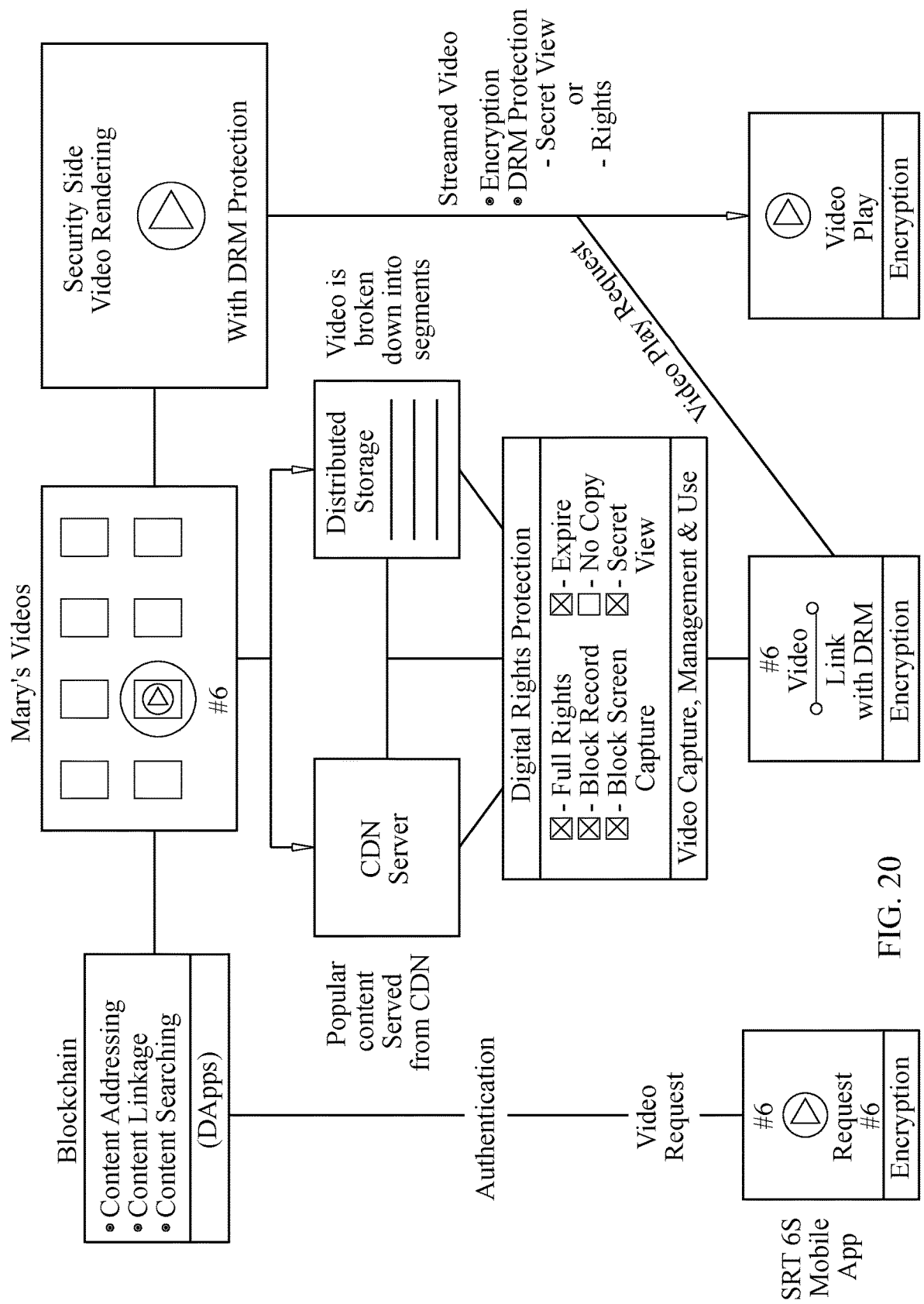
FIG. 20 is a flowchart illustrating a non-limiting preferred embodiment of Streamed Video Sharing Flow from Storage Accessed by an SRTCS Mobile App and shows an example of a shared video video platform with "Mary's" videos in storage, blockchain addressing, link, and search functions, DRM security, distributed storage, popular content server, digital rights protection, connecting two connected mobile apps.

FIG. 20 is a flowchart illustrating a non-limiting preferred embodiment of Streamed Video Sharing Flow from Storage Accessed by an SRTCS Mobile App and shows an example of a shared video video platform with "Mary's" videos in storage, blockchain addressing, link, and search functions, DRM security, distributed storage, popular content server, digital rights protection, connecting two connected mobile apps.

FIG. 20 shows SRT 6S mobile app sending an authenticated video request to a Cloud Server having a Private Blockchain for content addressing, linkage and searching. The delivery app accesses Mary's Video, e.g. video #6, from distributed storage and assembles segment playback using a CDN Server. The DRM permissions are processed and a video link to video #6 is generated, which can be shared in an encrypted communication. The video #6 is then rendered at the server level, server-side rendering, and a streamed video is delivered for video playback.

Figure 21:
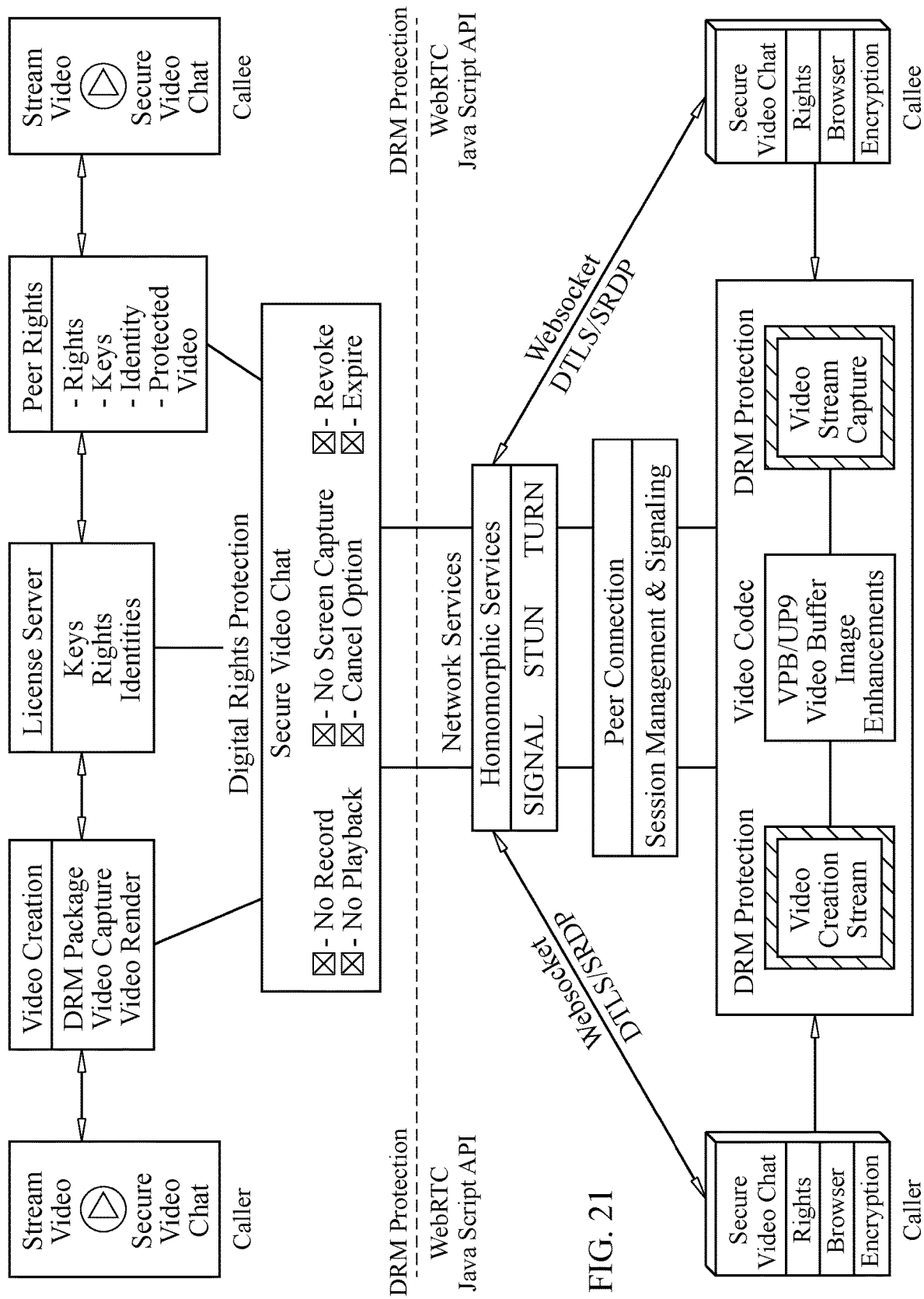
FIG. 21 is a flowchart illustrating a non-limiting preferred embodiment of Digital Rights Protection (DRM) for Secure Video Chat and shows a DRM protection layer interfacing with a WebRTC and Javascript API layer.

FIG. 21 is a flowchart illustrating a non-limiting preferred embodiment of Digital Rights Protection (DRM) for Secure Video Chat and shows a DRM protection layer interfacing with a WebRTC and Javascript API layer.

FIG. 21 shows a Caller connecting to a Callee by having the Caller App use websocket connection with DTLS/SRDP connect to the Network Services (Platform). In this embodiment the Network uses homomorphic encryption for communicating with the Apps and a Peer Connection and Session Management & Signaling Server establishes the peer connection between the Caller and Callee. The Network Services are provided in this example using a WebRTC protocol with a Javascript API. DRM protection is shown linked to the connection (discovery) server(s) whereby the Caller has engaged in video creation (capture/render), assignment of DRM permissions, and where the video is stored and made available using a License Server. The License Server coordinates the cryptographic keys, rights (permissions), and identities. The peer connection that provides the streamed video connects the Caller to the Callee and uses a service to provide video stream creation connected to cloud-video codecs for video stream capture and sharing.

Figure 22:
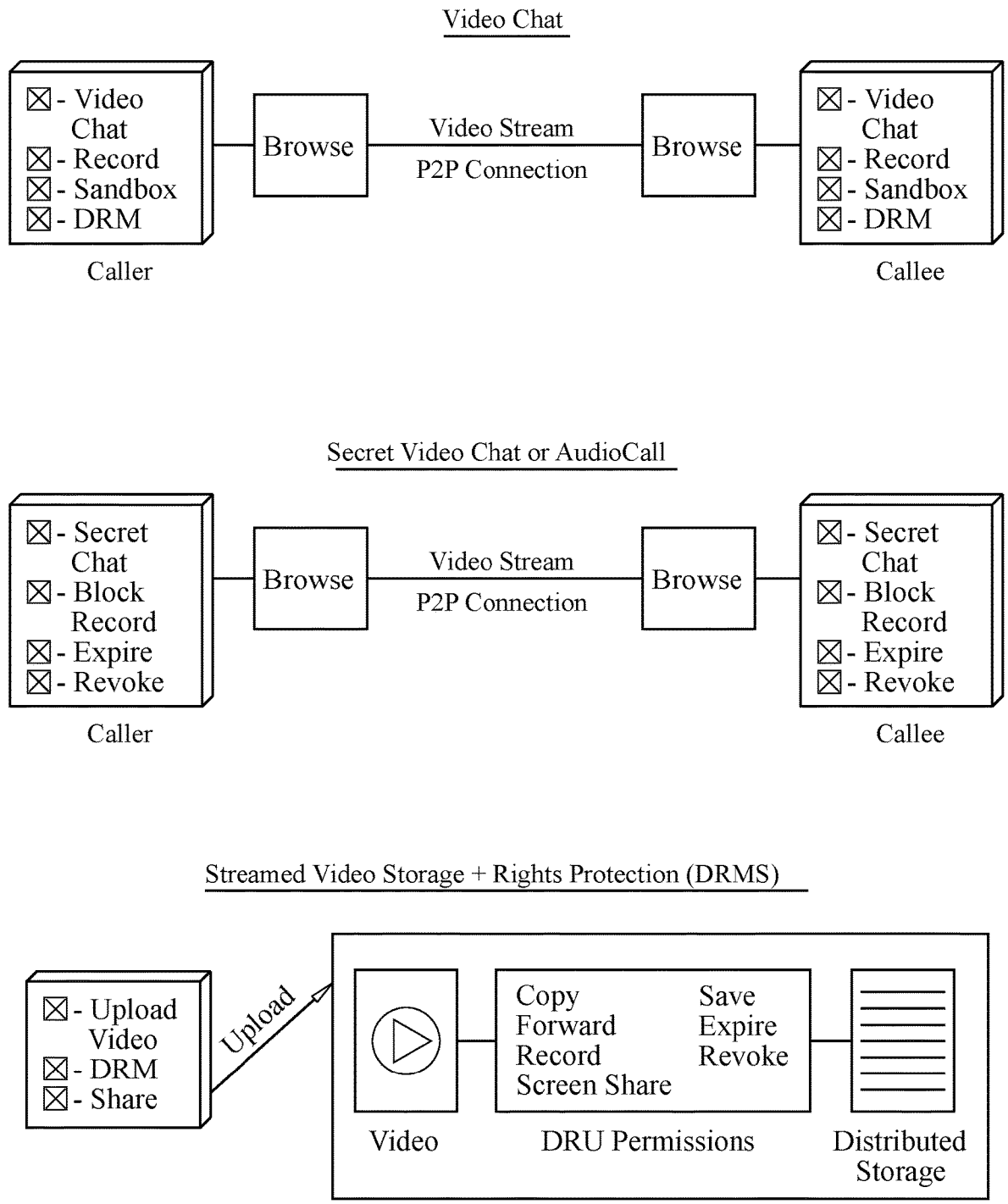
FIG. 22 is a flowchart illustrating a non-limiting preferred embodiment of a VODEO app workflow and shows three parallel streams showing a video chat, a secret chat or audio call, stream video storage and DRMS rights protection.

FIG. 22 is a flowchart illustrating a non-limiting preferred embodiment of a VODEO app workflow and shows three parallel streams showing a video chat, a secret chat or audio call, stream video storage and DRMS rights protection.

Figure 23:
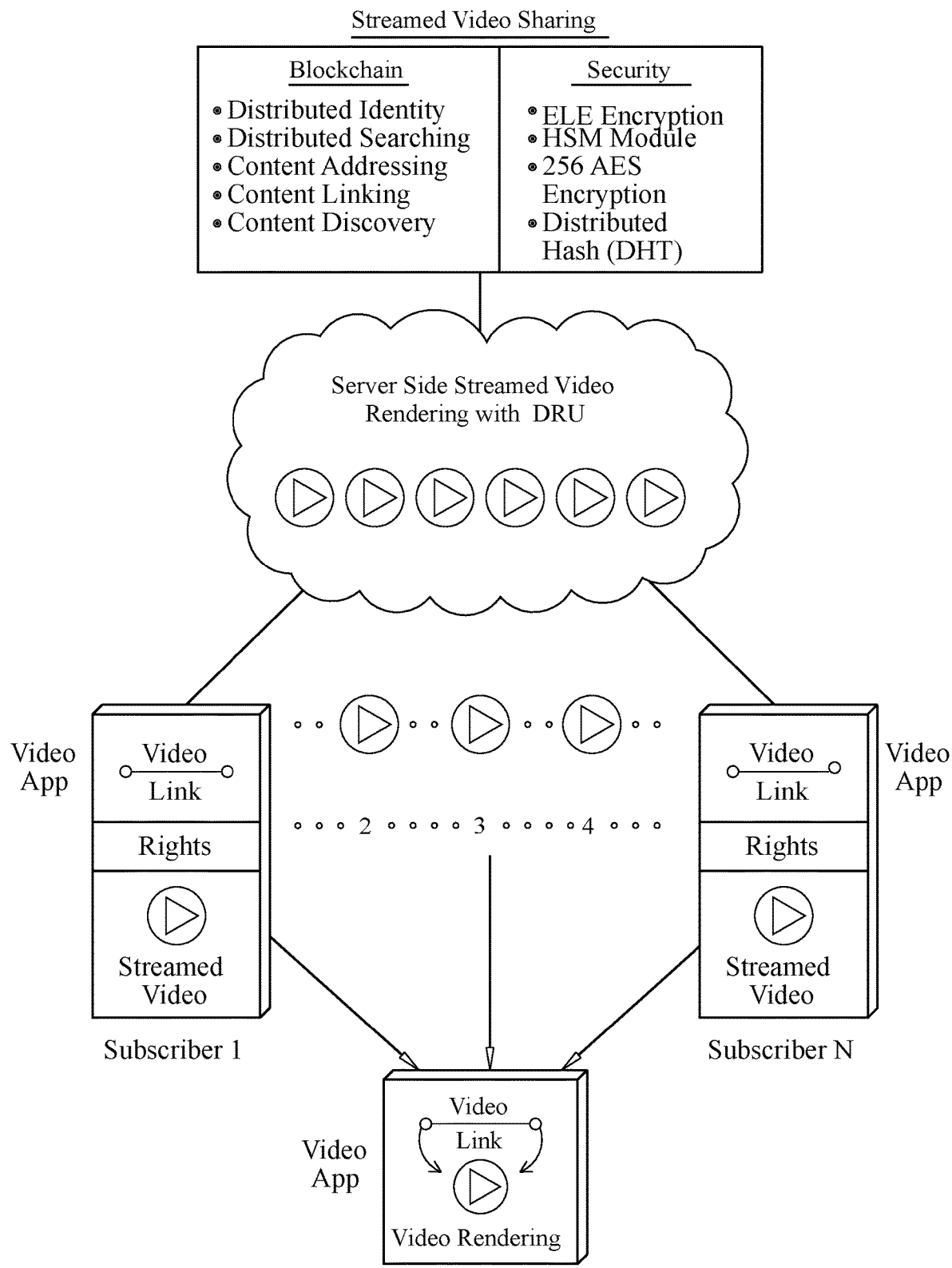
FIG. 23 is a flowchart illustrating a non-limiting preferred embodiment of streamed video sharing between two video apps of subscriber 1 and subscriber 2, and with cloud-based server side streamed video rendering with DRU.

FIG. 23 is a flowchart illustrating a non-limiting preferred embodiment of streamed video sharing between two video apps of subscriber 1 and subscriber 2, and with cloud-based server side streamed video rendering with DRU. FIG. 23 shows blockchain managing the distributed identity, distributed searching, content addressing, content linking, and content discovery. FIG. 23 also shows security provided by E2E encryption, an HSM module, 256 AES encryption, and distributed hash tables. FIG. 23 also shows server-side streamed video rendering for the digital rights user (DRU). This allows Subscriber 1 to transmit a video link from a cloud service to Subscriber 2 who can then access the streamed video without downloading the content and maintaining the required permissions.

Figure 24:
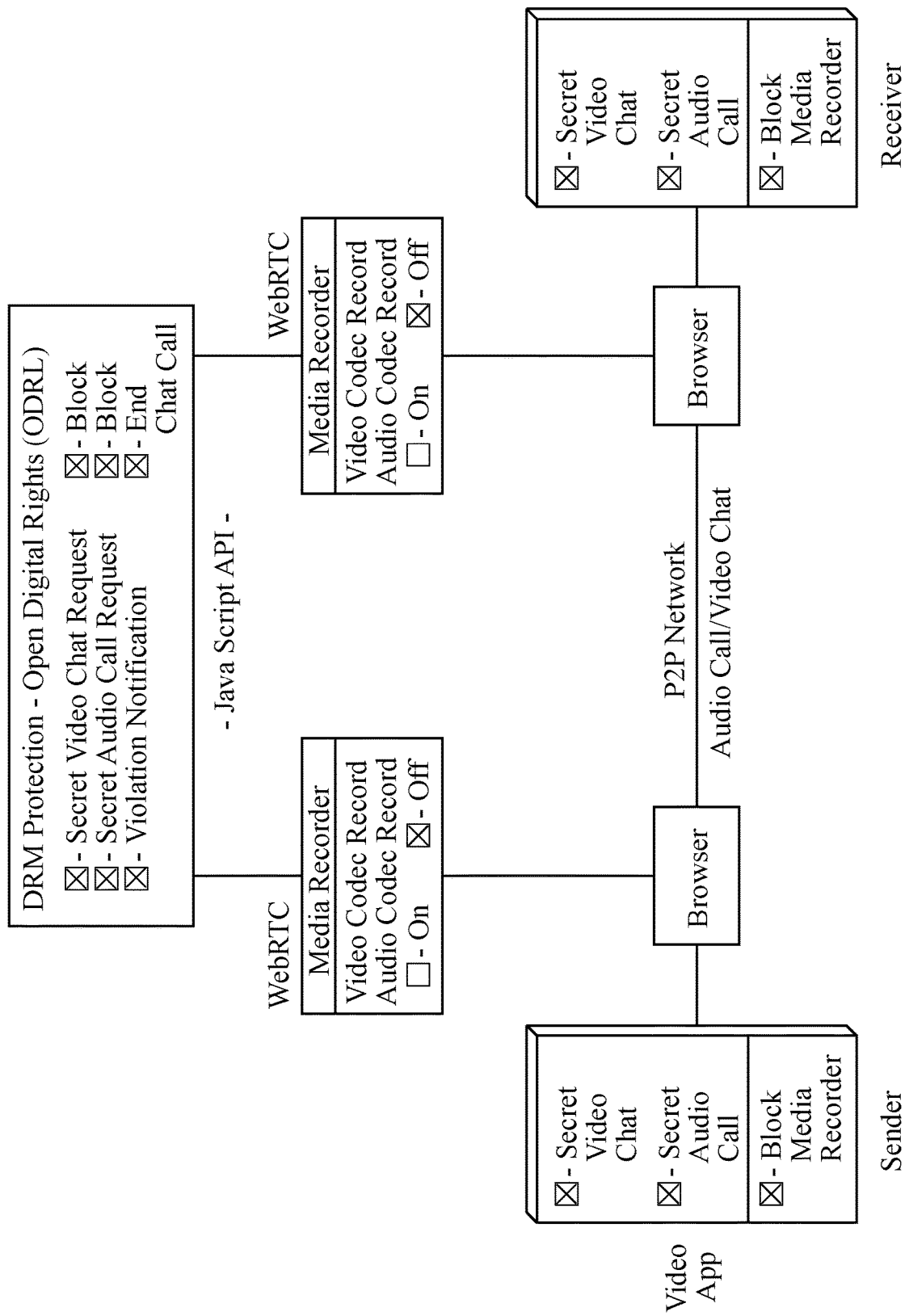
FIG. 24 is a flowchart illustrating a non-limiting preferred embodiment of a Secret Audio Call or Secret Video Chat Using a VODEO app and shows DRM protection with Open Digital Rights and connection using webRTC between a sender and receiver using a video app.

FIG. 24 is a flowchart illustrating a non-limiting preferred embodiment of a Secret Audio Call or Secret Video Chat Using a VODEO app and shows DRM protection with Open Digital Rights and connection using webRTC between a sender and receiver using a video app. FIG. 24 shows a Sender having a video app establishing a P2P connection using a WebRTC discovery and connection system to a Receiver for an audio call or video chat. A browser functionality can be within the mobile app or the mobile app can integrate with the native browser or preferred browser installed on the device. The DRM protection module provides a selection menu to provide various DRM options, including whether the content is a secret video chat, a secret audio call, a notification for violation, and a content block of one or more. A media recorder module provides the ability to toggle on or off the video CODEC for recording or the audio CODEC for recording. A setting in the app allows the user to select whether to block the media recorder or not.

Figure 25:
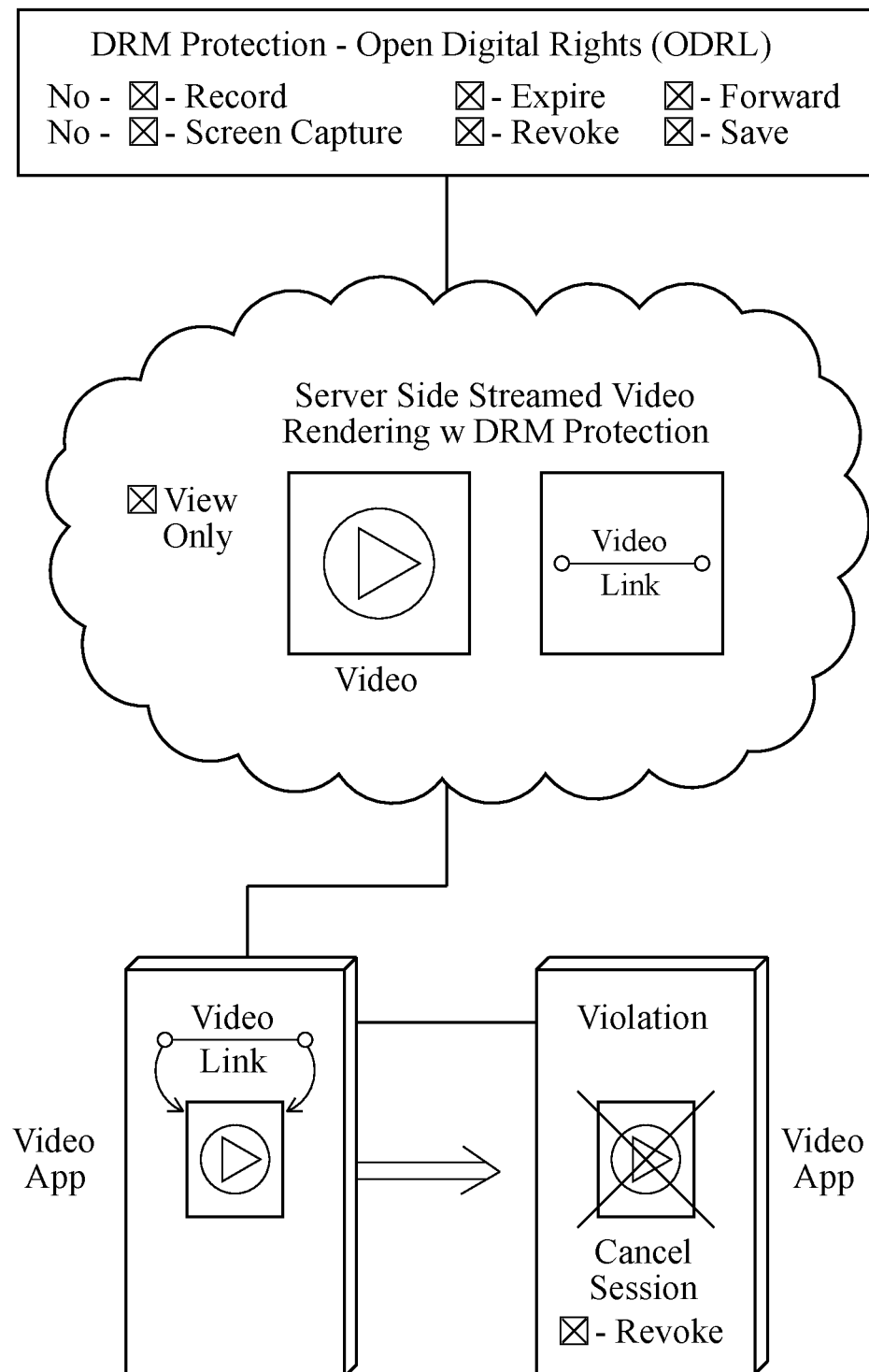
FIG. 25 is a flowchart illustrating a non-limiting preferred embodiment of Streamed Video Sharing Violation and shows a DRM violation where a view-only video session is revoked in a platform having DRM protection and Open Digital Rights.

FIG. 25 is a flowchart illustrating a non-limiting preferred embodiment of Streamed Video Sharing Violation and shows a DRM violation where a view-only video session is revoked in a platform having DRM protection and Open Digital Rights. FIG. 25 shows how a DRM violation by a subscriber results in a revocation of the access link to the content stored in the cloud. Thus, the content is unavailable and cannot be played on the DRM violators device.

Figure 26:
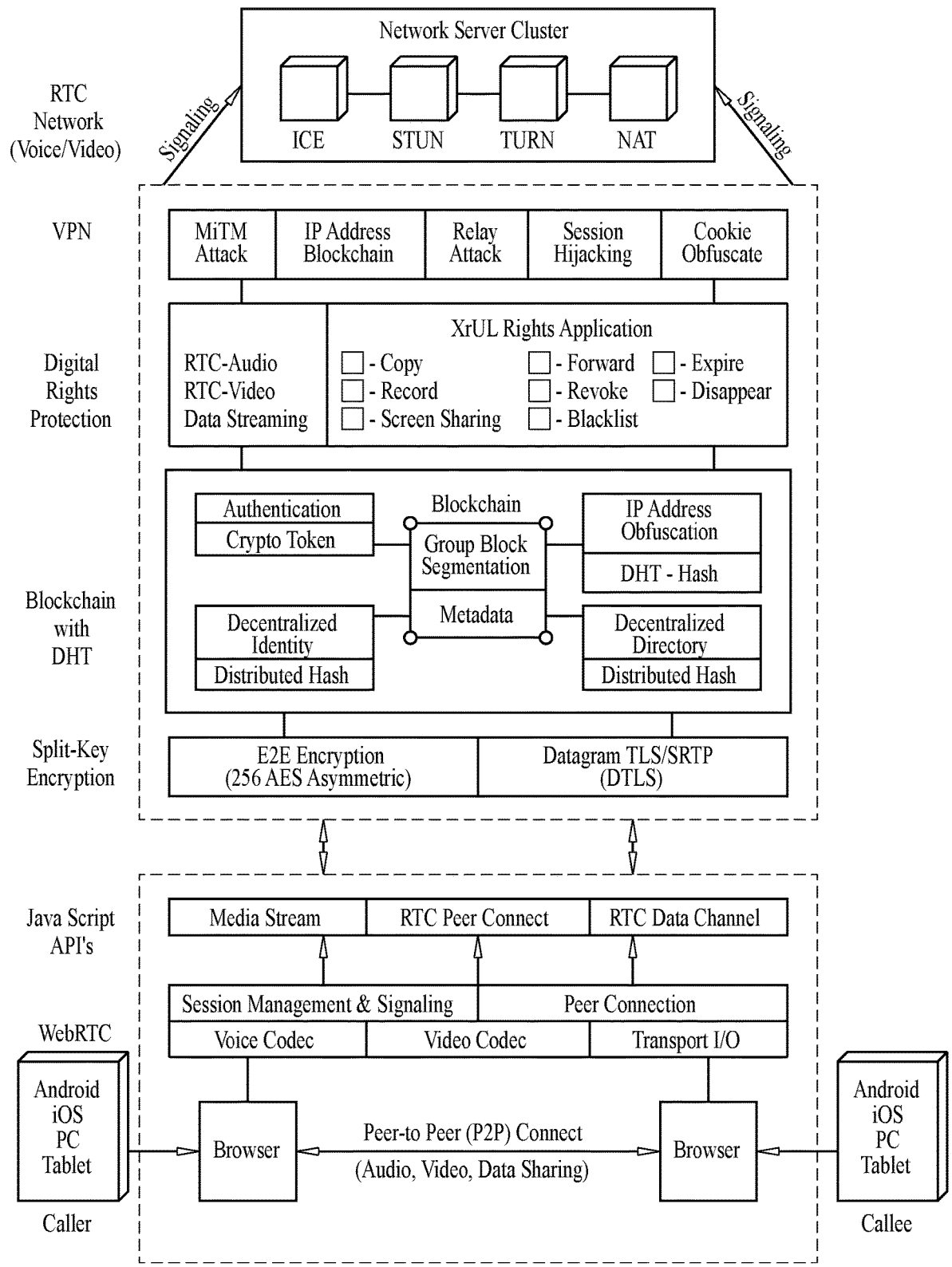
FIG. 26 is a flowchart illustrating a non-limiting preferred embodiment of a Real Time Communication (RTC) Service for Secure Audio and Video over a Browser-based P2P Connection and shows a platform having an RTC network, a VPN, DR protection, blockchain with DHT, split-key encryption, JavaScript APIs, and webRTC to establish and manage a Peer-to-Peer connection for audio, video, or data sharing between a sender/caller and a receiver/callee.

FIG. 26 is a flowchart illustrating a non-limiting preferred embodiment of a Real Time Communication (RTC) Service for Secure Audio and Video over a Browser-based P2P Connection and shows a platform having an RTC network, a VPN, DR protection, blockchain with DHT, split-key encryption, JavaScript APIs, and webRTC to establish and manage a Peer-to-Peer connection for audio, video, or data sharing between a sender/caller and a receiver/callee. FIG. 26 shows an embodiment where a VPN is combined with DRM, Blockchain, DHT, and Split-key encryption in a Cloud-based Security Server. The Cloud Security Server is integrated with the WebRTC Discovery and Connection Server which manages the Network Signaling Servers, and the Session management and Peer Connection Server. In this embodiment, as in others, the device may be an Android mobile/telephone device, an Android tablet or computer, an iOS mobile/telephone device, a Mac OS tablet or computer, a PC device, or other Mobile or Tablet device. In a preferred embodiment, the DRM may include an XrUL Rights Application.

Figure 27:
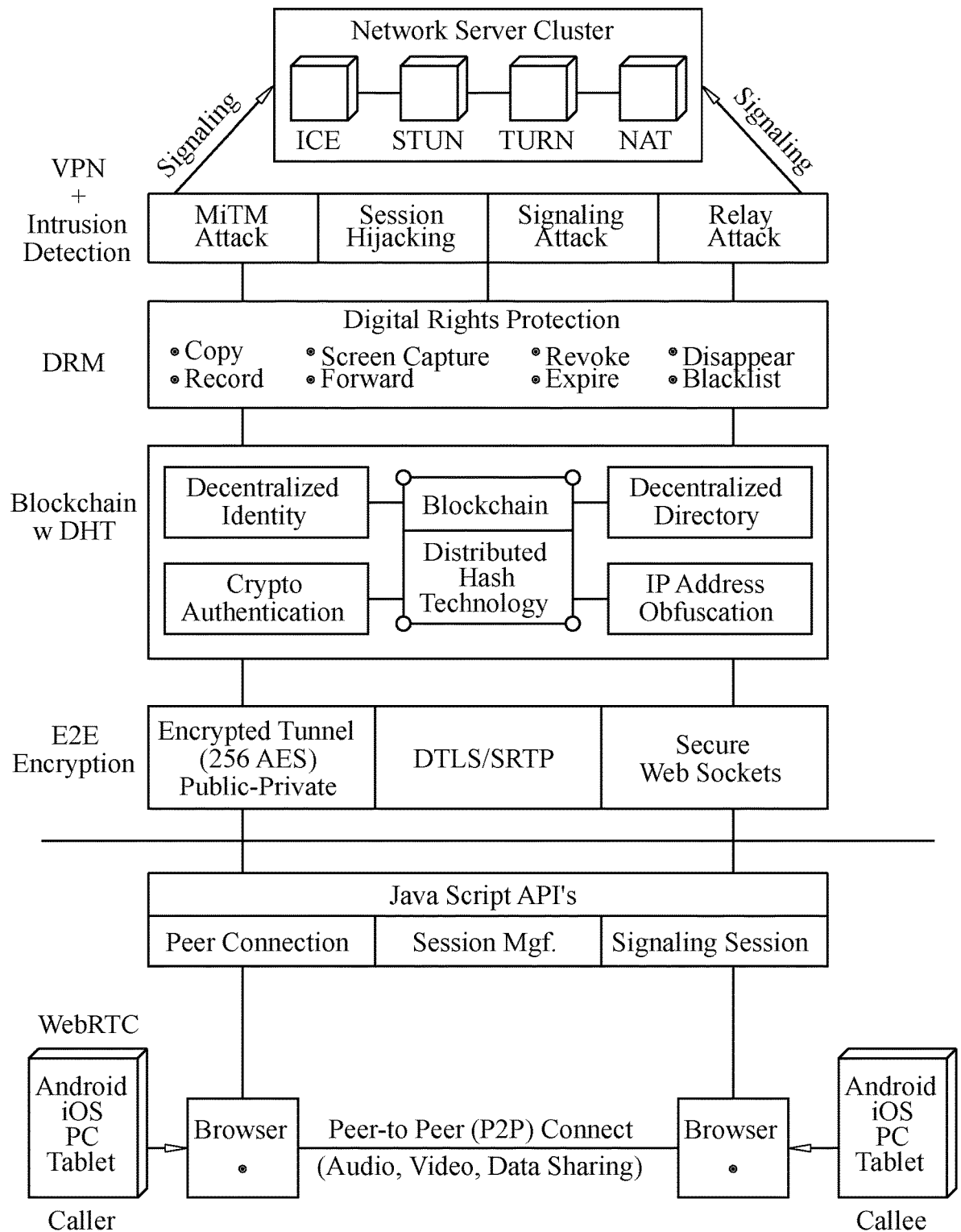
FIG. 27 is a flowchart illustrating a non-limiting preferred embodiment of a Real Time Communication (RTC) Service for Audio, Video Conferencing over a Browser-based P2P Connection with VPN, DRM, Blockchain and E2E and shows a platform/system having an RTC network, DR protection, blockchain with DHT, End-to-End (E2E) encryption, JavaScript APIs, and webRTC to establish and manage a Peer-to-Peer connection for audio, video, or data sharing between a sender/caller and a receiver/callee.

FIG. 27 is a flowchart illustrating a non-limiting preferred embodiment of a Real Time Communication (RTC) Service for Audio, Video Conferencing over a Browser-based P2P Connection with VPN plus Intrusion Detection, DRM, Blockchain and E2E and shows a platform/system having an RTC network, DR protection, blockchain with DHT, End-to-End (E2E) encryption, JavaScript APIs, and webRTC to establish and manage a Peer-to-Peer connection for audio, video, or data sharing between a sender/caller and a receiver/callee.

Figure 28:
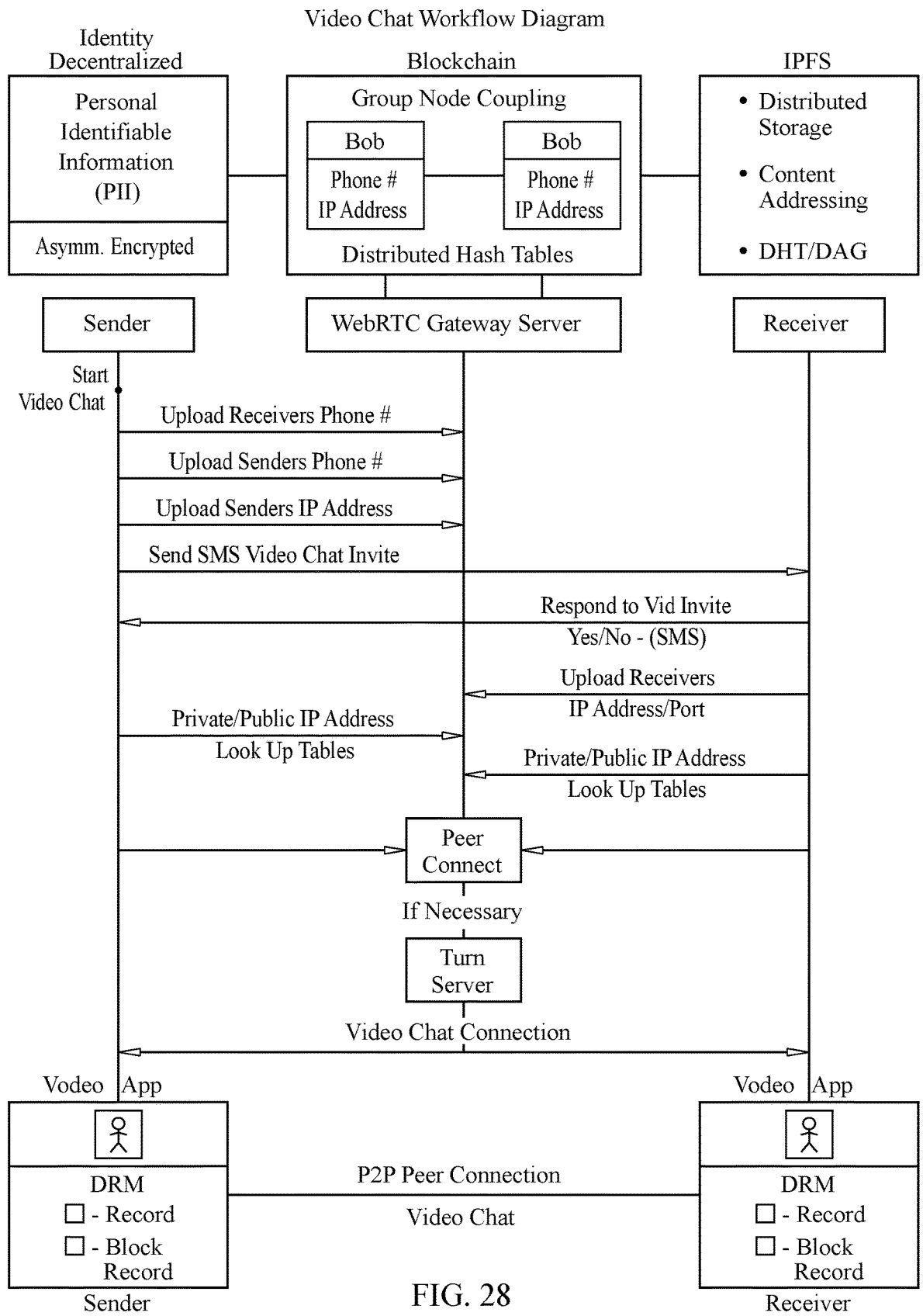
FIG. 28 is a flowchart illustrating a non-limiting preferred embodiment of a Video Chat Workflow Diagram.

FIG. 28 is a flowchart illustrating a non-limiting preferred embodiment of a Video Chat Workflow Diagram. FIG. 28 shows the flowchart starting with a Sender initiating a video chat on a App that is connected to a WebRTC Gateway Server having a Private Blockchain with DHT, an Interplanetary File System (IPFS) Server (Cloud Storage Server) and a Security Module for personally identifiable information (P.I.I.). The sender identifies the receiver on the sender device and pushes a button to peer connect to the receiver for a video chat. The button push commences a process that uploads to the WebRTC Gateway Server a request file or communication containing the receiver telephone number, the sender telephone number, the sender's IP address, and an SMS video chat invite. The WebRTC Gateway Server receives, processes, and forwards the request file to the receiver. The receiver sends a response to the SMS invite, within the App, or using an API within the App integrated with the native or installed messaging software. This response generates within the APP an upload from the receiver of the receiver IP address and port. The sender app and the receiver app are peer-2-peer connected in accordance with WebRTC protocol, and a video chat connection is established.

Figure 29:
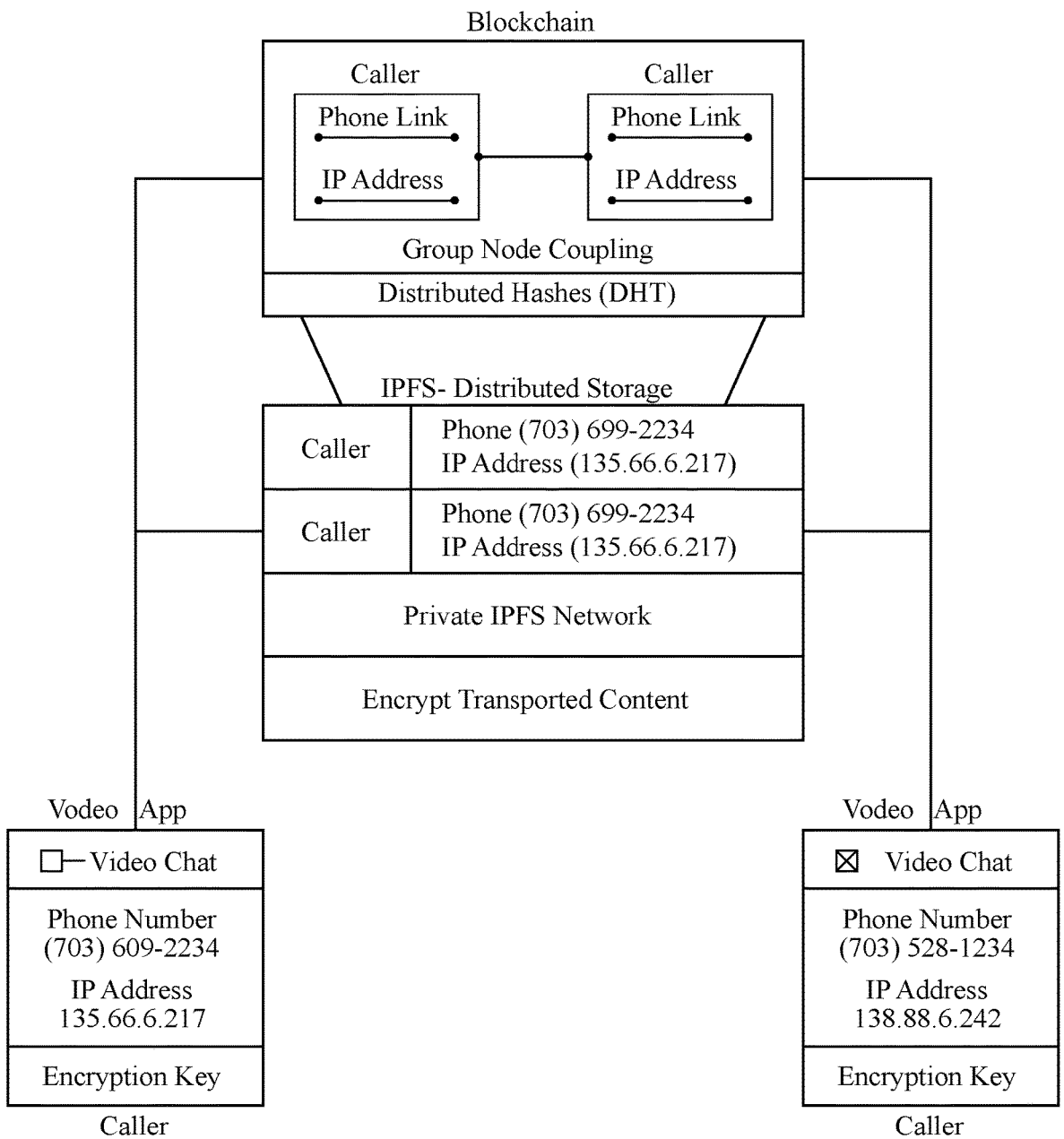
FIG. 29 is a flowchart illustrating a non-limiting preferred embodiment of a WebRTC Video Chat Flow with Blockchain, Signaling Server and VODEO apps.

FIG. 29 is a flowchart illustrating a non-limiting preferred embodiment of a WebRTC Video Chat Flow with Blockchain, Signaling Server and VODEO apps. FIG. 29 shows an example of a VODEO app that connects to the Blockchain where the sender telephone number (key) is associated with the sender IP address (value) and where the receiver telephone address (key) is associated with the receiver IP address (value). The blockchain module is operatively connected to the Signaling server for processing the video chat offer and response communications, discovery, and connection.

FIG. 30 is a flowchart illustrating a non-limiting preferred embodiment of VODEO apps connected in P2P connection and in a Blockchain Network with Group Node Coupling and Distributed Hash Tables. FIG. 30 shows that the group node coupling of subscribers within the Private Blockchain network provides immutable video transaction, date, timestamps, and DHT encryption, e.g. Merkle tree.

Figure 31:
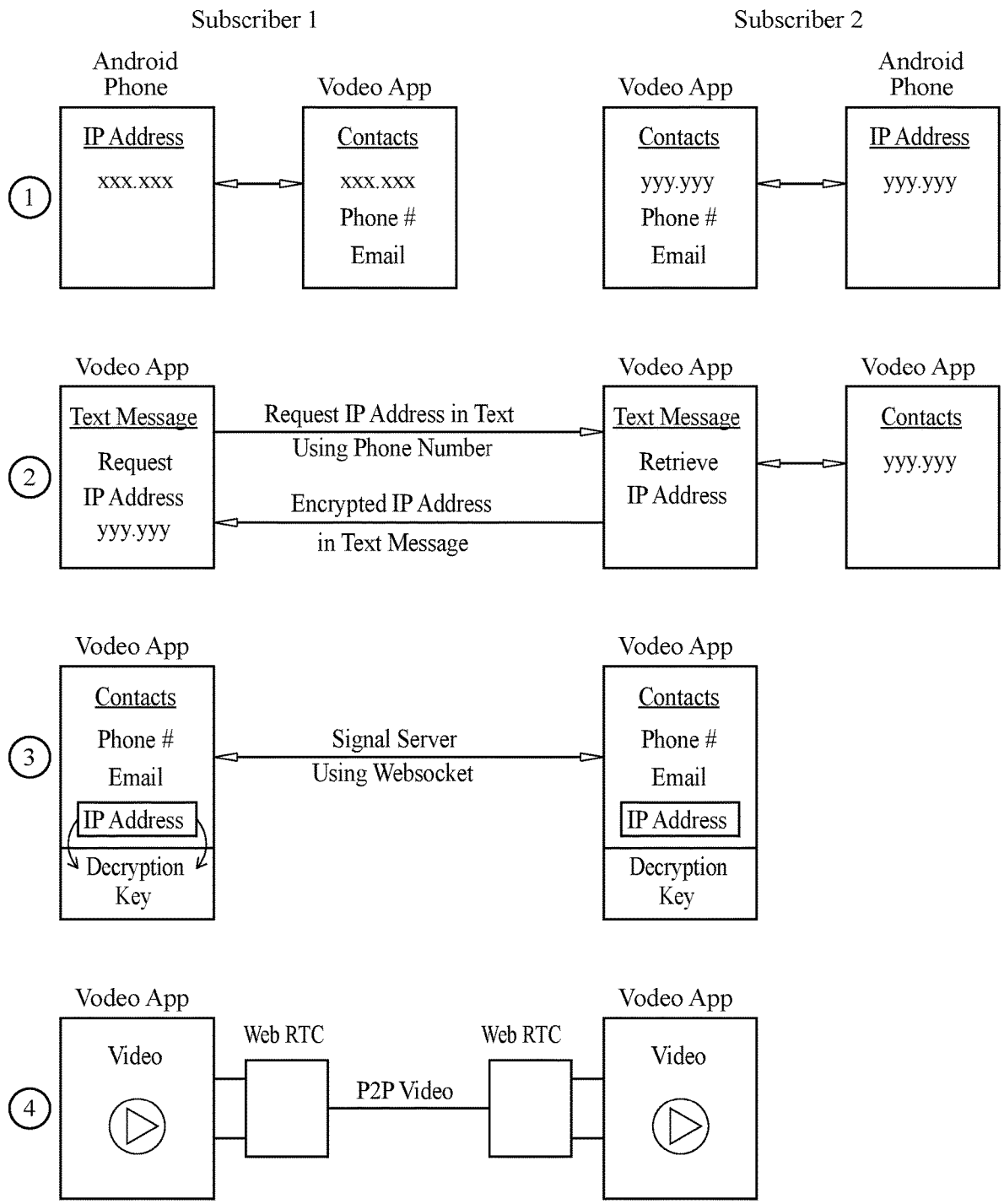
FIG. 31 is a flowchart illustrating a non-limiting preferred embodiment of IP Address Discovery with VODEO apps.

FIG. 31 is a flowchart illustrating a non-limiting preferred embodiment of IP Address Discovery with VODEO apps. FIG. 31 shows a graphic for Subscriber Android phones with unidentified IP address having a VODEO app installed that is connected to a cloud service for storing contacts and their telephone numbers, emails, etc. A text message sends from Subscriber 1 sends a request for an IP address of Subscriber 2 using a telephone number of Subscriber 2. The App on Subscriber 2's phone retrieves the Subscriber 2 IP address and sends the encrypted IP address to Subscriber 1, e.g. in a text message or other App-to-App communication. The VODEO app for the Subscribers 1&2 are peer connected using a decryption key provided by the signal server and the connection is made using websocket.

Figure 32:
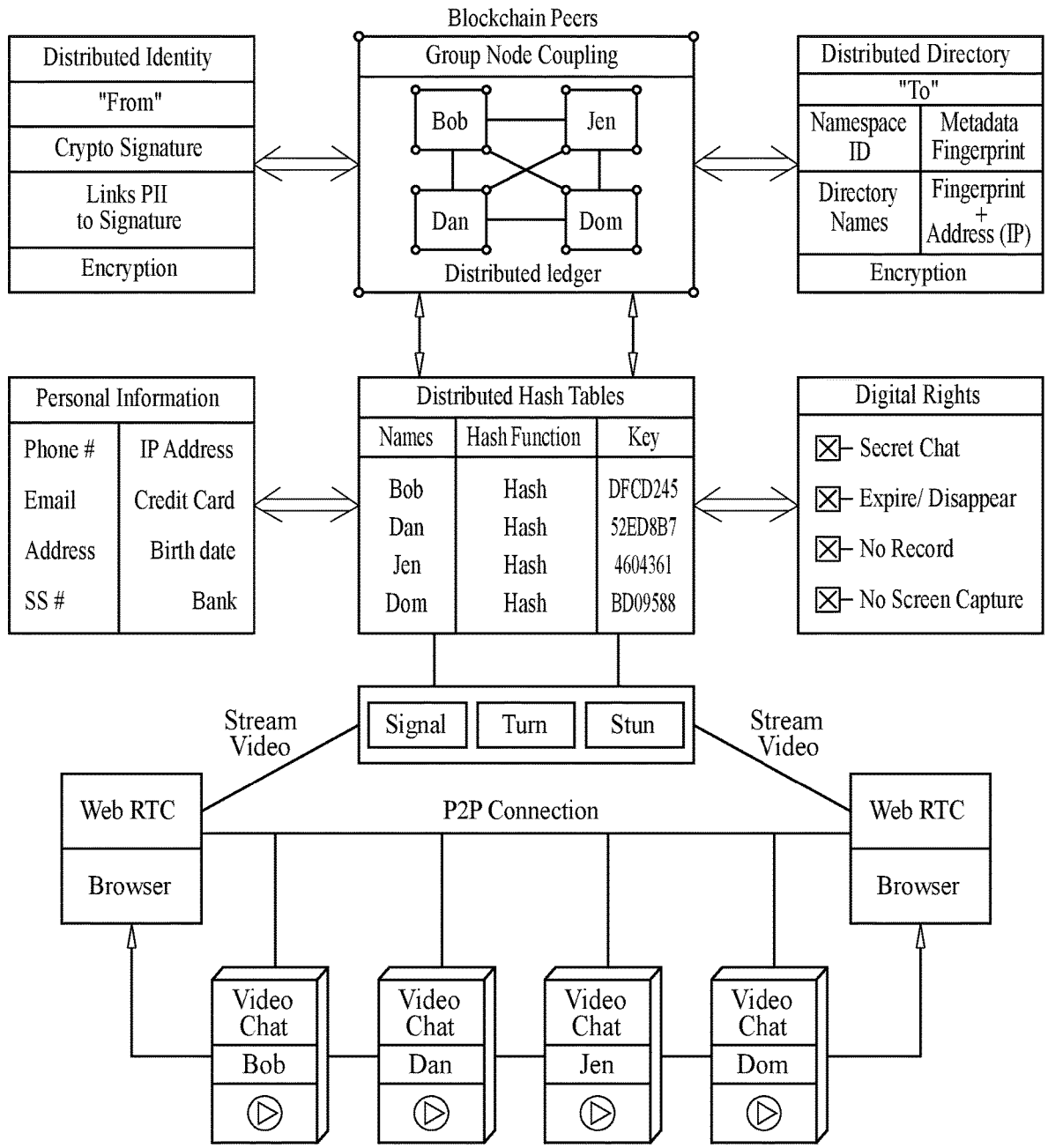
FIG. 32 is a flowchart illustrating a non-limiting preferred embodiment of Blockchain with Distributed Identity and Directory, Distributed Hash Tables with Group Node Coupling.

FIG. 32 is a flowchart illustrating a non-limiting preferred embodiment of Blockchain with Distributed Identity and Directory, Distributed Hash Tables with Group Node Coupling. FIG. 32 shows how multiple subscribers within a group in a Private Blockchain can use group node coupling and a distributed ledger to establish blockchain peers. Encryption and decryption allows for the sharing and connection using PII. PII can include a phone number, an email, an address, a social security number, an IP address, a credit card, a birth date, banking information, and/or an account number. FIG. 32 shows the WebRTC server discovering and connecting the group for a group video chat using streaming video. A DRM module allows for the selection of specific permissions or rights.

Figure 33:
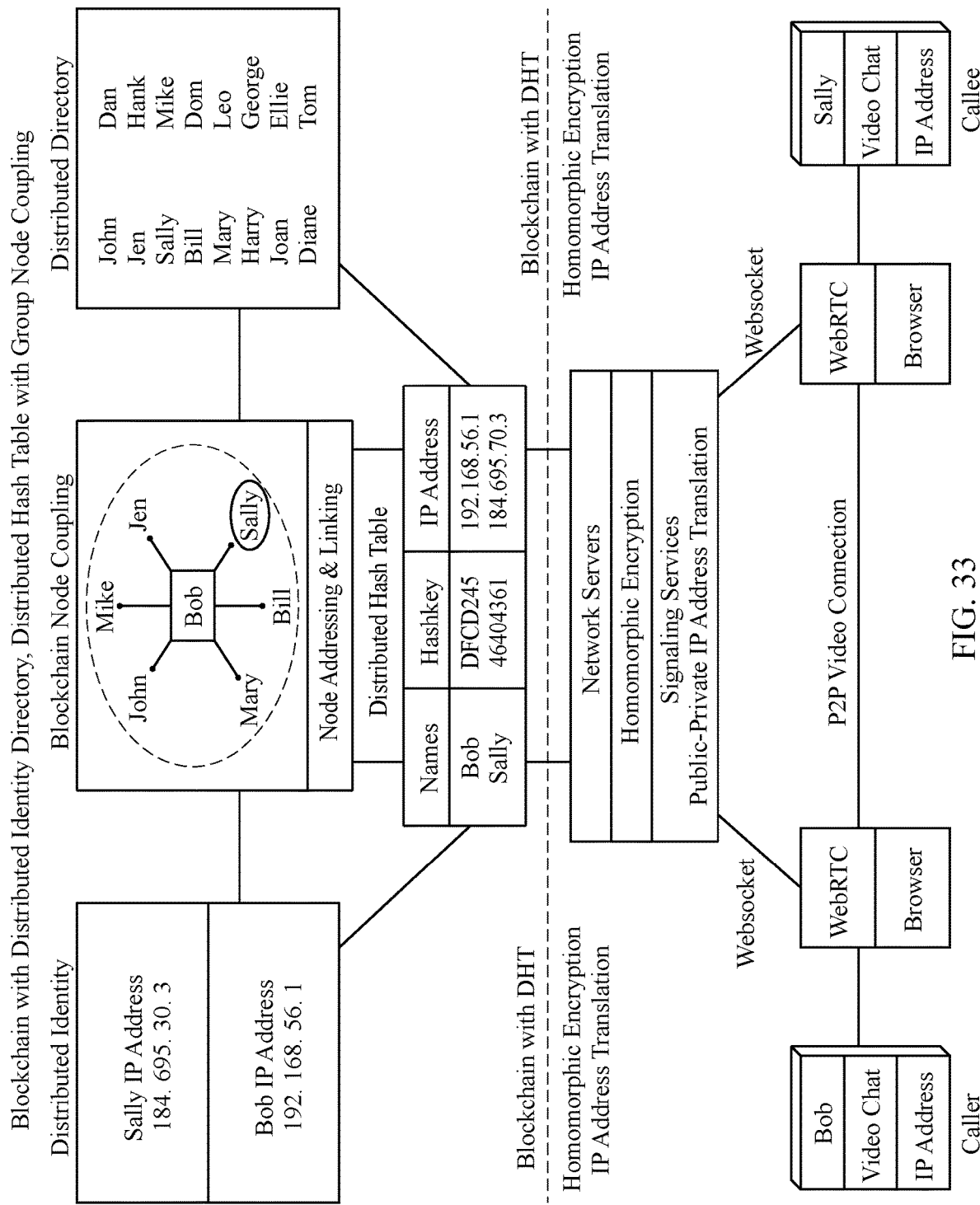
FIG. 33 is a flowchart illustrating a non-limiting preferred embodiment of Private Blockchain with Distributed Hash Tables and Group Node Coupling.

FIG. 33 is a flowchart illustrating a non-limiting preferred embodiment of Private Blockchain with Distributed Hash Tables and Group Node Coupling. FIG. 33 shows how a pair of subscribers from within a group in a Private Blockchain can use blockchain node coupling and a distributed directory and distributed hash table to establish blockchain peers. Encryption and decryption allows for the sharing and connection using PII. FIG. 33 shows the WebRTC server discovering and connecting the subscribers for a video chat using streaming video that is encrypted using homomorphic encryption.

EXAMPLE

Let's say Alice wants to send an encrypted message to Bob. It would work like this:

Alice sends the encrypted message to Bob—if a third party intercepted it, all they would see is random numbers and letters. Bob uses his private key to decrypt and read the message.

Public-key cryptography is a fundamental element of blockchain technology—it is the underlying technology for transactions. When a user creates a transaction on a blockchain, they are generating a public-private key pair. The address of that transaction, or how it's represented on the blockchain, is a string of numbers and letters generated from the public key. Due to the nature of blockchain technology, this address is public to everyone. The private key associated with a transaction is how to prove ownership and control the transaction. A transaction on the blockchain is nothing more than a broadcasted message of the transaction. Once confirmed, the transaction is immutably written into the ledger, and the metadata is updated. This transaction message also requires a signature from the private key of the sender to be valid. After broadcasting, anyone can use the public key to ensure the digital signature coming from the private key is authentic.

Cryptographic Hashing

The invention provides cryptographic hashing as another fundamental piece of blockchain technology and is directly responsible for producing immutability—one of the blockchain's most important features. Hashing is a computer science term that means taking an input string of any length and producing a fixed length output. It doesn't matter if the input to a certain hash function is 3 or 100 characters, the output will always be the same length. Cryptographic hashing is another fundamental piece of blockchain technology and is directly responsible for producing immutability—one of blockchain's most important features. Cryptographic hash functions* are hash functions that have these crucial properties:

Deterministic: No matter how many times you give the function a specific input, it will always have the same output.

Irreversible: It is impossible to determine an input from the output of the function.

Collision resistance: No two inputs can ever have the same output.

Another important feature of cryptographic hash functions is that changing any bit of data in the input will drastically alter the output. For example, the hash outputs of 111111 and 111112 would be completely unique and have no relation to each other.

So, how does cryptographic hashing enable immutability for blockchain technology? The answer is that every new block of data contains a hash output of all the data in the previous block. Imagine a blockchain that just added its 1000th block. The data from block 999 exists in block 1000 as a hash function output. However, included in block 999's data is a hash of block 998's data, which contains a hash of block 998's data.

By traversing the hashes backwards, every block from 1000 to 1 is linked by cryptographic hashing. This is ultimately what makes the data in a blockchain immutable. If someone tried to change just 1 bit of data in any past block, it would not only alter the hash output of that block's data, but every block after it.

Figure 34:
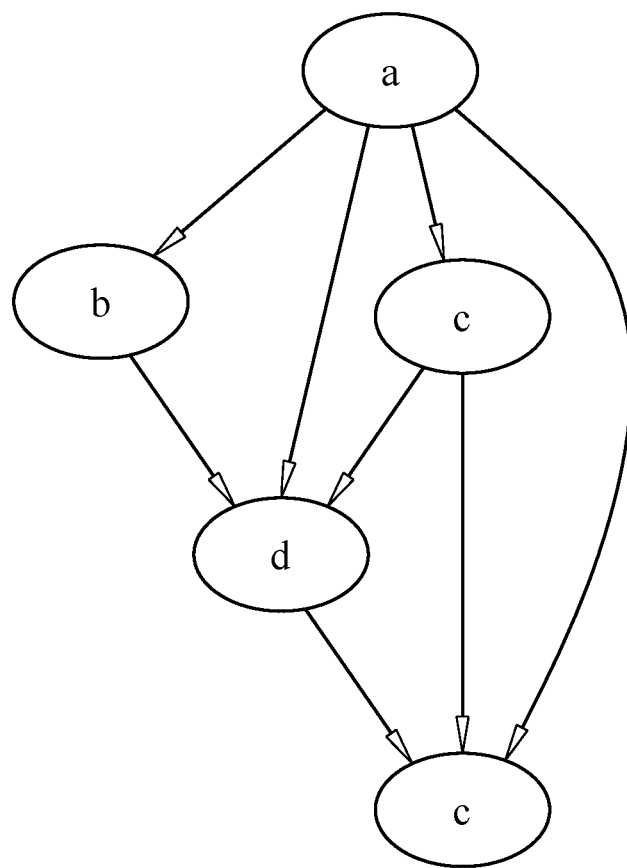
FIG. 34 is a flowchart illustrating a non-limiting preferred embodiment of a Directed Acyclic Graph (DAG).
Figure 35:
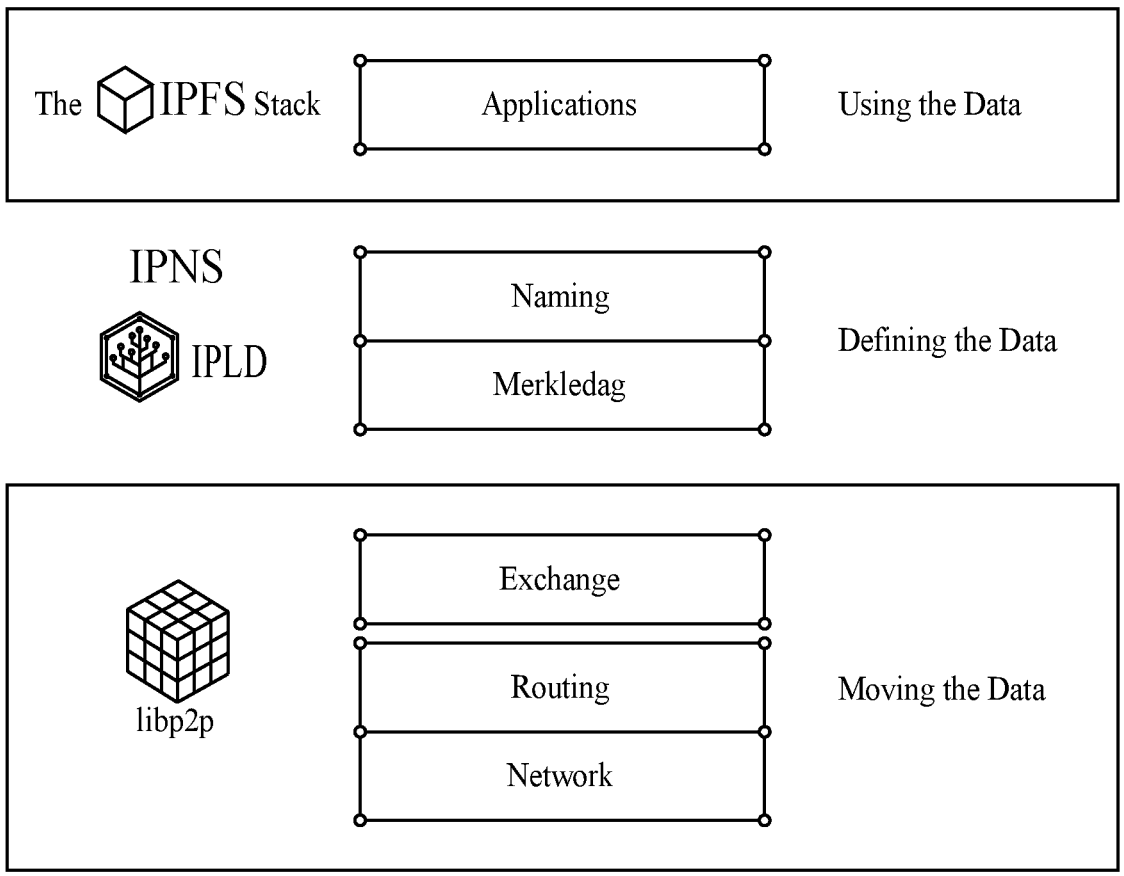
FIG. 35 is a flowchart illustrating a non-limiting preferred embodiment of a Cloud Storage Server Stack, e.g. such as an IPFS Stack in a non-limiting embodiment.

FIG. 34 is a flowchart illustrating a non-limiting preferred embodiment of a Directed Acyclic Graph (DAG), "Merkle trees". FIG. 34 shows a simplified version of a blockchain that leaves out some important information. It has an arrow to show that each block's transactions are stored in a Merkle root, which is the root node of a Merkle tree. The Merkle root is simply the root (top) node of a Merkle tree, meaning it represents a hash output of the combined hashes of the left and right sub-trees. Each leaf node represents a hash of the data for transactions A, B, C, and D. Then hash A and hash B are combined and hashed to produce hash AB, and hash CD is produced in the same way. Finally, hash AB and hash CD are combined and hashed to form the Merkle root of the tree. Merkle trees are important for blockchain technology, because, using the Merkle root and applying the properties of cryptographic hash functions, one can quickly tell if transactions in a given block have been tampered with and the specific transaction that is being tampered. Merkle trees also allow users to verify that their transaction has been included in a block without downloading the entire blockchain. Processes such as Simplified Payment Verification are able to traverse branches in the Merkle tree and check if a certain transaction has been hashed into that tree. This level of efficiency for blockchain technology would be impossible without including a Merkle root in each block.

Digital Rights Management (DRM)

DRM provides a permission based security protection system for audio and video which is seamlessly integrated with WebRTC browsers through JavaScript API's. This facilitates Vodeo users to share confidential video streaming content from a browser and to securely capture, record, store and share streamed video files for online playback from the cloud based video storage vault. DRM controls user permissions and actions related to content including restrictions on content access and sharing such as: record, forward, save, expire, revoke, erase, watermarks, content disappear, and screenshot disablement. It also provides detailed auditing, tracking and analytics from Blockchain. The DRM implementation also provides security to block screen capture (screen capture disablement) and enforces application blacklisting, a technique used to prevent certain malicious applications and executables from running over browsers. The DRM architecture and workflow in SRTCS. DRM also facilitates the creation of a secret video streaming chat which allows 2 or more users to initiate a secret chat which restricts each participant from recording, copying or playback the streamed video. It also blocks screen capture and allows revocation, expiration whitelist and blacklist options. How does Digital Rights Management Work with WebRTC and SRTCS?

The DRM workflow is a multi-step system process involving the DRM Workflow for Audio/Video Content on a P2P connection with WebRTC.

(1) Encryption—DRM relies on encryption to protect the streamed videos and audios and authentication systems to ensure that only authorized users can unlock the video/audio streams from the WebRTC video and audio codecs. The DRM solution scrambles the data in a stream and renders it unviewable to anyone without the appropriate encryption/ decryption keys.

(2) Authentication—Authentication is used between the users and the decryption keys to ensure that only people with proper permissions can obtain/execute a decryption key.

(3) OTT Platform Based Rights Management—Platform-based DRM solutions enable an OTT secure messaging and real time communications service (SRTCS) to playback or restart playback via streaming or downloading and guard against video/audio copying or listening via HDMI outputs.

(4) Content Encryption—Encryption based DRM will encrypt the content driving streamed video sessions and on audio calls.

(5) DRM-enabled software embedded in WebRTC—DRM-embedded software that communicates with the license server and enforces all software and hardware related to playback restrictions.

Streamed Video Storage and On-Line Video Sharing Platform

The SRTCS video storage and sharing platform is a secure on-line video sharing service that allows SRTCS subscribers to upload, view, share, and securely store streamed videos among SRTCS video chat subscribers. The main features of the video storage platform include:

Collaboration—share videos with friends and family

Security—deploys encryption, authentication and Digital Rights protection to streamed video at rest in storage and in use during sharing and collaboration.

Access and Synchronization—automatic upload of streamed video recordings from mobile app.

Video Management—supports video file versioning, video recovery, remote upload capability and rewind features Client-side mobile app encryption—provides mobile app encryption with a private encryption key provide complete security of streamed videos stored on the users mobile devices.

Zero Knowledge Privacy—neither SRCS nor any other service provider or data center shall have access to the stored streamed video files.

Server-side Video Rendering—all streamed videos can be viewed by users on their mobile apps by simply clicking on a streamed video link and the stored videos are retrieved and rendered using server-side video rendering (viewing). The videos never remain or store on the users mobile device unless the video owner grants such permission.

(1) Digital Rights Management (DRM) Protection—

SRTCS has implemented DRM protection that provides a permissions based video sharing security by implementing video streaming controls. DRM protections range from secret videos—(no record, no playback, no screen capture, revocation and expiration) to preventing video forwarding, saving & applying watermarks to shared videos.

(2) Blockchain—

Blockchain provides a distributed storage platform implementation where videos are stored on distributed servers and provide secure content addressing, content linking, content searching and content discovery (retrieval). For storage security, Blockchain deploys Distributed Hash Encryption (DHT) and Distributed (Aajclic???) Graphs (DAG) to both encrypt, protect and obfuscate the stored personal identifiable information (PII). Decentralized Digital Apps ("DApps") provide content addressing, content linking and content discovery (searching) for stored streamed videos. All videos are stored on distributed servers.

(3) Video Storage Platform

Streamed storage and video sharing platform works as follows:

Step 1—Two or more users establish a streamed video chat using the SRTCS video app on either an Android or IOS mobile phone.

Secret Video Chat—A secret video chat can be initiated by 2 or more subscribers by mutually agreeing to participate in a secret video chat. In a secret chat, full restrictions of DRM protection are enforced including the ability to block the recording of the video session. Once terminated, a complete record of the secret video is erased (expunged) from both participants' apps and no record of the session is recorded or can be entered into the storage platform. Video Chat—A video chat can be established between 2 or more subscribers who mutually allow one or both users to record the video session, and store the video in the storage platform in the users storage account. All video chat have the option of using file based encryption using AES 256 Galois-Counter Mode (GCM) encryption.

Step 2—Upload the encrypted streamed video to the storage and sharing platform in the users account. This upload process includes: user based authentication and the selection of DRM protections to be applied to the stored streamed video.

Step 3—Distributed Storage—The video is broken down into segments and processed parallely.

Step 4—CDN—A Content Delivery Network (CDN) is a global network of servers that optimize web performance by using the node closest to the users location for faster delivery of videos.

Step 5—Server Side Video Rendering—The video is retrieved from either the CDN Server or Distributed Storage and rendered in the cloud using server side video rendering with DRM protection.

Real Time Messaging App for Android and IOS mobile platforms and on PC's

The roles and workflow of the Android/IOS mobile apps to access the SRTCS network for audio and video streaming communications and the video storage and sharing platform for users and businesses are shown herein.

The SRTCS Systems Architecture, the subscriber Android/IOS mobile app allows users to access and control all user based operations of SRTCS using JavaScript API's, include: WebRTC, Network Servers, Blockchain, Distributed Trust Platform (E2E Encryption), Digital Rights Protection (DRM), and Streamed video storage and sharing platform.

Secure WebRTC Voice Call Using VoIP Network or PSTN

WebRTC and SIP are two important technologies to establish a secure voice call using the VOIP network. Session Initiation Protocol—(SIP)—is a text based communications protocol for signaling and controlling multimedia sessions on an IP Network. SIP is used to set up and modify calls between two or more peers in a P2P network.

WebRTC Gateway

WebRTC provides a simple way to implement peer-to-peer communications between browsers. The WebRTC standards focus primarily on the media plane. Signaling plane functions—session setup and management—are left to the application developer. New server side elements are required to interwork dissimilar transport and signaling methods employed in the Web and IP communications domains.

The WebRTC gateway sits at the intersection of a conventional IP-based communications network and the Internet. It bridges the Web and traditional telecom worlds, providing signaling interworking, media interworking and transcoding, and application interworking functions. The WebRTC gateway can be delivered in the form of a turn-key appliance or a software-based solution that runs industry-standard servers.

Messaging+WebRTC+SIP=Audio Solution for VoIP

WebRTC is related to all the scenarios happening in SIP. Just like SIP, it creates the media session between two IP connected endpoints and uses RTP (Real-time Transport Protocol) for connection in the media plane once the signaling is done. It uses SDP (Session Description Protocol) for describing the streaming media communication parameters.

The WebRTC differs in Two Key areas:

WebRTC doesn't mandate the usage of SIP messages in the signaling plane, instead of the actual signaling i.e., sending and receiving of SDP messages is dependent on the application. It also uses some optional SIP features in the media plane: the use of specific codes namely G.711 for audio and H.264 are required for video. Use of SRTP (Secure Real-time Transport Protocol) to provide maximum encryption & message authentication for media packets. And, it uses the Session Traversal Utilities for NAT and (STUN, TURN & ICE) for network traversal.

The Signaling Plane

Working on the assumption that your existing SIP infrastructure isn't going to switch to a different signaling protocol, then the WebRTC has to make progress. Achieving this includes: Ensure to use SIP as your signaling stack for the WebRTC enabled applications; and Use another signaling solution for your WebRTC enabled application. Make sure to add a signaling gateway to translate between the SIP and the current signaling.

The Media Plane

In order to integrate the SIP protocol into the WebRTC applications, if there is an already existing SIP infrastructure then an additional media gateway is added known as Session Border Controller that enacts as a gateway between WEbRTC and VoIP endpoints or if there is no SIP infrastructure then choosing a WebRTC compatible SIP technology which has many SIP gateways and SIP trunking services is an optimal solution.

Distributed Trust Platform for VoIP and PSTN

The SRTCS platform provides complete control of and security for voice calling over IP and either a VoIP implementation or the Public Switched Telephone Network (PSTN). The SRTCS platform includes: Distributed Trust Platform, Encrypted Content Delivery Network (ECDN), Blockchain for Distributed Identity Directory and Personal Identifiable Information (PII) Encryption), and Digital Rights Protection to encrypt and protect voice calls and voice call recording by third parties.

Encrypted Content Delivery Network (ECDN)

SRTCS has designed global network of secure servers for carrying secure call traffic and optimizing call performance beyond that which is available using only the PSTN or the Public Internet. For users that require secure or secret voice call communications, SRTCS provides secure infrastructure control for all signaling and user management as follows:

Signaling Server—handles authentication and call set-up for each user.

Media Servers—routes encrypted audio packets between two mobile phones involved in the call session. The media relays record no user PII or metadata regarding any media session.

SRTCS Voice Portal—a web based account management system to manage user profiles, accounts, devices and subscriptions. Provides at a glance, dashboards and detailed reporting.

Distributed Trust Platform Cryptography

SRTCS uses advanced encryption technologies to secure audio phone calls, including: Advanced Encryption Standard (AES 256) for symmetric encryption, Elliptical Curve Digital Signature Algorithm (ECDSA) for digital signatures, Secure Hash Algorithm (SHA-2) for message digest, Elliptic Curve Diffie-Hellman (ECDH) for key exchange using a shared secret technology, Double encryption—the voice call is first encrypted using 256 bit AES encryption and then encrypted again using AES 256 encryption.

Advanced Symmetric Encryption

The Distributed Trust Platform can be deployed using one or both of the following symmetric-key encryption standards
 (1) AES 256 Symmetric Encryption, and, or
 (2) SRTP (Secure Real-time Transport Protocol).

256 AES Symmetric Encryption

Encryption works by taking plain text and converting it into cipher text, which is made up of random characters. Only those who have the special key can decrypt it. AES uses symmetric key encryption, which involves the use of only one secret key to cipher and decipher information.

The Advanced Encryption Standard (AES) is the first and only publicly accessible cipher approved by the US National Security Agency (NSA) for protecting top secret information.

SRTP (Real-time Transport Protocol)

SRTP (Real-time Transport Protocol) is a cryptographic key-agreement protocol to negotiate the keys for encryption between two end points in a Voice over Internet Protocol (VoIP) phone telephony call based on the Real-time Transport Protocol (SRTP) for encryption. "RTP" stands for Real-time Transport Protocol, which is a "key agreement protocol which performs Diffie-Hellman key exchange during call setup in-band in the Real-time Transport Protocol (RTP) media stream which has been established using some other signaling protocol such as Session Initiation Protocol (SIP). This generates a shared secret which is then used to generate keys and salt for a secure RTP (SRTP) session which is used in WebRTC P2P audio and video sessions. One of SRTP's features is that it does not rely on SIP signaling for the key management, or on any servers at all. It supports opportunistic encryption by auto-sensing if the other VoIP client supports SRTP.

This protocol does not require prior shared secrets or rely on a Public key infrastructure (PKI) or on certification authorities, in fact ephemeral Diffie-Hellman keys are generated on each session establishment: this allows the complexity of creating and maintaining a trusted third-party to be bypassed.

These keys contribute to the generation of the session secret, from which the session key and parameters for SRTP sessions are derived, along with previously shared secrets, if any. This gives protection against man-in-the-middle (MiTM) attacks, so long as the attacker was not present in the first session between the two endpoints.

SRTP can be used with any signaling protocol, including SIP, and distributed hash table systems. SRTP is independent of the signaling layer, because all its key negotiations occur via the RTP media stream.

SRTP/S, a SRTP protocol extension, can run on any kind of legacy telephony networks including GSM and PSTN because it is a narrow-band bitstream-oriented protocol and performs all key negotiations inside the bitstream between two endpoints.

The Diffie-Hellman key exchange by itself does not provide protection against a man-in-the-middle attack. To ensure that the attacker is indeed not present in the first session (when no shared secrets exist), the Short Authentication String (SAS) method is used. the communicating parties verbally cross-check a shared value displayed at both endpoints. If the values do not match, a man-in-the-middle attack is indicated. The SAS is used to authenticate the key exchange, which is essentially a cryptographic hash of the two Diffie-Hellman values. The SAS value is rendered to both ARTP endpoints. To carry out authentication, this SAS value is read aloud to the communication partner over the voice connection. If the values on both ends do not match, a man-in-the-middle attack is indicated; if they do match, a man-in-the-middle attack is highly unlikely. The use of hash commitment in the DH exchange constrains the attacker to only one guess to generate the correct SAS in the attack, which means the SAS may be quite short. A 16-bit SAS, for example, provides the attacker only one chance out of 65536 of not being detected.

SRTP provides a second layer of authentication against a MitM attack, based on a form of key continuity. It does this by caching some hashed key information for use in the next call, to be mixed in with the next call's DH shared secret, giving it key continuity properties analogous to SSH. If the MitM is not present in the first call, he is locked out of subsequent calls. Thus, even if the SAS is never used, most MitM attacks are stopped because the MitM was not present in the first call.

Elliptic Curve Diffie-Hellman (ECDH)—(Shared Secret)

Elliptic-curve Diffie Hellman (ECDH) is a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. It is a variant of the Diffie-Hellman protocol using elliptic-curve cryptography.

Key Establishment Protocol. The public keys are either static (and trusted, say via a certificate) or ephemeral (also known as ECDHE, where final 'E' stands for "ephemeral") Ephemeral keys are temporary and not necessarily authenticated, so if authentication is desired, authenticity assurances must be obtained by other means. Authentication is necessary to avoid man-in-the-middle attacks.

Elliptic Curve Digital Signature Algorithm (ECDSA) offers a variant of the Digital Signature Algorithm (DSA) which uses elliptic curve cryptography. As with elliptic-curve cryptography in general, the bit size of the public key believed to be needed for ECDSA is about twice the size of the security level, in bits. For example, at a security level of 80 bits (meaning an attacker requires a maximum of about 280 operations to find the private key) the size of an ECDSA private key would be 160 bits, whereas the size of a DSA private key is at least 1024 bits. On the other hand, the signature size is the same for both DSA and ECDSA: approximately 4t where t is the security level measured in bits, that is, about 320 bits for a security level of 80 bits.

SHA-2 (Secure Hash Algorithm 2) is a set of cryptographic hash functions designed by the United States National Security Agency (NSA) and first published in 2001. They are built using the Merkle-Damgård construction, from a one-way compression function itself built using the Davies-Meyer structure from a specialized block cipher.

The SHA-2 family consists of six hash functions with digests (hash values) that are 224, 256, 384 or 512 bits: SHA-224, SHA-256, SHA-384, SHA-512, SHA-512/224, SHA-512/256. SHA-256 and SHA-512 are novel hash functions computed with 32-bit and 64-bit words, respectively. They use different shift amounts and additive constants, but their structures are otherwise virtually identical, differing only in the number of rounds. SHA-224 and SHA-384 are truncated versions of SHA-256 and SHA-512 respectively, computed with different initial values. SHA-512/224 and SHA-512/256 are also truncated versions of SHA-512, but the initial values are generated using the method described in Federal Information Processing Standards (FIPS) PUB 180-4.

Sha-2 was first published by the National Institute of Standards and Technology (NIST) as a U.S. federal standard (FIPS).

Multiple encryption is the process of encrypting an already encrypted message one or more times, either using the same or a different algorithm. Super encryption refers to the outer-level encryption of a multiple encryption.

Picking any two ciphers, if the key used is the same for both, the second cipher could possibly undo the first cipher, partly or entirely. This is true of ciphers where the decryption process is the same as the encryption process—the second cipher would completely undo the first. If an attacker were to recover the key through cryptanalysis of the first encryption layer, the attacker could possibly decrypt all the remaining layers, assuming the same key is used for all layers.

To prevent that risk, one can use keys that are statistically independent for each layer (e.g. independent RNGs). Ideally each key should have separate and different generation, sharing, and management processes.

Digital Rights Management (DRM) for Audio Call—Secret Phone Call with Encrypted Recorded Conversations Digital Rights Protection (DRM) for voice calls and video streaming provides a permissions based security protection system that integrates directly into WebRTC browsers and the Vodeo video/audio messaging app through JavaScript API's. This facilitates audio/video users to initiate confidential phone calls and video chats from a WebRTC browser. DRM controls users permissions and actions related to phone/audio calls including restrictions on content access, content recording and content sharing with other parties. It allows users to initiate secret chats for both phone calls using VoIP and video streaming or "Facetime" between parties by using DRM controls to restrict unwanted user actions such as video/audio recordings and sharing the content with unauthorized third parties. The ability to restrict voice recordings is a major technology breakthrough for the Vodeo (SRTCS) service.

Private Blockchain with Distributed Hash Tables, Group Node Coupling, Distributed (encrypted) Identity and Digital Rights (DRM).

A Private Blockchain is an invitation-only network governed and controlled by a single (or group) entity. Entrants to the blockchain network require permission to join, read, write and participate in the blockchain. There are different levels of access, and the information is encrypted to protect the commercial services confidentiality. The SRTCS system (Vodeo) described in this patent has implemented a permissioned-based blockchain (private blockchain) that deploys an access control layer to govern who has access to the network and users (subscribers) on the Private Blockchain network are vetted and controlled by the network rules.

The SRTCS blockchain contains a growing list of records (transactions) referred to as blocks that are linked using cryptography (encryption). Each block contains a cryptographic hash of the previous blocks (a time stamp) and transaction data (metadata), represented as a Merkle Tree.

Distributed Ledger Technology (DLT)

SRTC deploys Distributed Ledger Technology (DLT) for recording "transactions" or video and audio chats in which the transactions and their details are recorded in multiple places (multiple nodes) at the same time. Distributed Ledgers have no central data store or administrative functionality which is contrasted with widely used cloud databases such as (BQL) Server.

Ledgers are essentially a permanent record of transactions and data. Blockchain, which bundles transactions into blocks that are chained together ("connected"). DLT also has the potential to speed transactions. Since they remove the need for a central authority. Blockchain technology makes use of cryptography for transactions, security and privacy-preserving protocols. Blockchain cryptography includes public-key cryptography, distributed hashing and Merkle Trees.

Group Node Coupling, Distributed Identities (DII) and Directories

SRTCS deploys blockchain to provide a record of each user's PII (Personal Identifiable Information) including a private IP address and to provide directory searching capability to find and connect 2 or more users to a video/audio chat session. This process also includes node addressing, node discovery and group node coupling.

A profile of each subscriber is created in the blockchain that contains all PII and historical metadata of video/audio chats made with other subscribers (called "Buds") in SRTCS. A node coupling profile of "Buds" is created which streamlines the blockchain discovery (searching) algorithms to quickly identify and retrieve addressing and linking information to achieve rapid connections between subscribers in the system.

WebRTC signaling server is used to connect 2 or more subscribers over the P2P network. As discussed earlier, the signaling server translates each user's private IP address to a public IP address to effectuate a connection over the ICE (STUN, TURN) server network. An encrypted websocket connection is made between the users WebRTC based browser and the signaling server in an encrypted hop-to-hop scenario. SRTCS uniquely deploys homomorphic encryption to extract the private IP addresses of each subscriber without decrypting the private IP address payload in the signaling server. This protects the users from any potential MitM private IP.

Figure 36:
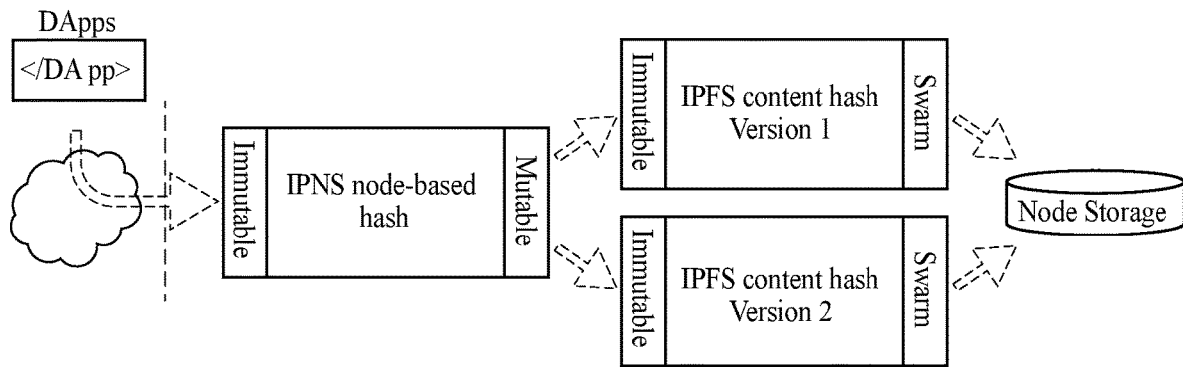
FIG. 36 is a flowchart illustrating a non-limiting preferred embodiment of an Addressing Process Flow.
Figure 37:
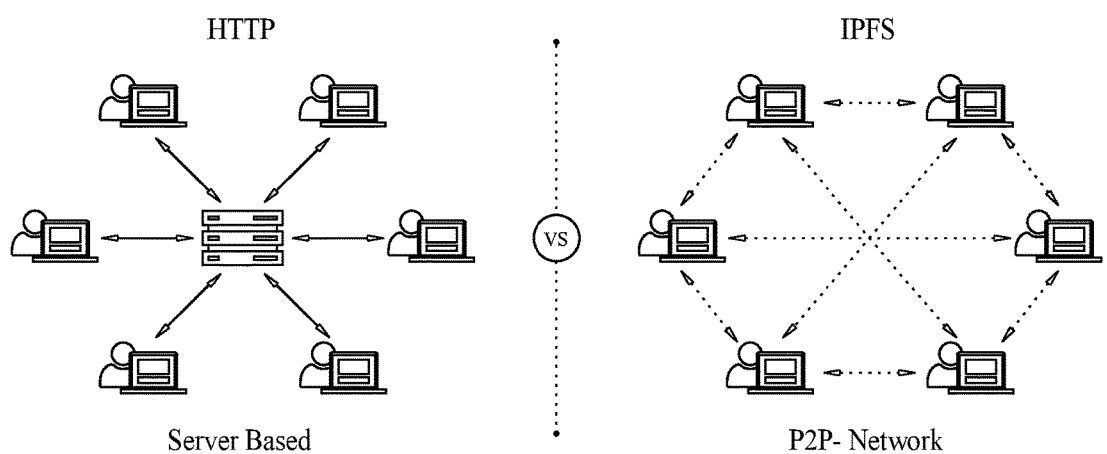
FIG. 37 is a flowchart illustrating a non-limiting preferred embodiment of Distributed Nodes.
Figure 38:
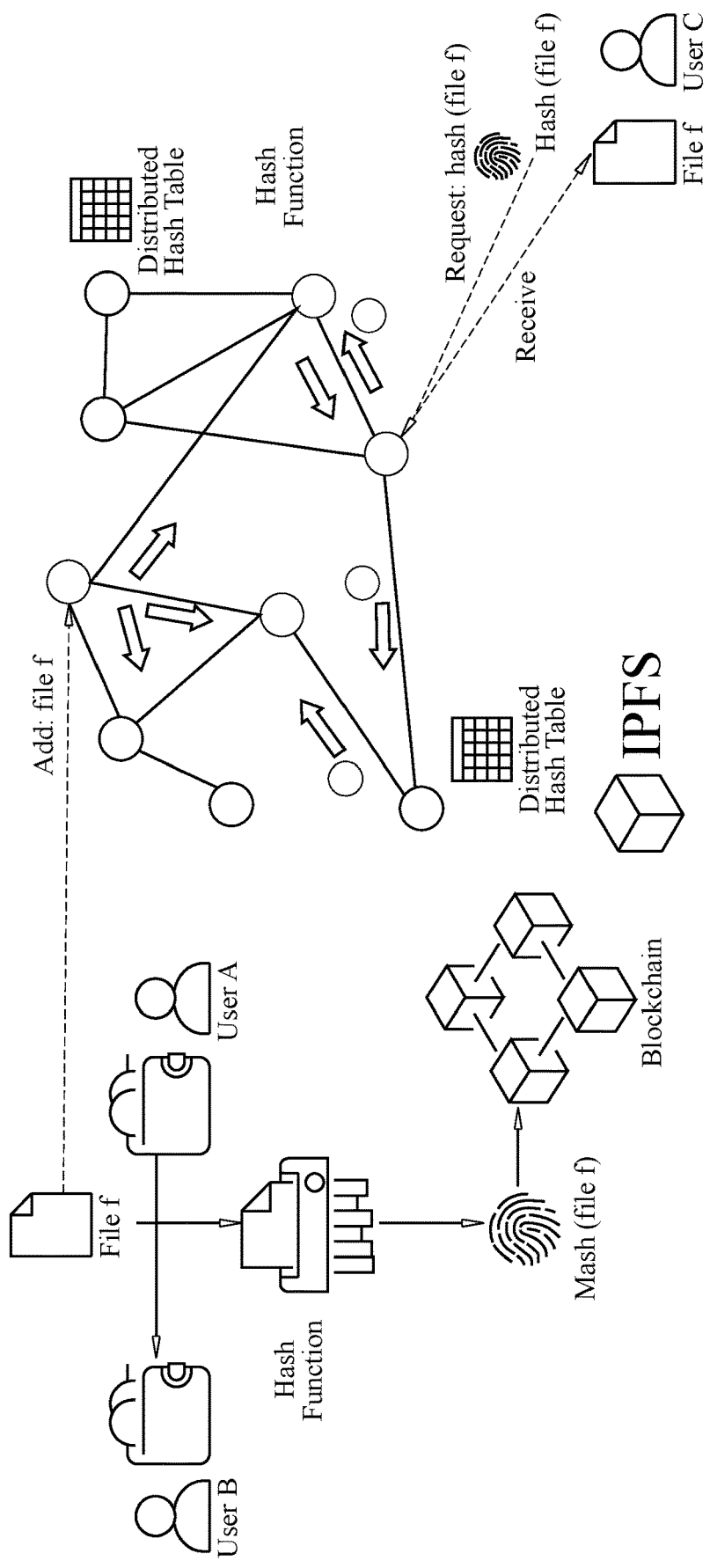
FIG. 38 is a flowchart illustrating a non-limiting preferred embodiment of Distributed Secure Storage Using Cloud Storage Server, such as IPFS, and Blockchain.

Referring now to FIGS. 35-38, FIG. 35 is a flowchart illustrating a non-limiting preferred embodiment of a Cloud Storage Server (e.g. IPFS) Stack. FIG. 36 is a flowchart illustrating a non-limiting preferred embodiment of a Addressing Process Flow. FIG. 37 is a flowchart illustrating a non-limiting preferred embodiment of Cloud Storage Server Distributed Nodes. FIG. 38 is a flowchart illustrating a non-limiting preferred embodiment of Distributed Secure Storage Using Cloud Storage Server, e.g. IPFS or other, and Blockchain.

Cloud Storage and IPFS—Distributed Video Storage Platform

IPFS is a peer-to-peer (p2p) storage network. Content is accessible through peers located anywhere in the world, that might relay information, store it, or do both. IPFS knows how to find what you ask for using its content address rather than its location. There are three fundamental principles to understanding IPFS: Unique identification via content addressing, Content linking via directed acyclic graphs (DAGs), and Content discovery via distributed hash tables (DHTs). These three principles build upon each other to enable the IPFS ecosystem.

Content Addressing

IPFS uses content addressing to identify content by what's in it rather than by where it's located. Every piece of content that uses the IPFS protocol has a content identifier, or CID, that is its hash. The hash is unique to the content that it came from, even though it may look short compared to the original content. Many distributed systems make use of content addressing through hashes as a means for not just identifying content but also linking it together—everything from the commits that back your code to the blockchains that run cryptocurrencies leverage this strategy. However, the underlying data structures in these systems are not necessarily interoperable. This is where the Interplanetary Linked Data (IPLD) project comes in. IPLD translates between hash-linked data structures allowing for the unification of the data across distributed systems. IPLD provides libraries for combining pluggable modules (parsers for each possible type of IPLD node) to resolve a path, selector, or query across many linked nodes, allowing you to explore data regardless of the underlying protocol. IPLD provides a way to translate between content-addressable data structures. IPFS follows particular data-structure preferences and conventions. The IPFS protocol uses those conventions and IPLD to get from raw content to an IPFS address that uniquely identifies content on the IPFS network.

Directed Acyclic Graphs (DAGs)

IPFS and many other distributed systems take advantage of a data structure called directed acyclic graphs, or DAGs. Specifically, they use Merkle DAGs, which are DAGS where each node has a unique identifier that is a hash of the node's contents. Put another way: identifying a data object (like a Merkle DAG node) by the value of its hash is content addressing. IPFS uses a Merkle DAG that is optimized for representing directories and files. To build a Merkle DAG representation of content, IPFS often first splits it into blocks. Splitting it into blocks means that different parts of the file can come from different sources and be authenticated quickly.

Merkle DAGs are a bit of a "turtles all the way down" scenario; that is, everything has a CID. Let's say you have a file, and its CID identifies it. What if that file is in a folder with several other files? Those files will have CIDs too. What about that folder's CID? It would be a hash of the CIDs from the files underneath (i.e., the folder's content). In turn, those files are made up of blocks, and each of those blocks has a CID. So a file system on your computer could be represented as a DAG. And this is how Merkle DAG graphs start to form.

Another useful feature of Merkle DAGs and breaking content into blocks is that if you have two similar files, they can share parts of the Merkle DAG, i.e., parts of different Merkle DAGs can reference the same subset of data. For example, if you update a website, only updated files receive new content addresses. Your old version and your new version can refer to the same blocks for everything else. This can make transferring versions of large datasets (such as genomics research or weather data) more efficient because you only need to transfer the parts that are new or have changed instead of creating entirely new files each time.

Accordingly, IPFS lets you give CIDs to content and link that content together in a Merkle DAG.

Distributed Hash Tables (DHTs)

To find which peers are hosting the content you're after (discovery), IPFS uses a distributed hash table, or DHT. A hash table is a database of keys to values. A distributed hash table is one where the table is split across all the peers in a distributed network. To find content, you ask the peers.

The libp2p project is the part of the IPFS ecosystem that provides the DHT and handles peers connecting and talking to each other. (Note that, as with IPLD, libp2p can also be used as a tool for other distributed systems, not just IPFS.)

Once you know where your content is (or, more precisely, which peers are storing each of the blocks that make up the content you're after), you use the DHT again to find the current location of those peers (routing). So, in order to get to content, you use libp2p to query the DHT twice.

You've discovered your content, and you've found the current location(s) of that content. Now, you need to connect to that content and get it (exchange). To request blocks from and send blocks to other peers, IPFS currently uses a module called Bitswap. Bitswap allows you to connect to the peer or peers that have the content you want, send them your wantlist (a list of all the blocks you're interested in), and have them send you the blocks you requested. Once those blocks arrive, you can verify them by hashing their content to get CIDs and compare them to the CIDs that you requested. These CIDs also allow you to deduplicate blocks if needed.

Libp2p

What makes libp2p especially useful for peer to peer connections is connection multiplexing. Traditionally, every service in a system opens a different connection to communicate with other services of the same kind remotely. Using IPFS, you open just one connection, and you multiplex everything on that. For everything your peers need to talk to each other about, you send a little bit of each thing, and the other end knows how to sort those chunks where they belong.

This is useful because establishing connections is usually hard to set up and expensive to maintain. With multiplexing, once you have that connection, you can do whatever you need on it.

A Modular Paradigm—IPFS

The IPFS ecosystem is made up of many modular libraries that support specific parts of any distributed system. You can certainly use any part of the stack independently or combine them in novel ways.

The IPFS ecosystem gives CIDs to content and links that content together by generating IPLD Merkel DAGs. You can discover content using a DHT that's provided by libp2p, open a connection to any provider of that content, and download it using a multiplexed connection. All of this is held together by the middle of the stack, which is linked, unique identifiers; that's the essential part that IPFS is built on.

Smart Contract is a computer program or a transaction protocol which is intended to automatically execute, control or document legally relevant events and actions according to the terms of a contract or an agreement. The objectives of smart contracts are the reduction of need in trusted intermediators, arbitrations and enforcement costs, fraud losses, as well as the reduction of malicious and accidental exceptions.

Like a transfer of value on a blockchain, deployment of a smart contract on a blockchain occurs by sending a transaction from a wallet for the blockchain. The transaction includes the compiled code for the smart contract as well as a special receiver address. That transaction must then be included in a block that is added to the blockchain, at which point the smart contract's code will execute to establish the initial state of the smart contract. Byzantine fault-tolerant algorithms secure the smart contract in a decentralized way from attempts to tamper with it. Once a smart contract is deployed, it cannot be updated. Smart contracts on a blockchain can store arbitrary state and execute arbitrary computations. End clients interact with a smart contract through transactions. Such transactions with a smart contract can invoke other smart contracts. These transactions might result in changing the state and sending coins from one smart contract to another or from one account to another.

WebRTC for Peer-to Peer Streaming from an IP Camera

Tunneling video from surveillance IP-cameras through cloud services has both high monetary cost and latency. Streaming the video peer-to-peer can eliminate both these factors while upholding quality of service. WebRTC is an open web standard, streaming API which enables browsers and devices to communicate peer-to-peer without any plugins. While earlier IP-camera implementations have been dependent on intermediate servers, this thesis investigates the possibilities of moving the intermediate server to the camera. Focus is on device performance with regards to CPU and memory usage, network throughput, latency, and capacity. A WebRTC server/gateway called Janus was used, installed on two different current generation Axis IP-cameras. The result showed that our WebRTC solution performed comparably to a RTSP (Real Time Streaming Protocol) over WebSocket based one. This does not only pave the way for more implementations built upon WebRTC for IP-cameras, but for all embedded devices.

Surveillance cameras have proven to be effective in preventing crime and there is no doubt that the world embraces this fact. Axis and Hikvision, two of the largest surveillance IP-camera producers, are both showing steady growth over the last few years. A common surveillance method is to have alarm centrals monitor many cameras placed in multiple locations, by communicating with the cameras over the internet. This video stream is often, at least by Axis, tunneled through a cloud service which is both expensive and complicated to set up for the provider. Even if streaming video through a cloud service works, there would be many advantages if the video could be streamed directly from the camera to the viewer. WebRTC (Web Real-Time Communications) is a free, open web standard that provides browsers and mobile applications with RTC capabilities via simple APIs. It enables the client to send and receive media using only a modern browser without any plugins and with self-signed certificates. Compared to other solutions where the two peers must trust each other, requiring signed certificates to be placed on all cameras, both peers must only trust the same server. In the case of WebRTC, that trusted server is the signaling server. After performing a key exchange, which is used to encrypt the traffic peer-to-peer, the peers are no longer dependent on the signaling server. This invention includes the use of WebRTC for Peer-to-peer streaming from an embedded device.

WebRTC Gateway & Server

When two browsers are communicating using WebRTC, e.g., in a video call, both browsers are acting as both server and client. When communicating using WebRTC without a browser, some sort of WebRTC server is needed. Most WebRTC servers support relaying media over WebRTC, that media relaying feature is called a gateway. WebRTC gateways create a bridge between legacy infrastructures and WebRTC. Protocols like SIP (Session Initiation Protocol), RTP and RTSP are some examples that most WebRTC gateways support. Janus is an open source WebRTC server written in C that is designed to be lightweight in its original configuration, but expandable with plugins to suit many needs. It is described by its creators as "a general purpose WebRTC gateway" since it can be configured in so many different ways. Janus helps with managing WebRTC communications between itself and browsers, between two browsers or managing video conference calls between multiple browsers.

Figure 39:
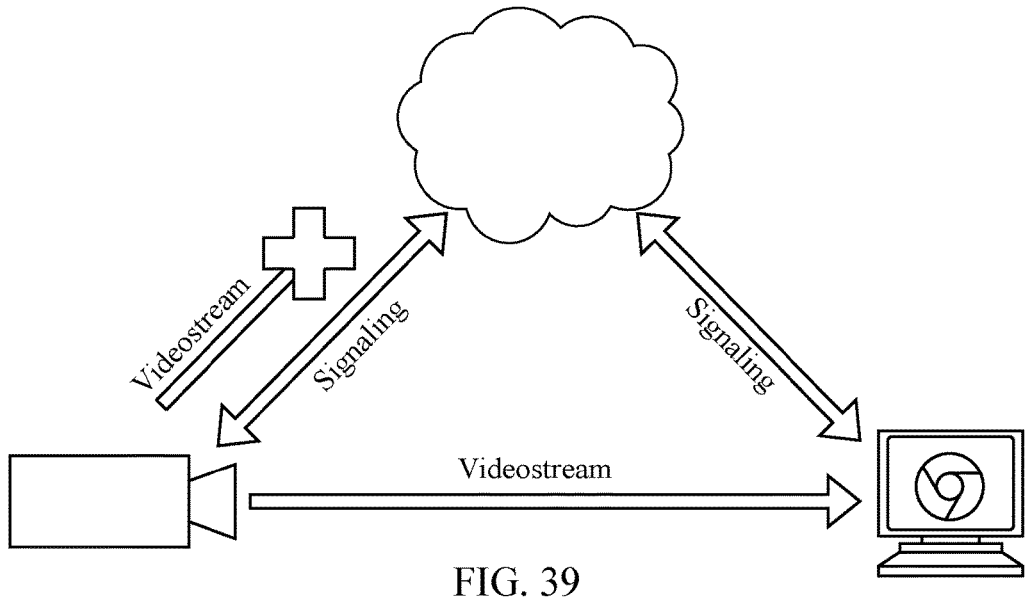
FIG. 39 is a flowchart illustrating a non-limiting preferred embodiment of WebRTC streamed directly to a client.
Figure 40:
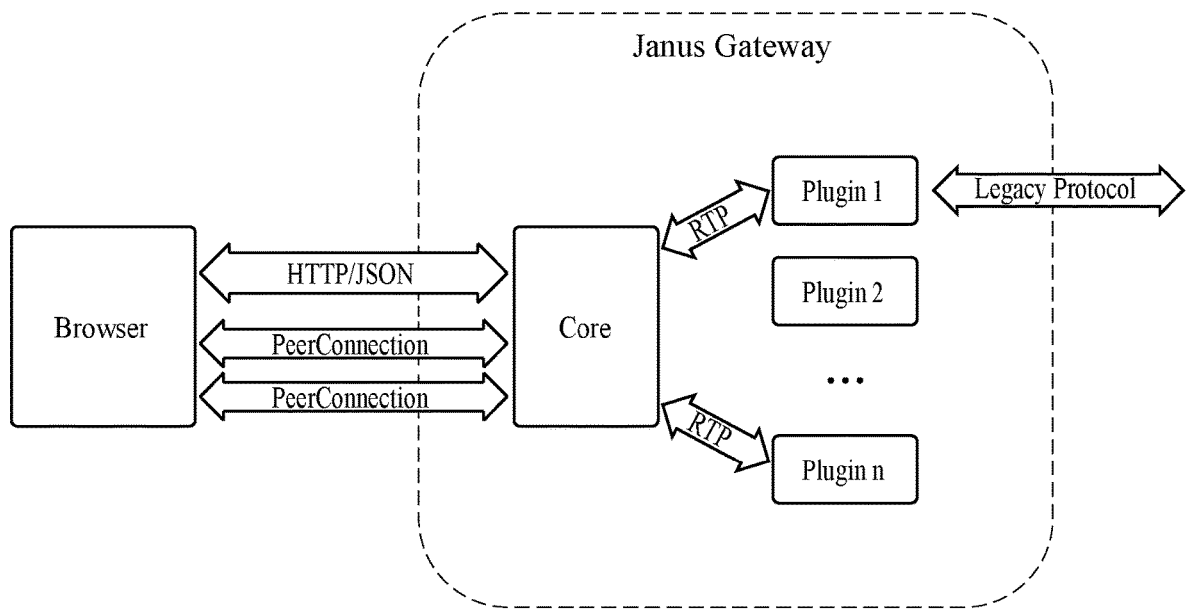
FIG. 40 is a flowchart illustrating a non-limiting preferred embodiment of the Extensible Architecture of an WebRTC Gateway Server, e.g. such as a Janus Server.

FIGS. 39 and 40 describe the modular design of Janus. The core communicates with a browser using a JSON-based protocol over HTTP and through WebRTC PeerConnections, while the plugins provide the core with RTP streams. The core is then responsible for sending the RTP stream via a PeerConnection. Alongside using HTTP, Janus supports a handful of other ways to communicate, all modular to keep the server as lightweight as possible. The other ways of communication are WebSocket, RabbitMQ, MQTT, Nanomsg and UnixSockets. The plugin that is interesting for video streaming is the streaming plugin. With the streaming plugin, Janus can relay RTP and RTSP video/audio streams in three different ways. The first is on demand streaming of a server-side file, where all viewers stream in their own context. The second is live streaming of a server-side file, where all viewers see the same stream. The third type is live streaming of media (RTP/RTSP), generated by an external tool like GStreamer or FFMPEG. When live streaming from an external tool, all viewers are watching the same stream.

Media streams are added as "mountpoints" and a single WebRTC Gateway Server, e.g. Janus Server, can have multiple mountpoints attached at the same time which users can choose to stream from. RTP streams are added by addressing a port and for RTSP streams, an URL is needed as well as username and password if set. Regarding video codec support, while relaying RTP streams Janus supports anything since the video stream itself is not modified. Instead, the limitations are set by WebRTC and the browser. The streaming plugin also exposes an API which can be used to list available streams, get info about the mountpoints, and edit/add/remove mountpoints. Janus also has an Admin APO which can list active sessions, show statistics about connections, and change server settings. This Admin API is very useful when debugging connection and plugin problems while developing software interacting with Janus.

GStreamer

Instead of using the cameras built in RTSP server and relaying the stream to WebRTC using a WebRTC gateway, a more effective solution could be to change the GStreamer pipeline on the camera. GStreamer recently added a WebRTC sink in version 1.12. By having GStreamer output WebRTC directly instead of RTSP, the conversion process from RTSP to WebRTC would be removed. This can potentially lead to not only camera performance enhancement, but also improvements in latency and other stream related performance metrics. The main reason for us not investigating this, is the deploy ability issue. Installing a WebRTC server on the cameras as an ACAP is much easier than updating GStreamer and using the sink, especially on older cameras.

GStreamer is an open source multimedia framework mainly used to create media applications (streaming, media playback, non-linear editing, etc.). The GStreamer framework is designed to make it easy to write applications that handle audio or video or both.

GStreamer is a framework for creating streaming media applications. The fundamental design comes from the video pipeline at Oregon Graduate Institute, as well as some ideas from DirectShow.

GStreamer's development framework makes it possible to write any type of streaming multimedia application. The GStreamer framework is designed to make it easy to write applications that handle audio or video or both. It isn't restricted to audio and video, and can process any kind of data flow. The pipeline design is made to have little overhead above what the applied filters induce. This makes GStreamer a good framework for designing even high-end audio applications which put high demands on latency.

One of the most obvious uses of GStreamer is using it to build a media player. GStreamer already includes components for building a media player that can support a very wide variety of formats, including MP3, Ogg/Voris, MPEG-1/2, AVI, Quicktime, mod, and more. GStreamer, however, is much more than just another media player. Its main advantages are that the pluggable components can be mixed and matched into arbitrary pipelines so that it's possible to write a full-fledged video or audio editing application.

The framework is based on plugins that will provide the various codec and other functionality. The plugins can be linked and arranged in a pipeline. This pipeline defines the flow of the data. Pipelines can also be edited with a GUI editor and saved as XML so that pipeline libraries can be made with a minimum of effort.

The GStreamer core function is to provide a framework for plugins, data flow and media type handling/negotiation. It also provides an API to write applications using the various plugins.

WebRTC Gateway Server, for Example Janus Gateway Server

The Janus WebRTC Server has been conceived as a general-purpose server. As such, it does not provide any functionality per se other than implementing the means to set up a WebRTC media communication with a browser, exchanging JSON messages with it, and relaying RTP/RTCP and messages between browsers and the server-side application logic they are attached to. Any specific feature/application needs to be implemented in server-side plugins, that browsers can then contact via the Janus core to take advantage of the functionality they provide. Example of such plugins can be implementations of applications like echo tests, conference bridges, media recorders, SIP gateways and the like. Janus WebRTC can be easily installed on Linux in a Ubuntu server.

The main idea behind the Janus WebRTC gateway is to make available a component that is general enough to flexibly adapt to as many situations as possible, by relying on a lightweight WebRTC core that can be properly extended/customized through dynamic injection of application specific plugins.

There is a need for components to bridge WebRTC endpoints to legacy architectures and technologies. The Janus architecture is modular. Specifically, it was designed as a core with a specific set of responsibilities, and pluggable modules to provide specific features, namely support for legacy technologies and protocols. Janus was developed in a standard way to implement an effective communication among Application Servers handling application logic, and Media Servers enforcing the related media manipulation tasks. Communication relied on control packages, allowing the usage of a generic protocol to drive the communication between an application and one or more packages providing specific functionality in a pluggable way. Accordingly Janus was designed with a core handling the high-level communication with users (sessions and handles management, WebRTC-related protocols) and server-side plugins to provide specific functionality in a way that is transparent to WebRTC, and as such independent from the web application.

Figure 41:
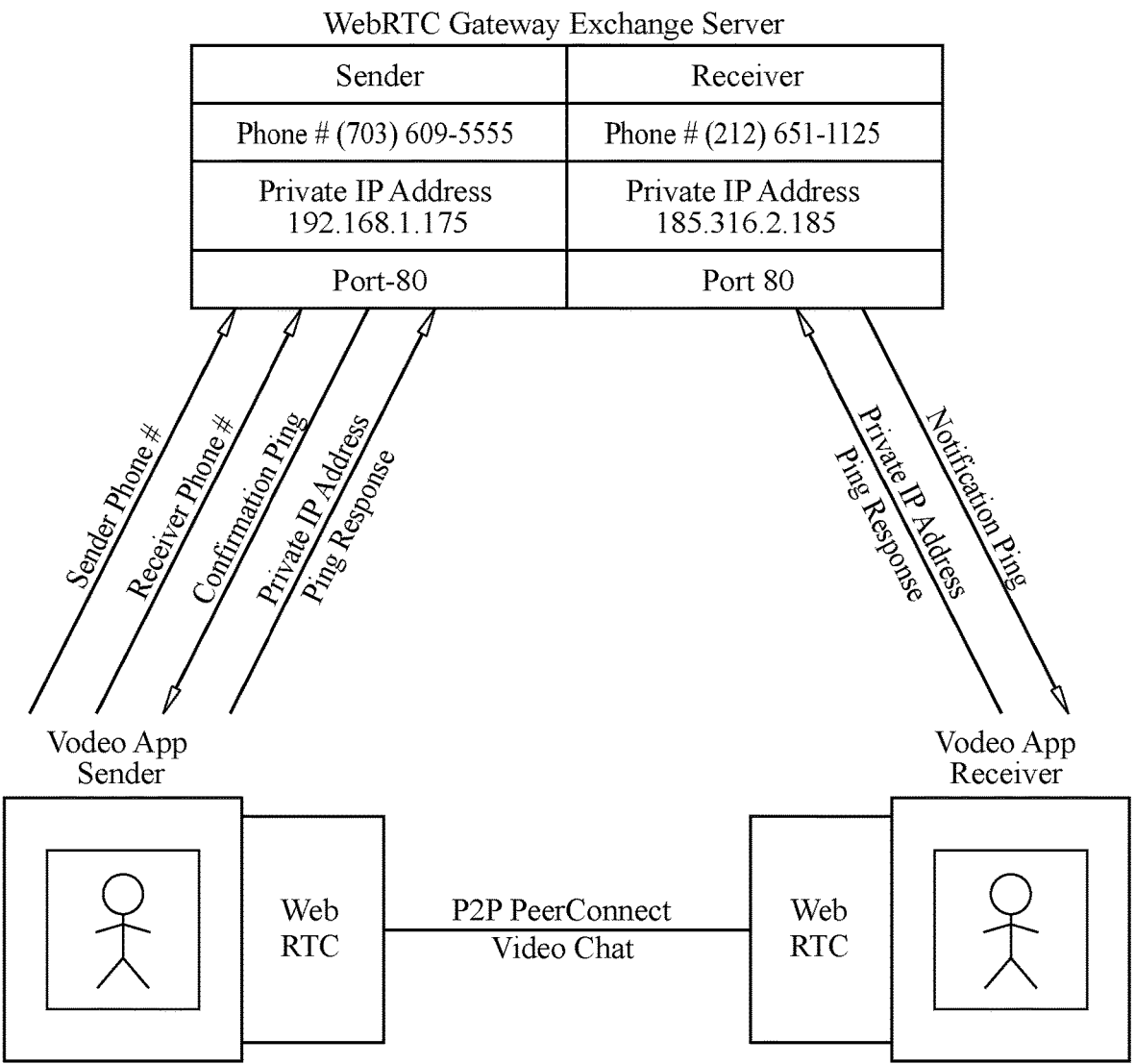
FIG. 41 is a flowchart illustrating a non-limiting preferred embodiment of a WebRTC Gateway Server to Establish Video Chat with VODEO apps.

FIG. 41 is a flowchart illustrating a non-limiting preferred embodiment of a WebRTC Gateway Server to Establish Video Chat with VODEO apps. FIG. 41 shows a VODEO App for a Sender transmitting the sender phone number, the receiver's phone number, the sender's private IP address, and a Ping request to a WebRTC Gateway Server. A confirmation ping is returned and the Server populates the Sender data file with the information provided. The receiver VODEO app receives a notification Ping and replies with a private IP address to the Server. The WebRTC Server then establishes the Peer Connection between the sender and the receiver.

Figure 42:
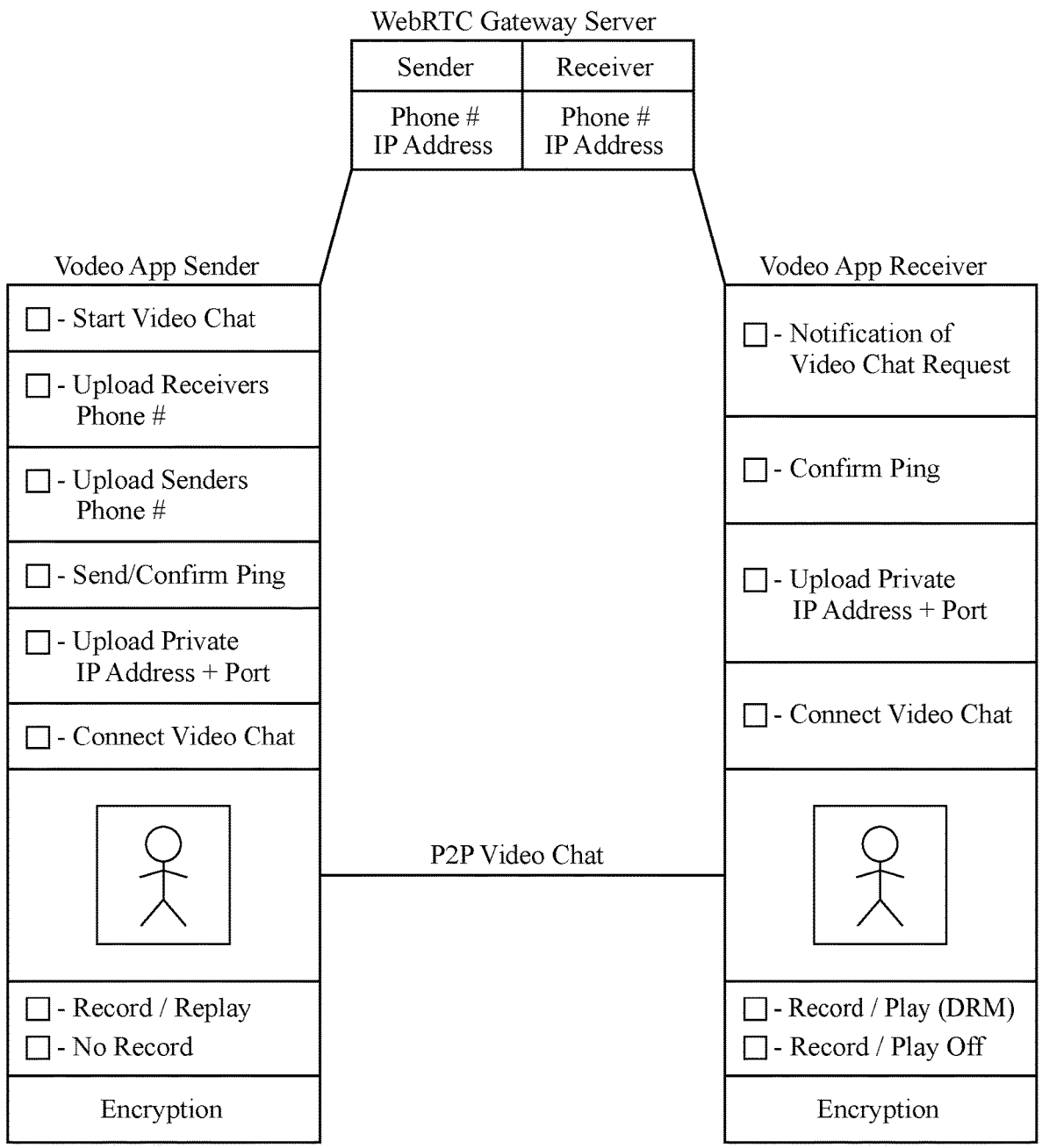
FIG. 42 is a flowchart illustrating a non-limiting preferred embodiment of a VODEO app and WebRTC Gateway Server—Video Chat Connection.

FIG. 42 is a flowchart illustrating a non-limiting preferred embodiment of a VODEO app and WebRTC Gateway Server—Video Chat Connection. FIG. 42 shows a VODEO App for a Sender using the "push to connect" function to transmit the sender phone number, the receiver's phone number, the sender's private IP address, and a Ping request to a WebRTC Gateway Server. A confirmation ping is returned and the Server populates the Sender data file with the information provided. The receiver VODEO app receives a notification Ping and replies with a private IP address to the Server. The WebRTC Server then establishes the Peer Connection between the sender and the receiver. FIG. 42 shows that DRM permission and encryption selections are available.

Figure 43:
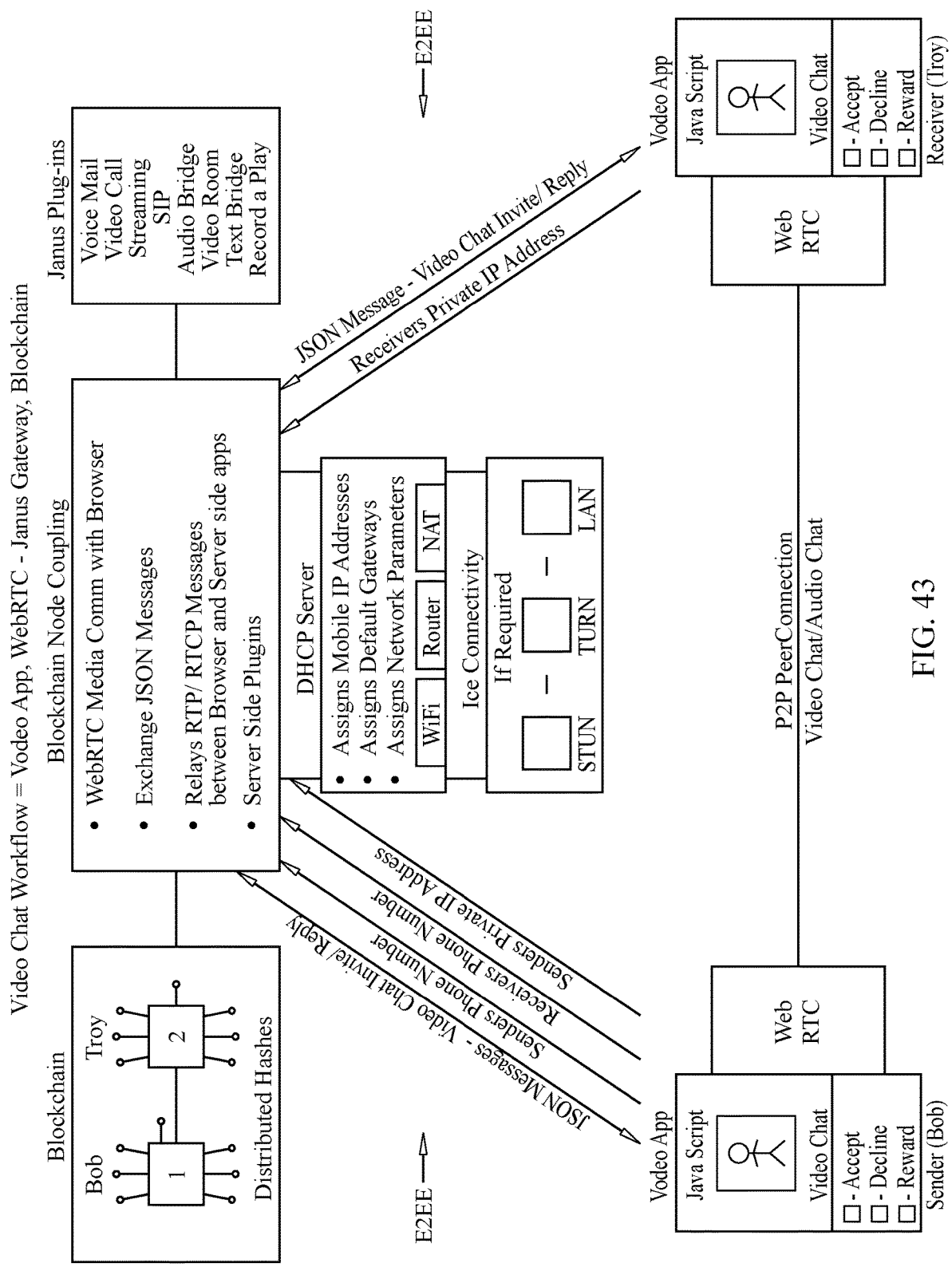
FIG. 43 is a flowchart illustrating a non-limiting preferred embodiment of a Video Chat Workflow—VODEO app, WebRTC Gateway Server, Blockchain.

FIG. 43 is a flowchart illustrating a non-limiting preferred embodiment of a Video Chat Workflow—VODEO app, WebRTC, Janus Gateway, Blockchain. This figure shows a WebRTC-Janus Gateway Server to Establish Video Chat with VODEO apps. FIG. 43 shows a VODEO App for a Sender transmitting in a JSON Message the sender's phone number, the receiver's phone number, the sender's private IP address, and a INVITE request to a WebRTC-Janus Gateway Server. The Server exchanges and replays JSON messages with the receiver, and between server side plugins and the App. The receiver VODEO app receives a notification of the invite and replies with a private IP address to the Server. The WebRTC-Gateway Server, e.g. Janus Server then establishes the Peer Connection between the sender and the receiver. A DHCP Server is also shown in order to assign mobile IP addresses, assign default Gateways, and assign network parameters for WiFi, router, and NAT traversal. A Blockchain module provides group node coupling with distributed hash table technology for PII. Janus plug-ins provide voice mail, video calls, streaming, SIP, audio bridging, video room options, text room options, recording, and playback.

Figure 44:
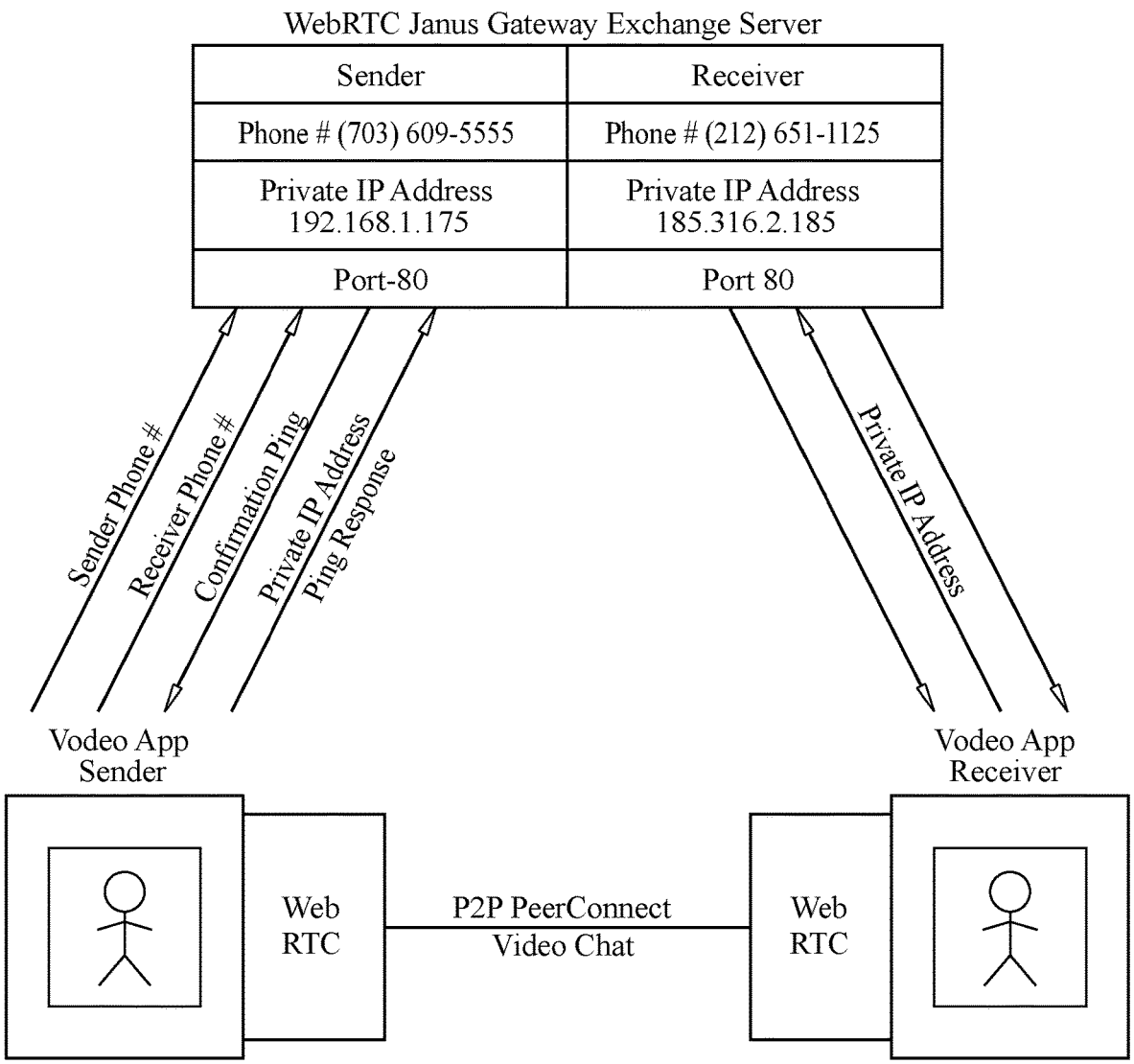
FIG. 44 is a flowchart illustrating a non-limiting preferred embodiment of a WebRTC Gateway Server, such as e.g. a Janus Server, to Establish Video Chat with VODEO apps.

FIG. 44 is a flowchart illustrating a non-limiting preferred embodiment of a WebRTC-Janus Gateway Server to Establish Video Chat with VODEO apps. FIG. 44 shows a VODEO App for a Sender transmitting the sender phone number, the receiver's phone number, the sender's private IP address, and a Ping request to a WebRTC-Janus Gateway Server. A confirmation ping is returned and the Server populates the Sender data file with the information provided. The receiver VODEO app receives a notification Ping and replies with a private IP address to the Server. The WebRTC-Gateway Server then establishes the Peer Connection between the sender and the receiver.

Figure 45:
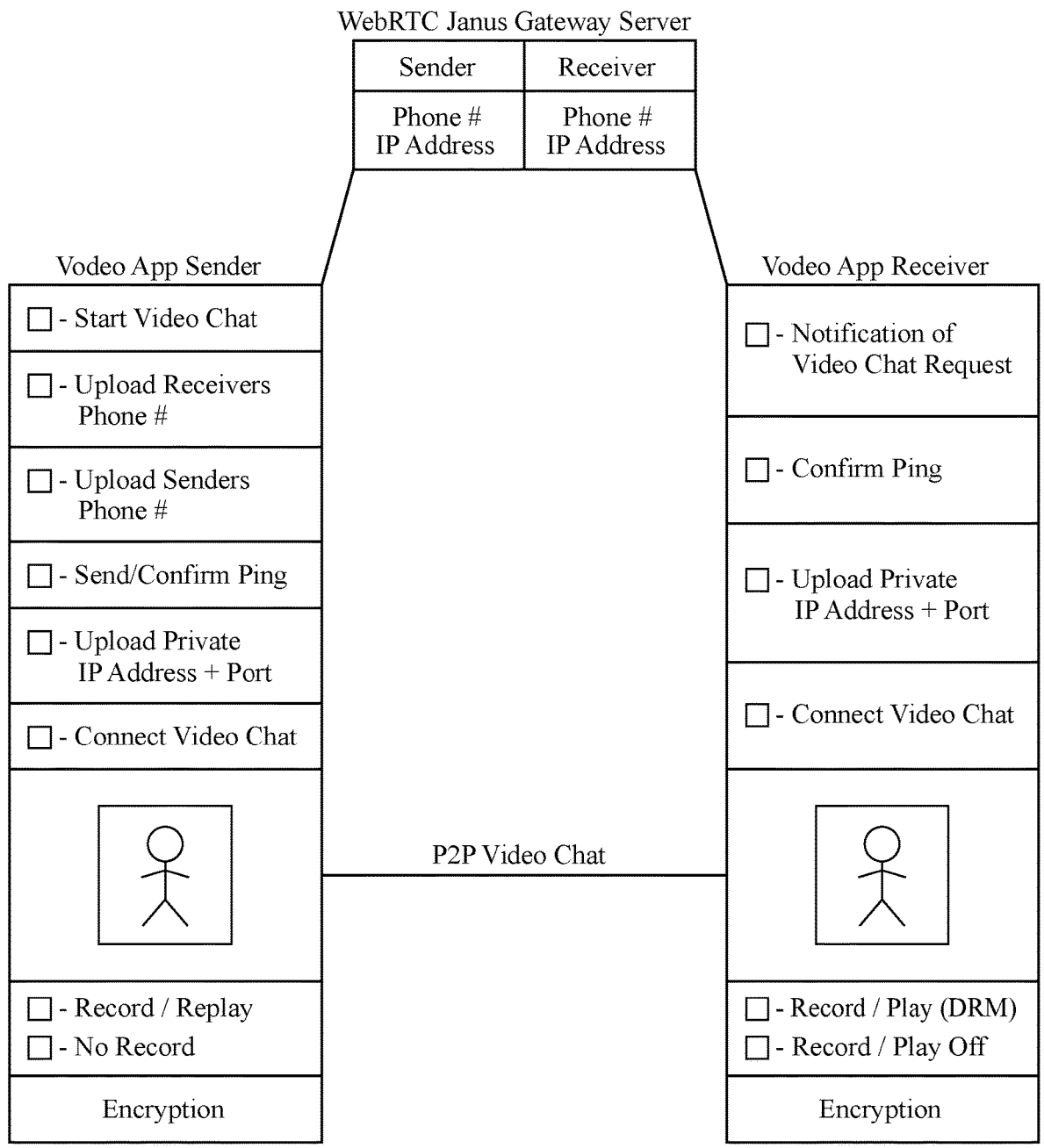
FIG. 45 is a flowchart illustrating a non-limiting preferred embodiment of a VODEO app and WebRTC Gateway Server—Video Chat Connection.

FIG. 45 is a flowchart illustrating a non-limiting preferred embodiment of a VODEO app and WebRTC-Janus Gateway Server—Video Chat Connection. FIG. 45 shows a VODEO App for a Sender using the "push to connect" function to transmit the sender phone number, the receiver's phone number, the sender's private IP address, and a Ping request to a WebRTC-Janus Gateway Server. A confirmation ping is returned and the Server populates the Sender data file with the information provided. The receiver VODEO app receives a notification Ping and replies with a private IP address to the Server. The WebRTC-Server then establishes the Peer Connection between the sender and the receiver. FIG. 45 shows that DRM permission and encryption selections are available.

Figure 46:
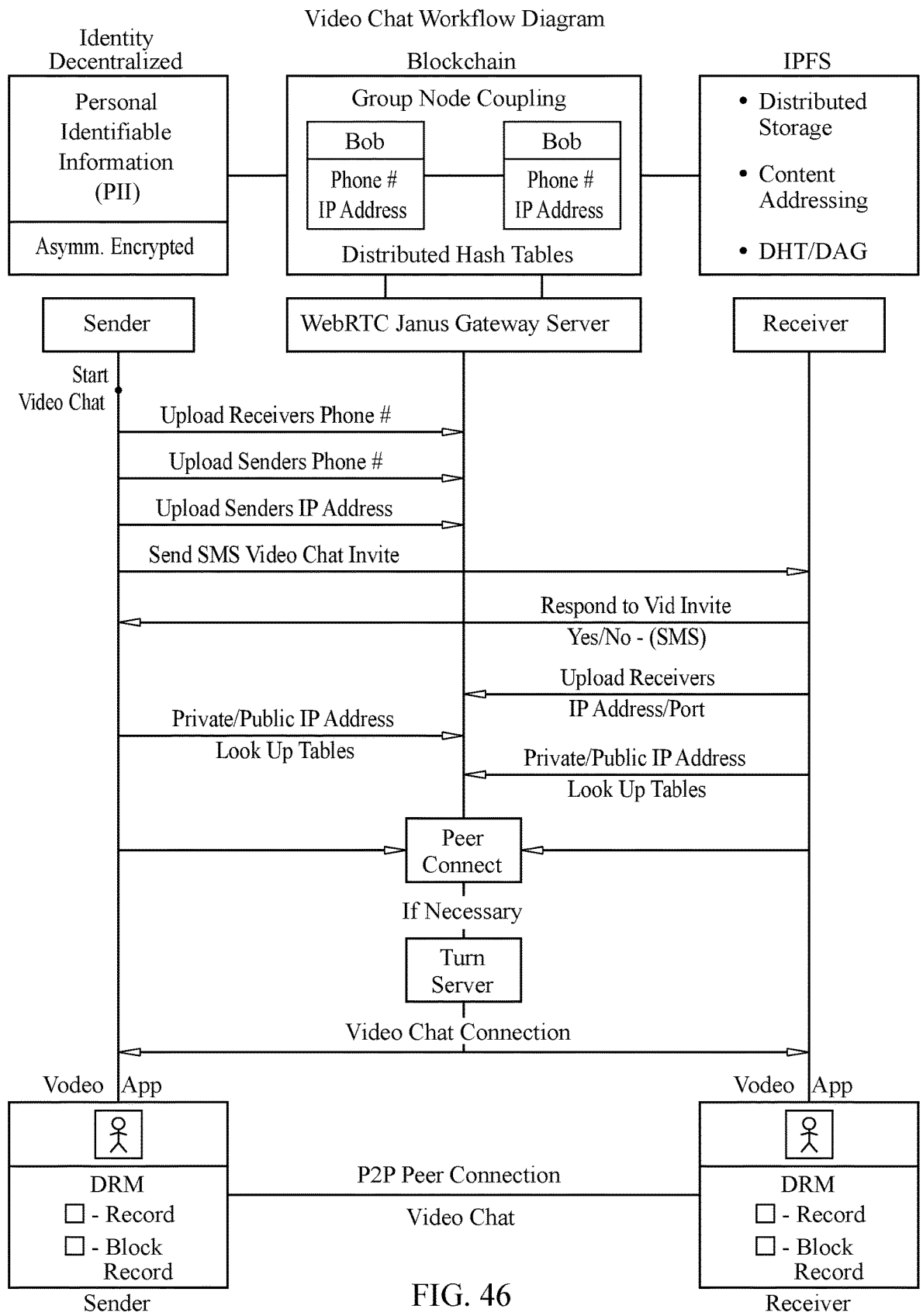
FIG. 46 is a flowchart illustrating a non-limiting preferred embodiment of a Video Chat Workflow Diagram.

FIG. 46 is a flowchart illustrating a non-limiting preferred embodiment of a WebRTC-Janus Gateway Video Chat Workflow Diagram. Similar to FIG. 28, FIG. 46 shows the flowchart starting with a Sender initiating a video chat on a App that is connected to a WebRTC-Janus Gateway Server having a Private Blockchain with DHT, an Interplanetary File System (IPFS) Server and a Security Module for personally identifiable information (P.I.I.). The sender identifies the receiver on the sender device and pushes a button to peer connect to the receiver for a video chat. The button push commences a process that uploads to the WebRTC-Janus Gateway Server a request file or communication containing the receiver telephone number, the sender telephone number, the sender's IP address, and an SMS video chat invite. The WebRTC-Janus Gateway Server receives, processes, and forwards the request file to the receiver. The receiver sends a response to the SMS invite, within the App, or using an API within the App integrated with the native or installed messaging software. This response generates within the APP an upload from the receiver of the receiver IP address and port. The sender app and the receiver app are peer-2-peer connected in accordance with WebRTC-Janus protocol, and a video chat connection is established.

Figure 47:
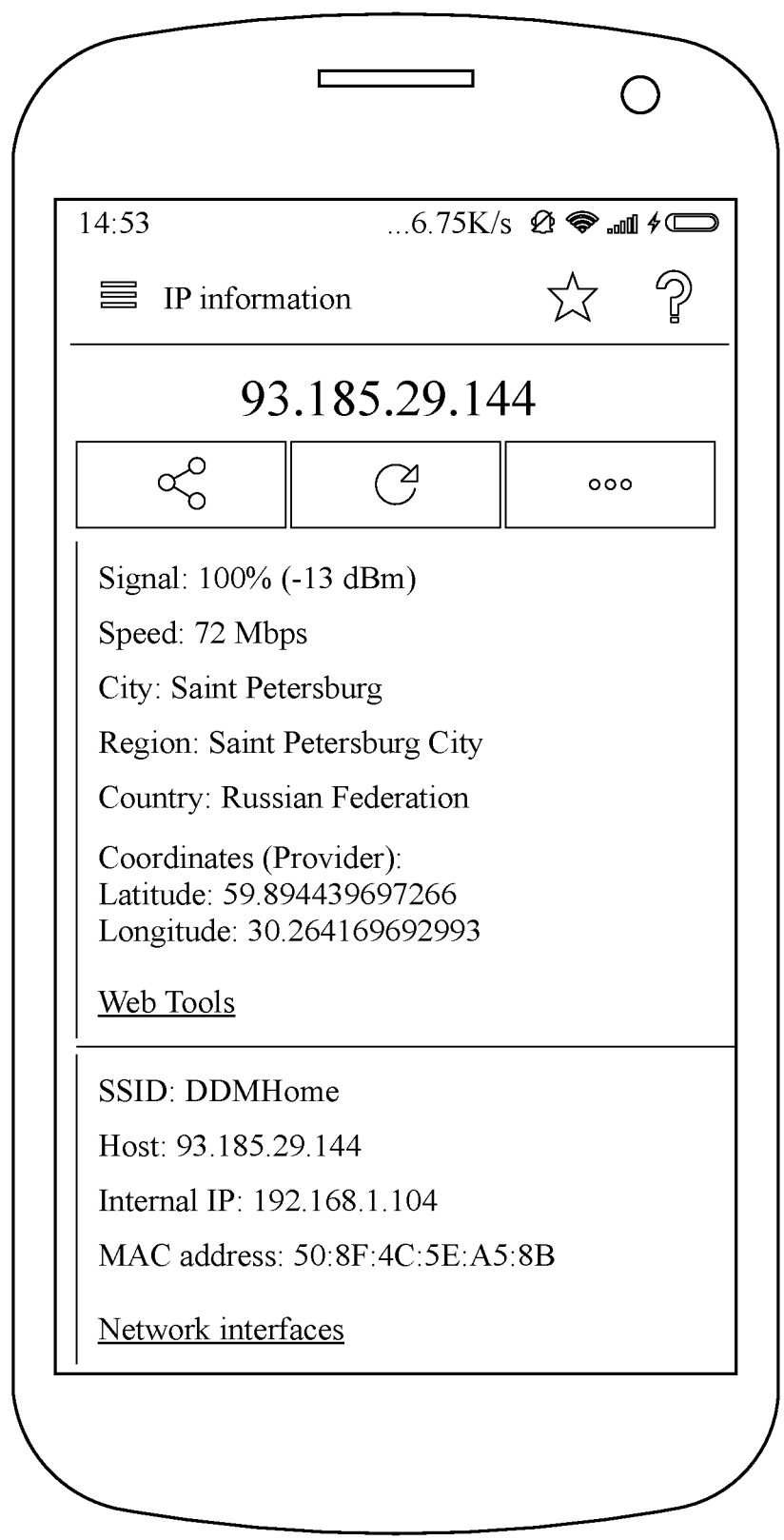
FIG. 47 is an illustration of a non-limiting preferred embodiment of an Android smart phone screen showing IP address.

FIG. 47 is an illustration of a non-limiting preferred embodiment of an Android smartphone screen showing IP address.

Figure 48:
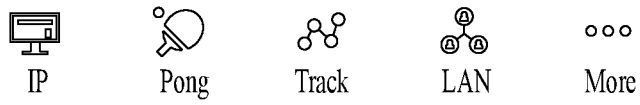
FIG. 48 is an illustration of a non-limiting preferred embodiment of an iOS smart phone screen showing IP address.

FIG. 48 is an illustration of a non-limiting preferred embodiment of an iOS smartphone screen showing IP address.

Figure 49:
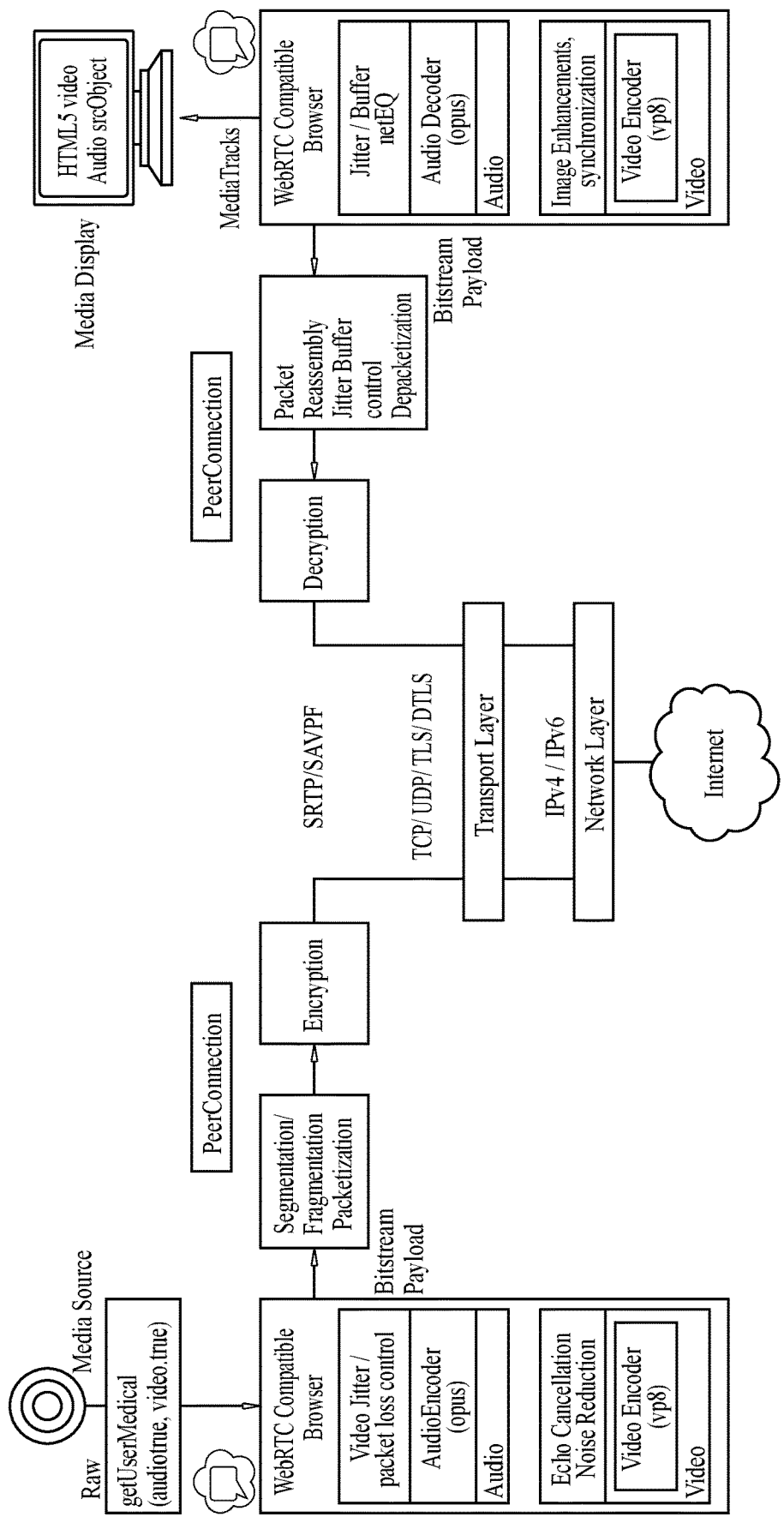
FIG. 49 is a flowchart illustrating a non-limiting preferred embodiment of a Media Flow Path in P2P WebRTC Communication.

FIG. 49 is a flowchart illustrating a non-limiting preferred embodiment of a Media Flow Path in P2P WebRTC Communication. This figure shows a media source connected to a WebRTC App with a browser functionality and having digital signal processing functions, such as echo cancellation, noise reduction, etc. A Peer Connection packetizes the bitstream into fragments, encrypts the payload, send the communication through the transport layer to the network layer to a cloud server. The communications are then downloaded from the cloud, through the network layer, and the transport layer for decryption, digital processing, and forwarding to a content display device.

Figure 50:
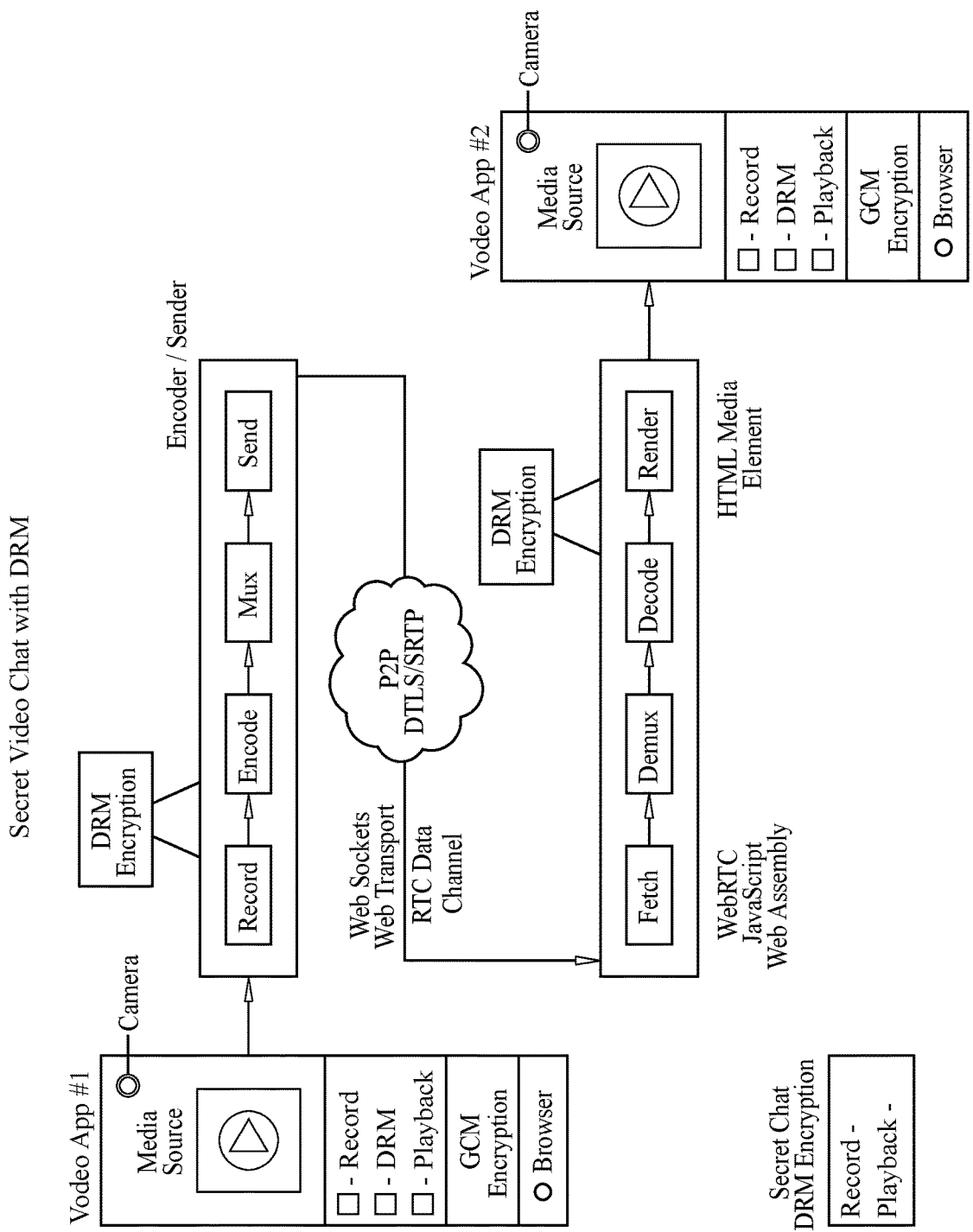
FIG. 50 is a flowchart illustrating a non-limiting preferred embodiment of a Secret Video chat with DRM.

FIG. 50 is a flowchart illustrating a non-limiting preferred embodiment of a Secret Video chat with DRM. This figure shows VODEO app #1 on a device providing a media source, with selections for recording, DRM, playback, encryption, and browser. The VODEO app then processes the file and transports over the P2P connection for delivery to the VODEO app #2 on device #2. A selection for secret chat, DRM, and encryption are provide by menu in the VODEO app with functionality for these features being implemented with a combination of server-side modules and local device VODEO app programming.

Figure 51:
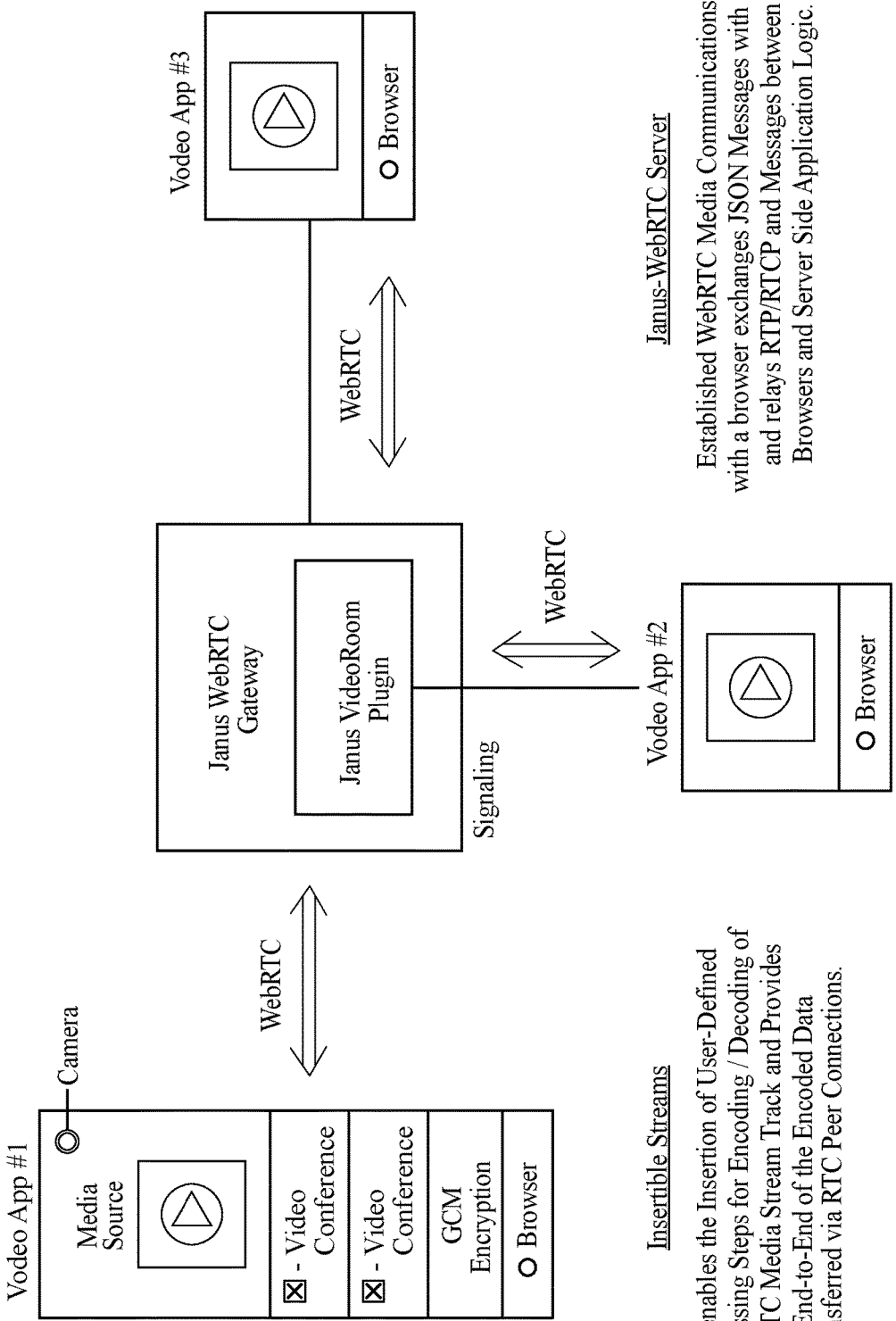
FIG. 51 is a flowchart illustrating a non-limiting preferred embodiment of a JANUS (WebRTC gateway server) video room plug-in for End-to-End encryption and for videoconferencing (SFU).

FIG. 51 is a flowchart illustrating a non-limiting preferred embodiment of a JANUS video room plug-in for End-to-End encryption and for video conferencing (SFU). This figure shows the use of insertable streams as an API that enables the insertion of user-defined processing steps for encoding/decoding of WebRTC media stream track and provides end-to-end encryption of the encoded data transferred via RTC peer connections. The Janus-WebRTC Server establishes media communication with a browser or browser functionality, exchanges JSON messages, and relays RTP/RTCP and messages between Apps/browsers and server-side applications.

Figure 52:
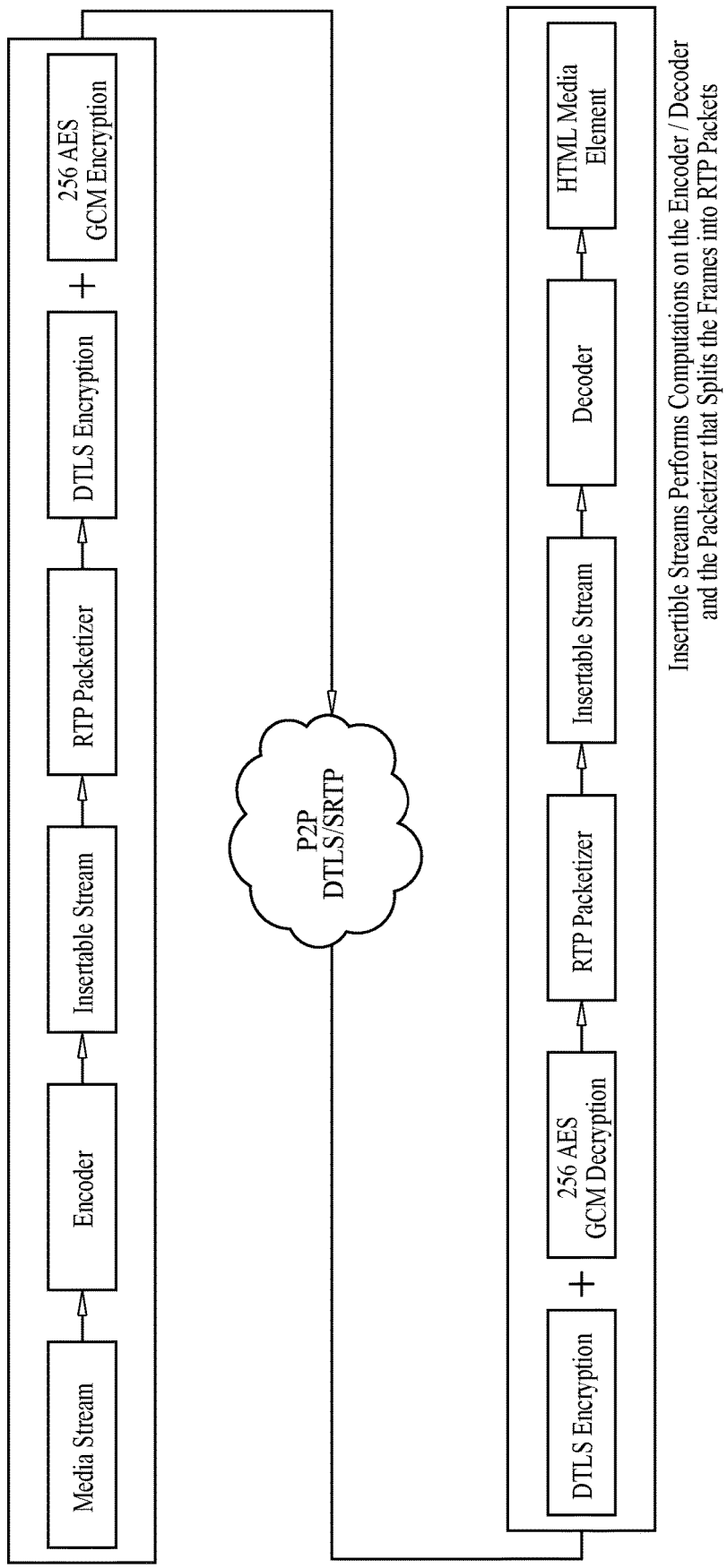
FIG. 52 is a flowchart illustrating a non-limiting preferred embodiment of a WebRTC Insertable Streams for E2E encryption.

FIG. 52 is a flowchart illustrating a non-limiting preferred embodiment of a WebRTC Insertable Streams for E2E encryption. This figure shows a media stream flowing to an encoder, then to an insertable stream. The insertable stream is sent to the RTP packetizer, sent for DTLS encryption, and then 256 AES GM encryption, before it is uploaded over the P2P DTLS/SRTP peer connection. The signal/communication is then downloaded for DTLS decryption, 256 AES GCM decryption, RTP depacketizing, processing as an insertable stream, decoded and sent as an HTML media element.

Figure 53:
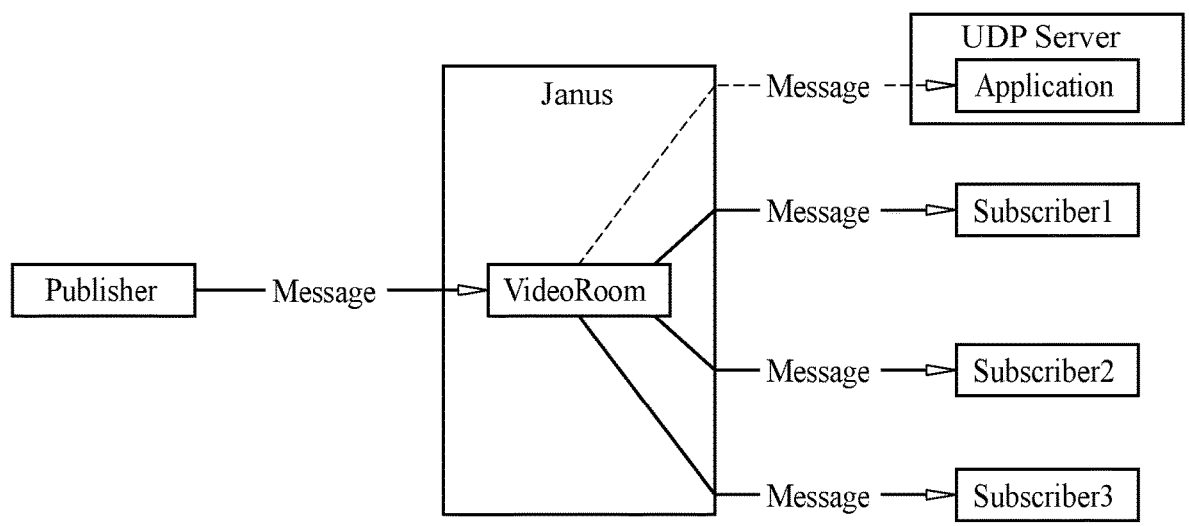
FIG. 53 is a flowchart illustrating a non-limiting preferred embodiment of Data Channels Broadcasting with a WebRTC Gateway Server, such as e.g. a Janus Server.

FIG. 53 is a flowchart illustrating a non-limiting preferred embodiment of Data Channels Broadcasting with JANUS. This figure shows a publisher sending a message through a Server to a video room. The message is split amongst the subscriber group, and is also shared with a UDP server as an application to provide data channel broadcasting.

An overview of the architecture and related interactions is depicted. The core is mostly responsible for three things: managing application sessions with users through a RESTful API; implementing the WebRTC communication with the same users, by taking care of the whole WebRTC lifecycle (negotiation, establishment, and management of PeerConnections); and attaching users to plugins, in order to allow them to exchange messages (based on a per-plugin ad-hoc protocol) and more importantly media (relaying plain RTP/RTCP). This allows plugins to easily communicate with WebRTC users, as most hassles associated with the WebRTC stack are masked by the gateway core. Janus plugins just need to implement the related plugin APO to set up a specific session with users that want to take advantage of their features and get prepared to receive and/or send RTP packets and related RTCP messages, in case of need.

The core only implements the WebRTC stack, JSEP/SDP, ICE, DTLS-SRTP, Data Channels, Plug-ins for Janus API different "Transports", HTTP/WebSockets/RabbitMQ/UnixSockets/MQTT. Application Logic is implemented in Plug-ins. Plugins route/manipulate the media/data. Plugins can be combined on the client side for Video SFU, AudioMCU, SIP Gatewaying, broadcasting etc. Plugins are used as "bricks" to compose an application, e.g. Streaming+VideoRoom=Social TV, VideoRoom+Audio Bridge+TextRoom=Webinar.

GStreamer and WebRTC

GStreamer is a pipeline-based multimedia framework that links together a wide variety of media processing systems to complete complex workflows. GStreamer is used to build a system that reads files in one format, processes them, and exports them in another. The formats and processes can be changed in a plug and play fashion.

GStreamer supports a wide variety of media-handling components, including simple audio playback, audio and video playback, recording, streaming and editing. The pipeline design serves as a base to create many types of multimedia applications such as video editors, transcoders, streaming media broadcasters and media players. GStreamer provides a flexible way to implement any application that needs to play, record, or transform media-like data across a diverse scale of devices and products, including embedded IoT devices, desktop (video/music players), video recording, video conferencing, VoIP clients, WebRTC browsers servers (encode/transcode forms). GStreamer is free and open-source software. It was designed to work on a variety of operating systems, e.g. Linux kernel-based operating systems, and supports Android, macOS, iOS, and Windows.

GStreamer WebRTC is a flexible solution to web-based media. The GStreamer's WebRTC implementation eliminates some of the shortcomings of using WebRTC in native apps, server applications, and IoT devices. One key application is to convert various audio (including WAV, MP3, Media Audio) and video formats (including MPEG, MOV & AUI) to be compatible with WebRTC specified video codecs (V8/V9) and audio codecs (iSAC and iLBC) for VoIP. GStream can be integrated with Raspberry PI4 and Ubuntu servers and many IoT device formats.

Figure 54:
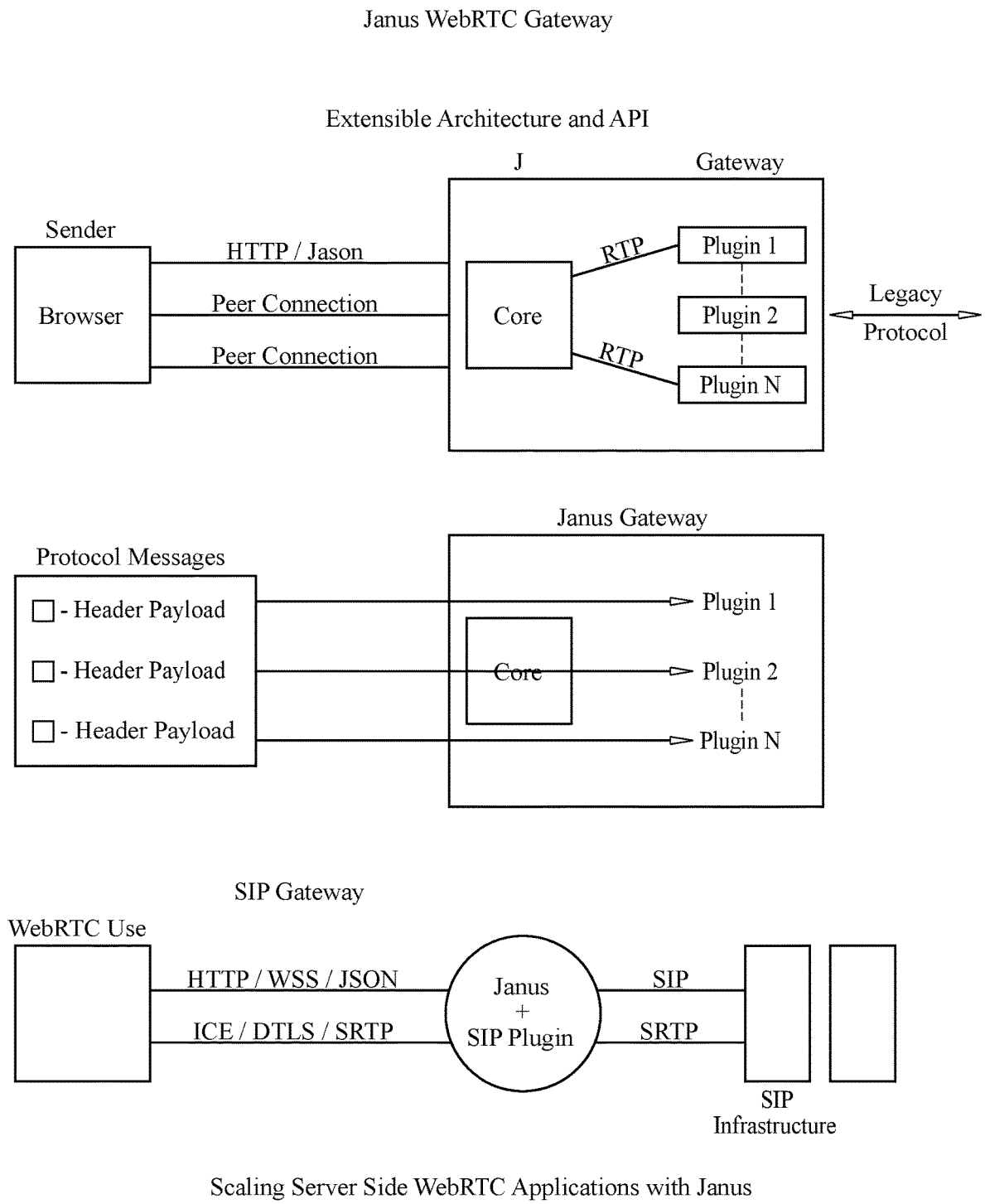
FIG. 54 is a flowchart illustrating a non-limiting preferred embodiment of Scaling Server-side WebRTC applications with Janus and shows a JANUS WebRTC Gateway.

FIG. 54 is a flowchart illustrating a non-limiting preferred embodiment of Scaling Server-side WebRTC applications with Janus and shows a JANUS WebRTC Gateway. This figure shows a WebRTC browser in communication with a Janus Gateway and sending HTTP/JSOn messages, and having a Peer Connection. The Janus Gateway has a core for sending RTP through plugins to Legacy devices and legacy protocols. FIG. 54 shows protocol messages having a header payload, sent through the Janus core to the plugins as necessary. FIG. 54 shows a SIP Gateway wherein a WebRTC uses http/wss/json messaging with ice/dtls/srtp encryption connects to an Server with an SIP plugin for communication with SIP infrastructure.

FIG. 55 is a flowchart illustrating a non-limiting preferred embodiment of a Janus Extensible Architecture and API. This figure shows a user create a session sending a request to an WebRTC Server. A session ID is assigned by the Janus Server to the user. The user attaches a handle, session ID, and plugin information to communicate with a remote plugin. The remote plugin approves the connection and provides the user with a handle ID. As before the user is in communication with a WebRTC Server, which is in communication with a remote plugin. The WebRTC between the user ad the Janus Server is sent using a JSEP offer and answer, the plug-in sends a notification answer after receipt of the offer, and the communications are encrypted using ICE/DTLS/SRTP encryption between the user and the Janus Server, and using RTP between the Janus Sever and the plug-in. Each plugin may be a feature in a webinar, a video communication in a social network, and/or social TV, streaming and video rooms.

Figure 56:
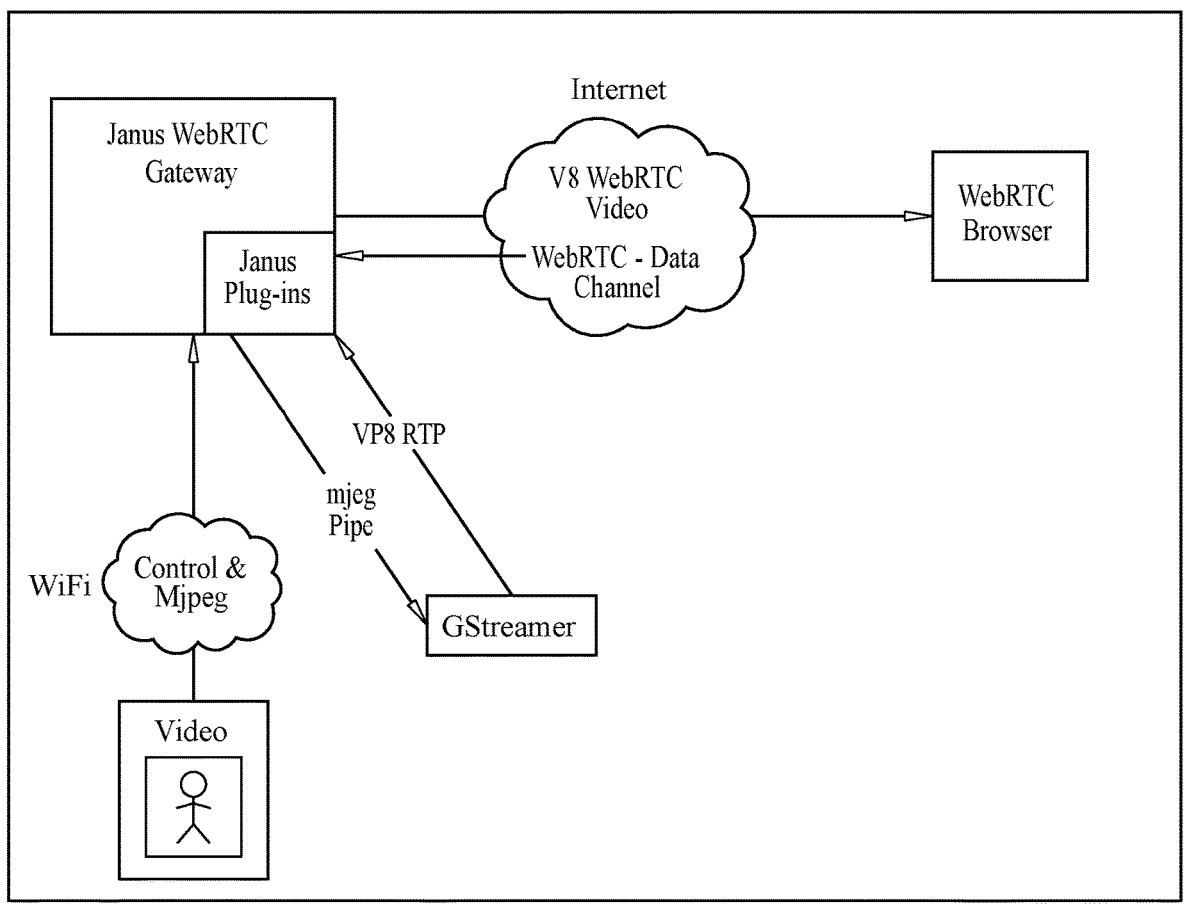
FIG. 56 is a flowchart illustrating a non-limiting preferred embodiment of a Janus WebRTC Gateway Use Case.
Figure 57:
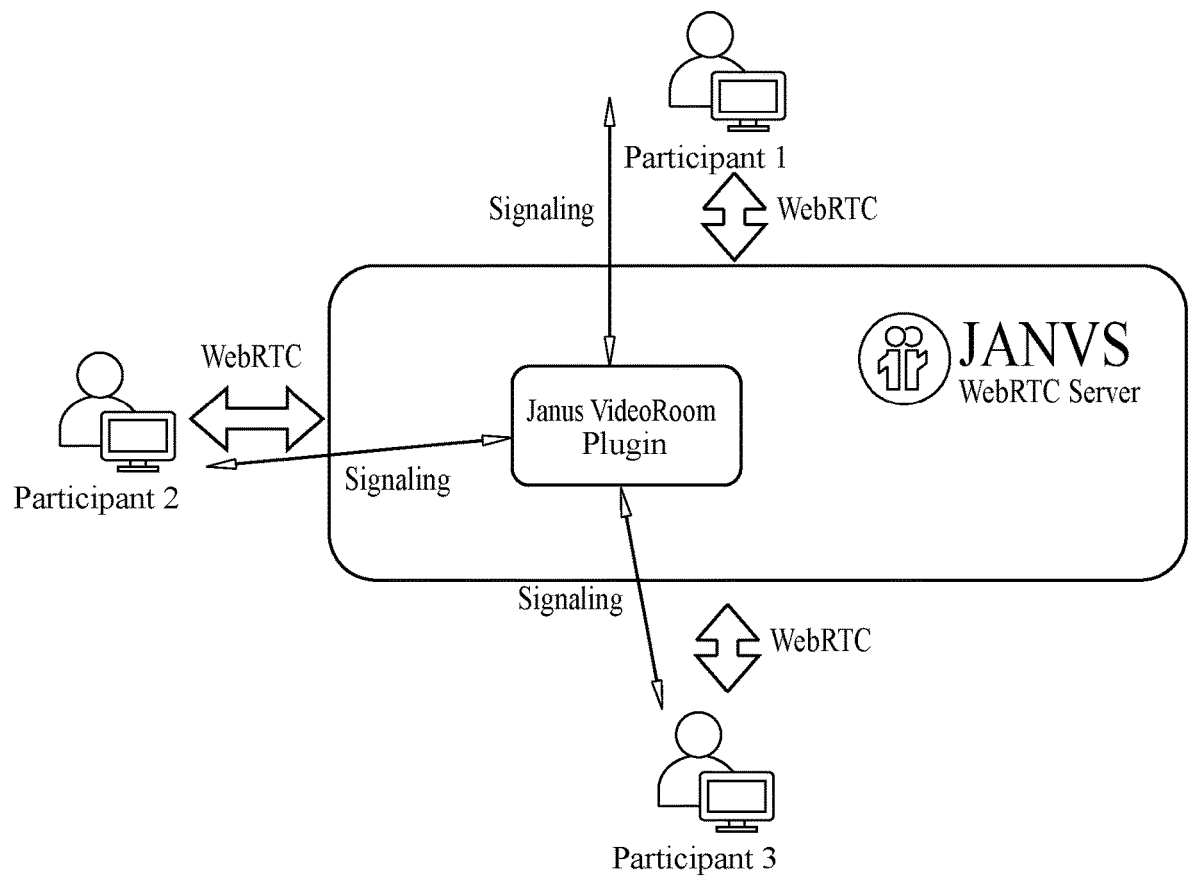
FIG. 57 is a flowchart illustrating a non-limiting preferred embodiment of WebRTC Gateway Server-WebRTC Video Conferencing.

FIG. 56 is a flowchart illustrating a non-limiting preferred embodiment of a Janus WebRTC Gateway Use Case. FIG. 56 shows that Janus is used today for many implementations, including Web Conferencing, Webinars, WebRTC-to-SIP Gateway, Streaming live events, Surveillance Systems, E-Health, Home Automation, Internet of Things, Mobile Devices, Raspberry PI's, Wearables, Drones etc FIG. 57 is a flowchart illustrating a non-limiting preferred embodiment of Janus WebRTC Video Conferencing. FIG. 57 shows how three participants connect to the Janus video room plug-in to start a video room and publish media and subscribe to the other participants' videos using WebRTC.

Figure 58:
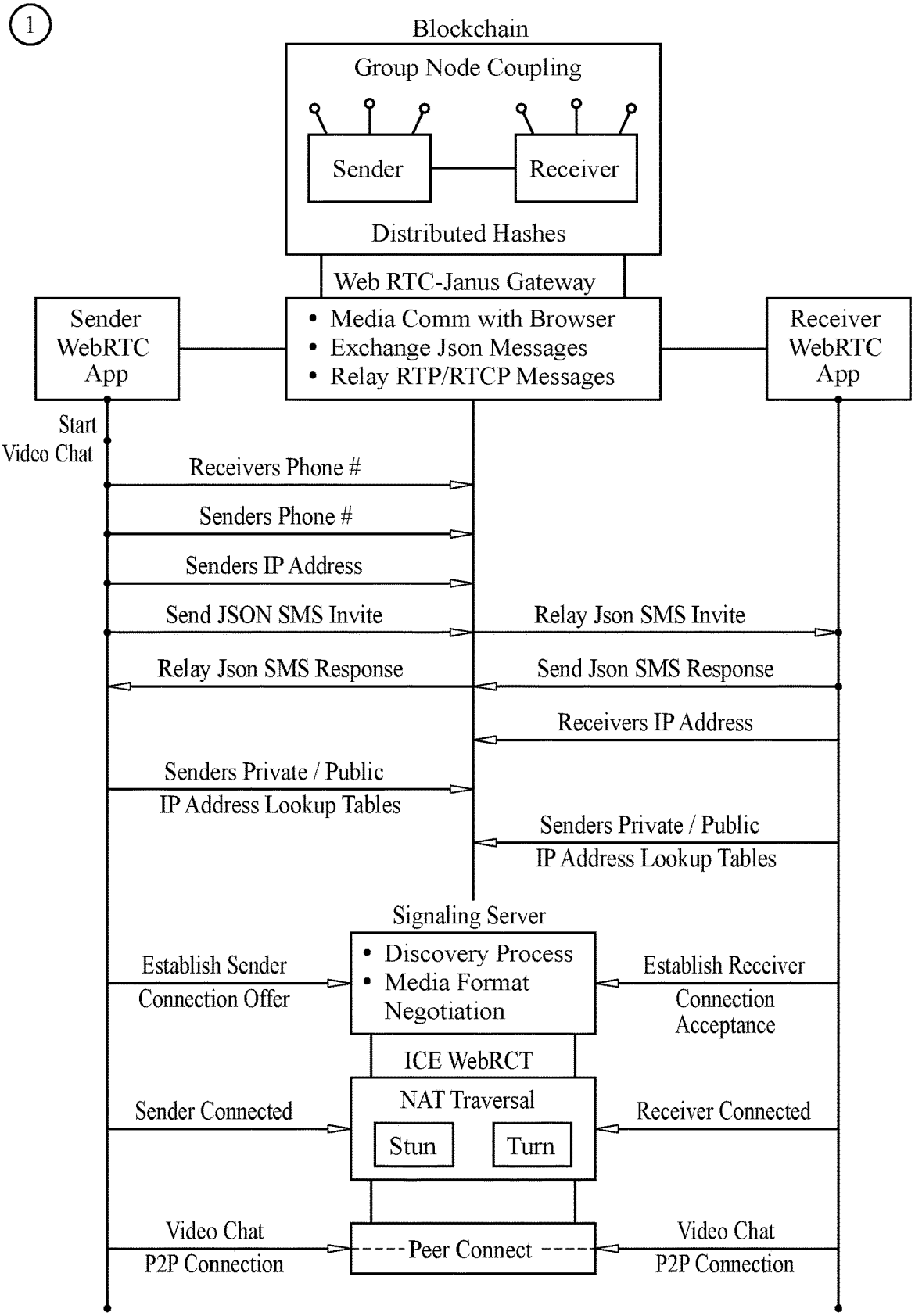
FIG. 58 is a diagram illustrating a non-limiting preferred embodiment of a WebRTC Video Chat workflow.

FIG. 58 is a diagram illustrating a non-limiting preferred embodiment of a WebRTC Video Chat workflow. FIG. 58 shows a WebRTC Video Chat App Workflow and shows an example of a WebRTC-Janus Gateway Server Establishing Video Chat with VODEO apps. FIG. 58 shows a VODEO WebRTC App for a Sender transmitting in a JSON Message the sender's phone number, the receiver's phone number, the sender's private IP address, and a INVITE request to a WebRTC-Janus Gateway Server. The Server exchanges and replays JSON messages with the receiver, and between server side plugins and the App. The receiver WebRTC VODEO app receives a notification of the invite and replies with a private IP address to the Server. The WebRTC-Janus Server then establishes the Peer Connection between the sender and the receiver. A Signaling Server is also shown in order to assist discovery of IP addresses, for media format negotiation, assign network parameters for WiFi, router, and NAT traversal. A Blockchain module provides group node coupling with distributed hash table technology for PII.

Figure 59:
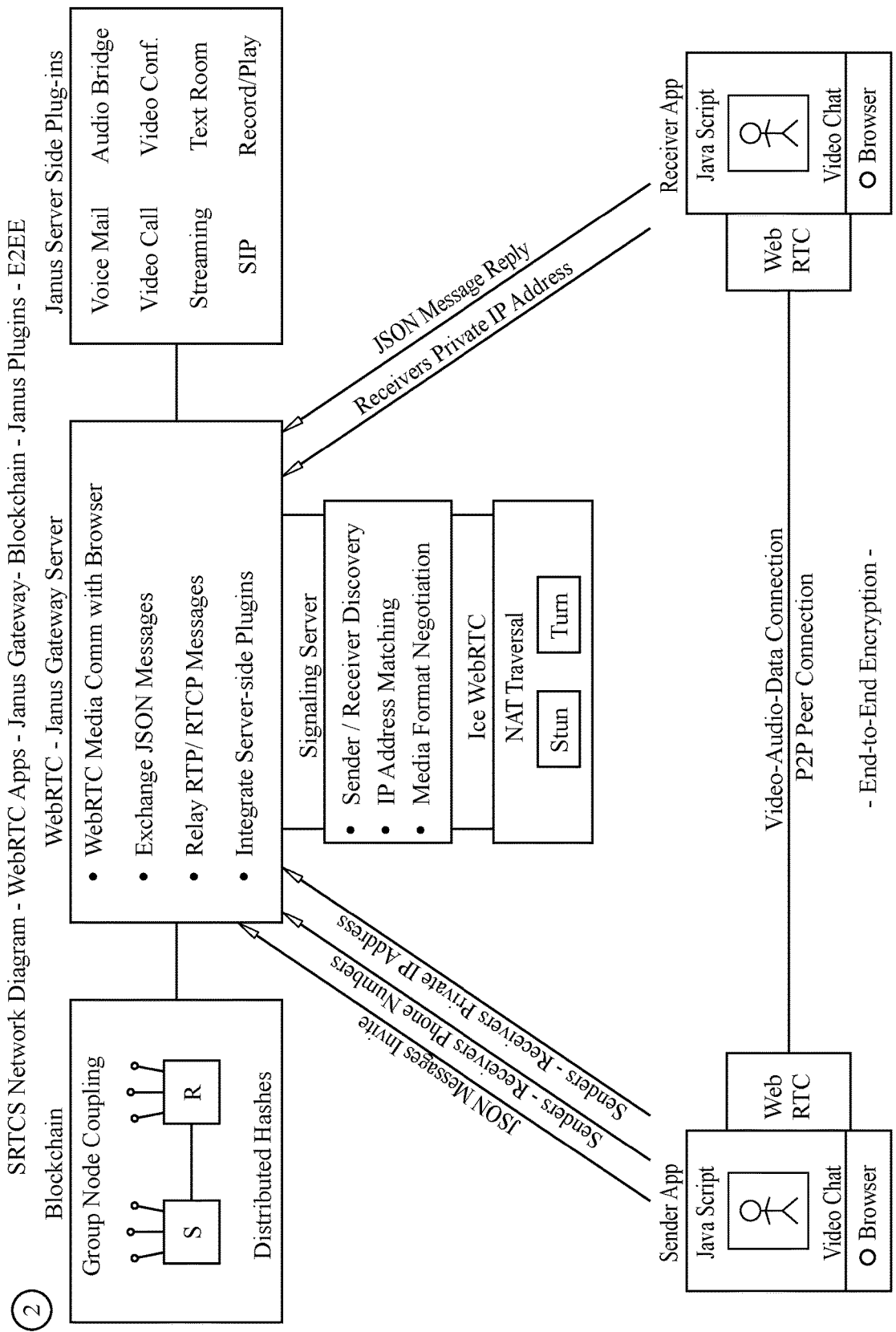
FIG. 59 is a diagram illustrating a non-limiting preferred embodiment of a SRTCS Network with WebRTC apps, Janus Gateway, Blockchain, Janus plugins, and end-to-end encryption (E2EE).

FIG. 59 is a diagram illustrating a non-limiting preferred embodiment of a SRTCS Network with WebRTC apps, Janus Gateway, Blockchain, Janus plugins, and end-to-end encryption (E2EE). FIG. 59 shows a WebRTC Video Chat App Workflow and shows an example of a WebRTC-Janus Gateway Server Establishing Video Chat with VODEO apps. FIG. 59 shows a VODEO WebRTC App for a Sender transmitting in a JSON Message the sender's phone number, the receiver's phone number, the sender's private IP address, and a INVITE request to a WebRTC-Janus Gateway Server. The Server exchanges and replays JSON messages with the receiver, and between server side plugins and the App. The receiver WebRTC VODEO app receives a notification of the invite and replies with a private IP address to the Server. The WebRTC-Janus Server then establishes the Peer Connection between the sender and the receiver. A Signaling Server is also shown in order to assist discovery of IP addresses, for media format negotiation, assign network parameters for WiFi, router, and NAT traversal. A Blockchain module provides group node coupling with distributed hash table technology for PII. Janus plug-ins provide voice mail, video calls, streaming, SIP, audio bridging, video room options, text room options, recording, and playback.

Figure 60:
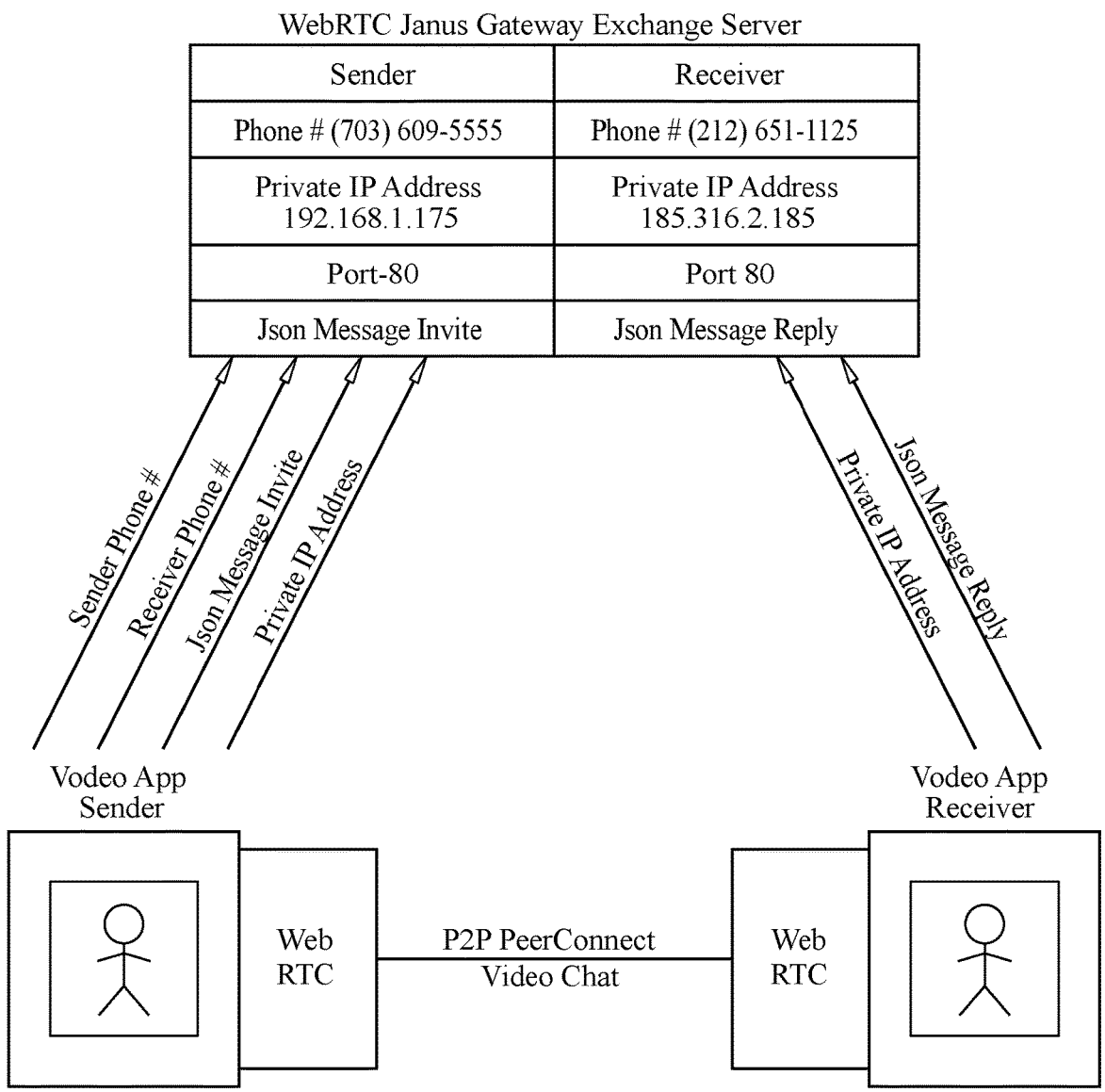
FIG. 60 is a diagram illustrating a non-limiting preferred embodiment of a WebRTC Gateway Server for establishing video chat with the VODEO apps.

FIG. 60 is a diagram illustrating a non-limiting preferred embodiment of a WebRTC Gateway Server for establishing video chat with the VODEO apps. FIG. 60 shows Sender VODEO app transmitting the sender phone number, the receiver phone number, the JSON message invite, and the Sender private IP address to the WebRTC-Janus Gateway Server. The Server logs the Sender information and matches, using the response from the receiver, the receiver connection information. The WebRTC-Janus gateway Server then connects the Sender and the Receiver with a Peer Connection for a video chat.

Figure 61:
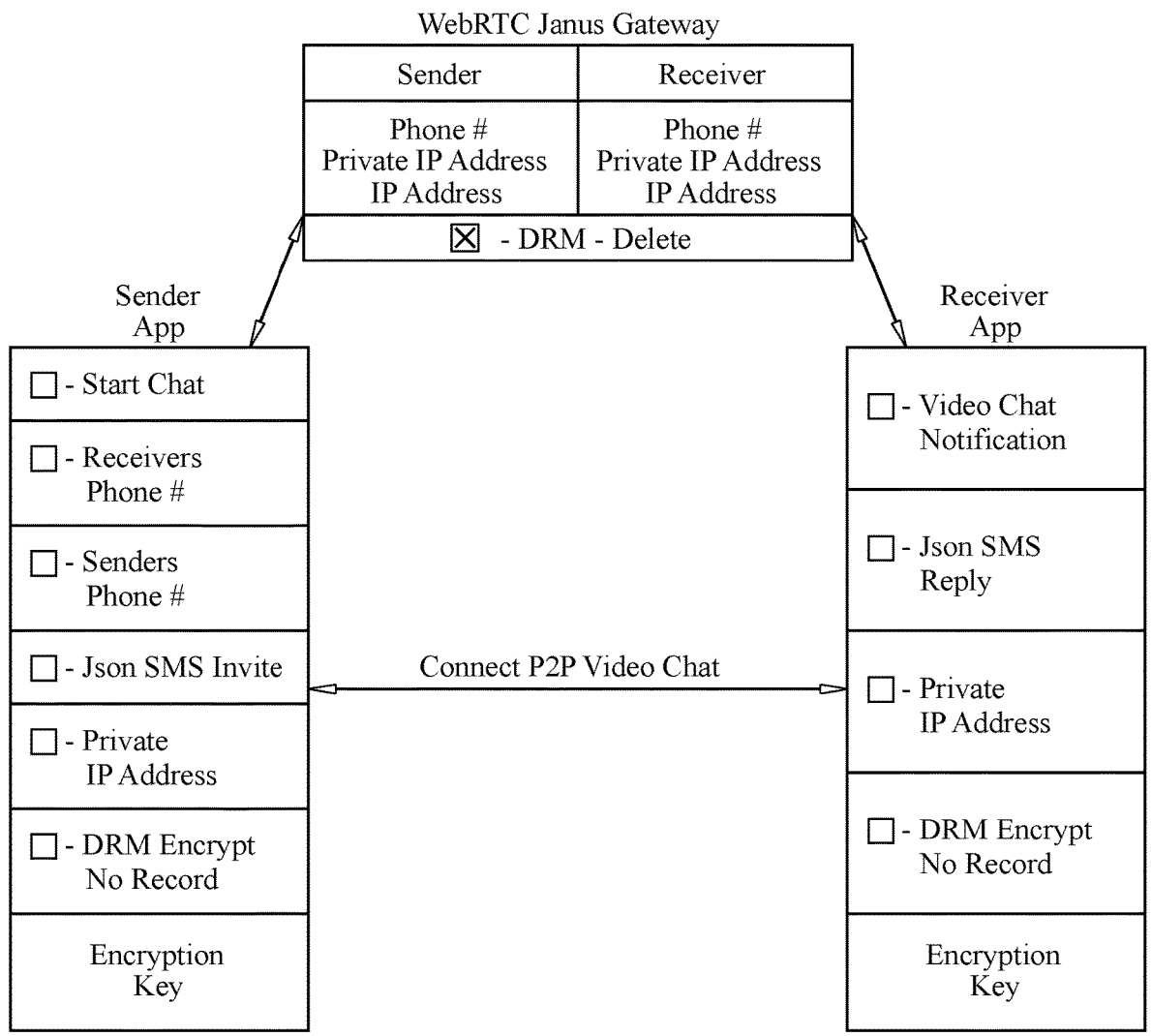
FIG. 61 is a diagram illustrating a non-limiting preferred embodiment of a SRTCS WebRTC app in communication with a Janus Gateway Server and illustrates an example of secret video chat.

FIG. 61 is a diagram illustrating a non-limiting preferred embodiment of a SRTCS WebRTC app in communication with a Janus Gateway Server and illustrates an example of secret video chat. This figure shows a Sender App in communication with a WebRTC-Janus Gateway that is in communication with a Receiver App. The Sender App. using the "push button" feature starts the chat, accesses and selects the receiver's phone number, and the App creates a file containing the Receiver number, the Sender number, a JSON SMS Invite, the Sender private IP address, a DRM permissions selection, and an encryption selection. The Apps each store an encryption key locally to provide the CODEC restriction tied to the DRM permission.

FIG. 61 shows the WebRTC-Janus Gateway receiving and forwarding, via SMS or similar modality, the Sender request and invite to the Receiver App. The receiver receives a video chat notification, selects or generates a JSON SMS reply, and provides a receiver private IP address, selects or accepts DRM permissions and encryption. The Apps can also provide an option for a Secret Video chat where the recording and storage functionality is disabled within the App for the video chat.

FIG. 61 also shows that the WebRTC-Janus Gateway then establishes or facilitates the P2P video chat connection between the private IP addresses of the Sender and the Receiver, without requiring the disclosure of the IP addresses to either party.

Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations.

The embodiments described herein can include various combinations and/or sub-combinations of the functions, components, and/or features of the different embodiments described. Various of the above-disclosed and other features and functions, or alternatives thereof, may be combined into many other different systems or applications. Various presently unforeseen or unanticipated alternatives, modifications, variations, or improvements therein may be subsequently made by those skilled in the art, each of which is also intended to be encompassed by the disclosed embodiments.

What is claimed:

1. A method comprising:

sending, by a first Web Real-Time Communication (WebRTC) chat application on a first communication device, a first telephone number of the first communication device, a private device Internet Protocol (IP) address of the first communication device, and a JavaScript Object Notation (JSON) Short Message Service (SMS) message comprising a second telephone number of a second communication device and an invitation to join a chat session, the chat session being transmitted via a WebRTC-Gateway Server, and the WebRTC-Gateway Server configured to mediate media communications and exchange JSON messages and Real-time Transport Protocol (RTP)/RTP Control Protocol (RTCP) messages with the second communication device;

connecting a private blockchain module to the WebRTC-Gateway Server to enable the WebRTC-Gateway Server to establish a permission-based access control layer that governs network access by the first communication device and the second communication device, the private blockchain module generating an immutable record of WebRTC connection transactions between the first communication device and the second communication device, and the private blockchain module storing the second telephone number of the second communication device;

sending, in a second WebRTC chat application on the second communication device, a JSON SMS message reply containing an answer to the invitation and a private IP address of the second communication device to the WebRTC-Gateway Server;

establishing a communication between the WebRTC-Gateway Server and a signaling server, the signaling server configured to provide communication discovery and media format negotiation between the first communication device and the second communication device;

establishing an encrypted WebRTC connection between the first WebRTC chat application on the first communication device and the second WebRTC chat application on the second communication device;

deploying an advanced security technology module to provide user-based permission control when communicating and sharing content; and connecting a Distributed Ledger Technology (DLT) module to the WebRTC-Gateway Server, recording WebRTC audio and video transactions, and storing the WebRTC audio and video transactions and user personally identifiable information (PII) in distributed blocks of the private blockchain module.

2. The method of claim 1, wherein the first WebRTC chat application on the first communication device comprises video chat and voice chat.

3. The method of claim 2, further comprising:

storing a second chat session transmitted via the first WebRTC chat application on the first communication device, the second chat session being stored at a cloud storage server connected to the first communication device.

4. The method of claim 3, wherein the cloud storage server uses a Distributed Hash Table, and wherein the first telephone number of the first communication device is a key mapped to a second value associated with the second chat session.

5. The method of claim 4, further comprising:

assigning, through of the WebRTC chat application on the first communication device, a digital rights management (DRM) permission to the second chat session, wherein the DRM permission is selected from the group consisting of: record, not record, store, screen share, revoke, expire, offline view, blacklist, copy, forward, screen capture, rights violation, and cancel/disappear, and wherein DRM permission is provided by a DRM module to apply user permissions relating to video/audio streaming on a peer-to-peer (P2P) network connection.

6. The method of claim 5, further comprising:

rendering, in a rendering module of the cloud storage server, an HTML file of the second chat session, the HTML file stored in the cloud storage server and associated with a uniform resource locator (URL).

7. The method of claim 6, further comprising:

enforcing the DRM permission of the second chat session, the cloud storage server in encrypted communication with the second communication device, the second communication device having the second WebRTC chat application operatively connected to a WebRTC browser of the second communication device, wherein the WebRTC browser is configured to enable access, using the URL, the HTML file of the second chat session saved in the cloud storage server, wherein the second chat session is rendered on the cloud storage server, the first WebRTC chat application enforces the DRM permission of the second chat session using a DRM enforcement module in the first WebRTC chat application, and the DRM enforcement module configured to send an enforcement command when a DRM permission violation is detected, and the DRM enforcement module configured to revoke an encryption key that encrypts an electronic signal between the first WebRTC chat application and the WebRTC browser, wherein the electronic signal is between a codec associated with the WebRTC browser and a playback component of the second communication device.

8. The method of claim 3, wherein the private blockchain module is configured to enable controls for verifying user identity, authentication, a digital hash, Group Node Coupling, PII security, content linking, content searching, and content addressing for the cloud storage server.

9. The method of claim 3, wherein the first WebRTC chat application comprises a hardware security module in communication with the cloud storage server to provide encryption for audio and video streams, and wherein the first WebRTC chat application provides a secret video chat module to prevent video recording/playback using an encrypted key with expiration and revocation controls.

10. The method of claim 1, wherein the first WebRTC chat application comprises a key management module in communication with the WebRTC-Gateway Server and the signaling server, wherein the key management module is configured to provide homomorphic encryption of a communication between the WebRTC-Gateway Server and the signaling server, and wherein the homomorphic encryption allowing the signaling server to extract the private IP address of the second communication device without decrypting JSON SMS message content.

11. The method of claim 1, wherein the first WebRTC chat application has an insertable streams module to provide end-to-end encryption, wherein insertable streams transmitted through the insertable streams module iterate on frames to transform an encoded frame to an asynchronous insertable stream.

12. The method of claim 1, wherein the first communication device is selected from a mobile communication device, a desktop computer communication device, and a tablet communication device.

* * * * *

UNITED STATES PATENT AND TRADEMARK OFFICE
CERTIFICATE OF CORRECTION

PATENT NO. : 11,822,626 B2
APPLICATION NO. : 17/408495
DATED : November 21, 2023
INVENTOR(S) : Robert Bernardi It is certified that error appears in the above-identified patent and that said Letters Patent is hereby corrected as shown below:

In the Claims

Column 60, Line 5 (Claim 5, Line 2), change "through of the" to -- through the --.

Signed and Sealed this
Twenty-seventh Day of February, 2024

Katherine Kelly Vidal
*Director of the United States Patent and Trademark Office*